US008641506B2

(12) United States Patent
Yukimura et al.

(10) Patent No.: US 8,641,506 B2
(45) Date of Patent: Feb. 4, 2014

(54) GAMING MACHINE

(75) Inventors: Tatsunori Yukimura, Tokyo (JP); Hiroaki Sue, Tokyo (JP); Akihiko Uehara, Tokyo (JP); Tadashi Hatakeyama, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 74 days.

(21) Appl. No.: 13/494,520

(22) Filed: Jun. 12, 2012

(65) Prior Publication Data

US 2013/0012292 A1 Jan. 10, 2013

(30) Foreign Application Priority Data

Jul. 6, 2011 (JP) ................................ 2011-150468
Jul. 6, 2011 (JP) ................................ 2011-150469
Jul. 6, 2011 (JP) ................................ 2011-150470
Nov. 9, 2011 (JP) ................................ 2011-245975

(51) Int. Cl.
*A63F 13/00* (2006.01)

(52) U.S. Cl.
USPC ........................................................... 463/20

(58) Field of Classification Search
USPC ..................................................... 463/16, 20
See application file for complete search history.

(56) References Cited

U.S. PATENT DOCUMENTS

2003/0130034 A1 * 7/2003 Suganuma et al. ............. 463/30
2003/0166417 A1 * 9/2003 Moriyama et al. .............. 463/46
2005/0049034 A1 * 3/2005 Kojima ........................... 463/20
2005/0054422 A1 * 3/2005 Rothkranz et al. .............. 463/20
2008/0020820 A1 * 1/2008 Iwamoto ......................... 463/20
2008/0096655 A1 * 4/2008 Rasmussen et al. ............ 463/31
2008/0113821 A1 * 5/2008 Beadell et al. .................. 463/46

FOREIGN PATENT DOCUMENTS

JP 2009-261599 11/2009
JP 2010-148907 7/2010
JP 2010-167193 8/2010

* cited by examiner

*Primary Examiner* — Dmitry Suhol
*Assistant Examiner* — Jason Yen
(74) *Attorney, Agent, or Firm* — Lexyoume IP Meister, PLLC.

(57) ABSTRACT

The present invention is to provide an effect with its high entertainment property. Those which are printed in a superimposed manner on the effect panel 813 are: the first picture 813*a* that is printed in an ordinary manner with the use of color ink (such as silk printing or offset printing, for example); and the second picture 813*b* that is printed with a polarizing pearl ink with its higher light transmission property than that of color ink. Further, the lamp 813*c* is disposed on a rear side of the effect panel 813, and light is emitted to a rear face of the effect panel 813 at higher luminance than that of external environmental light in accordance with the progress of game.

13 Claims, 43 Drawing Sheets

One example of Japanese paper pattern

FIG.22

Symbol disposition table

| Left reel | | Center reel | | Right reel | |
|---|---|---|---|---|---|
| Symbol position data | Symbol | Symbol position data | Symbol | Symbol position data | Symbol |
| 20 | Bell | 20 | Bell | 20 | Watermelon |
| 19 | Replay | 19 | Replay | 19 | Replay |
| 18 | Watermelon | 18 | Watermelon | 18 | Bell |
| 17 | Bell | 17 | Bell | 17 | Watermelon |
| 16 | Replay | 16 | Replay | 16 | Replay |
| 15 | Watermelon | 15 | Watermelon | 15 | Bell |
| 14 | Yellow 7 | 14 | Yellow 7 | 14 | Yellow 7 |
| 13 | Bell | 13 | Bell | 13 | Watermelon |
| 12 | Replay | 12 | Replay | 12 | Replay |
| 11 | Watermelon | 11 | Watermelon | 11 | Bell |
| 10 | Bell | 10 | Bell | 10 | Watermelon |
| 9 | Replay | 9 | Replay | 9 | Replay |
| 8 | Watermelon | 8 | Watermelon | 8 | Bell |
| 7 | Blue 7 | 7 | Blue 7 | 7 | Blue 7 |
| 6 | Bell | 6 | Bell | 6 | Watermelon |
| 5 | Replay | 5 | Replay | 5 | Replay |
| 4 | Watermelon | 4 | Watermelon | 4 | Bell |
| 3 | Bell | 3 | Bell | 3 | Watermelon |
| 2 | Replay | 2 | Replay | 2 | Replay |
| 1 | Watermelon | 1 | Watermelon | 1 | Bell |
| 0 | Red 7 | 0 | Red 7 | 0 | Red 7 |

Symbol code table

| Symbol code | Contents | |
|---|---|---|
| | Symbol | Data |
| 1 | Red 7 | 00000001 |
| 2 | Blue 7 | 00000010 |
| 3 | Yellow 7 | 00000011 |
| 4 | Watermelon | 00000100 |
| 5 | Bell | 00000101 |
| 6 | Replay | 00000110 |

FIG.23

Symbol combination table

| Symbol combination | | | Winning activation flag | | Type of storage region | Number of payouts | |
|---|---|---|---|---|---|---|---|
| Left reel | Center reel | Right reel | Data | Contents | | Number of insertions: 2 | Number of insertions: 3 |
| Replay | Replay | Replay | 00000001 | Replay 1 | 1 | 0 | 0 |
| Red 7 | Replay | Replay | 00000010 | Replay 2 | | 0 | 0 |
| Blue 7 | Replay | Replay | 00000100 | Replay 3 | | 0 | 0 |
| Yellow 7 | Replay | Replay | 00001000 | Replay 4 | | 0 | 0 |
| Bell | Replay | Replay | 00010000 | Replay 5 | | 0 | 0 |
| Red 7 | Bell | Bell | 00100000 | Minor combination 1 | | 15 | 15 |
| Blue 7 | Bell | Bell | 01000000 | Minor combination 2 | | 15 | 15 |
| Yellow 7 | Bell | Bell | 10000000 | Minor combination 3 | | 15 | 15 |
| Red 7 | Blue 7 | Yellow 7 | 00000001 | Minor combination 4 | 2 | 15 | 1 |
| Blue 7 | Yellow 7 | Red 7 | 00000010 | Minor combination 5 | | 15 | 1 |
| Yellow 7 | Red 7 | Blue 7 | 00000100 | Minor combination 6 | | 15 | 1 |
| Red 7 | Red 7 | Red 7 | 00000001 | BB | | 0 | 0 |
| Blue 7 | Blue 7 | Blue 7 | 00000010 | BB1 | | 0 | 0 |
| Yellow 7 | Yellow 7 | Yellow 7 | 00000100 | BB2 | | 0 | 0 |
| Replay | Bell | Bell | 00001000 | RT move symbol | | – | – |
| – | – | – | 00010000 | End code | | – | – |

FIG.24

Internal lottery table for non-bonus gaming state
(number of insertions: 3) (Denominator of probability: 65536)

| Winning number | Lottery value by gaming state | | | | Data pointer | |
|---|---|---|---|---|---|---|
| | General gaming state | RT1 gaming state | RT2 gaming state | RT3 gaming state | For minor combination/replay | For bonus |
| 1 | 8980 | 0 | 8979 | 58514 | 1 | 0 |
| 2 | 0 | 4490 | 0 | 0 | 2 | 0 |
| 3 | 0 | 4490 | 0 | 0 | 3 | 0 |
| 4 | 0 | 4490 | 0 | 0 | 4 | 0 |
| 5 | 2730 | | | | 5 | 0 |
| 6 | 2730 | | | | 6 | 0 |
| 7 | 2730 | | | | 7 | 0 |
| 8 | 150 | | | | 8 | 0 |
| 9 | 75 | | | | 9 | 0 |
| 10 | 75 | | | | 10 | 0 |
| 11 | 50 | | | | 8 | 1 |
| 12 | 25 | | | | 9 | 2 |
| 13 | 25 | | | | 10 | 3 |
| 14 | 100 | | | | 0 | 1 |
| 15 | 50 | | | | 0 | 2 |
| 16 | 50 | | | | 0 | 3 |

FIG.25

Internal lottery table for RB gaming state
(number of insertions: 2) (Denominator of probability: 65536)

| Winning number | Lottery value by gaming state | Data pointer | |
|---|---|---|---|
| | RB gaming state | For minor combination/replay | For bonus |
| 1 | 65536 | 11 | 0 |

FIG.26

Internal winning combination determination table for minor combination/replay

| Data pointer for minor combination/replay | Internal winning combination | | |
|---|---|---|---|
| | Data (type of storage region) | | Contents |
| | 1 | 2 | |
| 0 | 00000000 | 00000000 | Losing |
| 1 | 00000001 | 00000000 | Replay 1 |
| 2 | 00010010 | 00000000 | Replay 2 + replay 5 |
| 3 | 00010100 | 00000000 | Replay 3 + replay 5 |
| 4 | 00011000 | 00000000 | Replay 4 + replay 5 |
| 5 | 00100000 | 00000000 | Minor combination 1 |
| 6 | 01000000 | 00000000 | Minor combination 2 |
| 7 | 10000000 | 00000000 | Minor combination 3 |
| 8 | 00000000 | 00000001 | Minor combination 4 |
| 9 | 00000000 | 00000010 | Minor combination 5 |
| 10 | 00000000 | 00000100 | Minor combination 6 |
| 11 | 11100000 | 00000111 | Minor combination 1 to 6 |

FIG.27

Internal winning combination determination table for bonus

| Data pointer for bonus | Internal winning combination | | |
|---|---|---|---|
| | Data (type of storage region) | | Contents |
| | 1 | 2 | |
| 0 | 00000000 | 00000000 | Losing |
| 1 | 00000000 | 00001000 | BB |
| 2 | 00000000 | 00010000 | RB1 |
| 3 | 00000000 | 00100000 | RB2 |

FIG.28

Internal winning combination storage region

| Type of storage region | Data | | Contents |
|---|---|---|---|
| Internal winning combination storage region 1 | Bit 0 | 0 or 1 | Replay 1 |
| | Bit 1 | 0 or 1 | Replay 2 |
| | Bit 2 | 0 or 1 | Replay 3 |
| | Bit 3 | 0 or 1 | Replay 4 |
| | Bit 4 | 0 or 1 | Replay 5 |
| | Bit 5 | 0 or 1 | Minor combination 1 |
| | Bit 6 | 0 or 1 | Minor combination 2 |
| | Bit 7 | 0 or 1 | Minor combination 3 |
| Internal winning combination storage region 2 | Bit 0 | 0 or 1 | Minor combination 4 |
| | Bit 1 | 0 or 1 | Minor combination 5 |
| | Bit 2 | 0 or 1 | Minor combination 6 |
| | Bit 3 | 0 or 1 | BB |
| | Bit 4 | 0 or 1 | RB1 |
| | Bit 5 | 0 or 1 | RB2 |
| | Bit 6 | 0 or 1 | Unused |
| | Bit 7 | 0 or 1 | Unused |

FIG.29

Carryover combination storage region

| Data | | Contents |
|---|---|---|
| Bit 0 | 0 or 1 | BB |
| Bit 1 | 0 or 1 | RB1 |
| Bit 2 | 0 or 1 | RB2 |
| Bit 3 | 0 | Unused |
| Bit 4 | 0 | Unused |
| Bit 5 | 0 | Unused |
| Bit 6 | 0 | Unused |
| Bit 7 | 0 | Unused |

FIG.30

Display combination storage region

| Type of storage region | Data | | Contents |
|---|---|---|---|
| Display combination storage region 1 | Bit 0 | 0 or 1 | Replay 1 |
| | Bit 1 | 0 or 1 | Replay 2 |
| | Bit 2 | 0 or 1 | Replay 3 |
| | Bit 3 | 0 or 1 | Replay 4 |
| | Bit 4 | 0 or 1 | Replay 5 |
| | Bit 5 | 0 or 1 | Minor combination 1 |
| | Bit 6 | 0 or 1 | Minor combination 2 |
| | Bit 7 | 0 or 1 | Minor combination 3 |
| Display combination storage region 2 | Bit 0 | 0 or 1 | Minor combination 4 |
| | Bit 1 | 0 or 1 | Minor combination 5 |
| | Bit 2 | 0 or 1 | Minor combination 6 |
| | Bit 3 | 0 or 1 | BB |
| | Bit 4 | 0 or 1 | RB1 |
| | Bit 5 | 0 or 1 | RB2 |
| | Bit 6 | 0 or 1 | RT move symbol |
| | Bit 7 | 0 | Unused |

FIG.31

Gaming state flag storage region

| Data | | Contents |
|---|---|---|
| Bit 0 | 0 or 1 | BB gaming state |
| Bit 1 | 0 or 1 | RB gaming state |
| Bit 2 | 0 or 1 | RT1 gaming state |
| Bit 3 | 0 or 1 | RT2 gaming state |
| Bit 4 | 0 or 1 | RT3 gaming state |
| Bit 5 | 0 | Unused |
| Bit 6 | 0 | Unused |
| Bit 7 | 0 | Unused |

FIG.32

Depressing sequential order storage region

| Data | | Contents |
|---|---|---|
| Bit 0 | 0 or 1 | Left → Center → Right |
| Bit 1 | 0 or 1 | Left → Right → Center |
| Bit 2 | 0 or 1 | Center → Left → Right |
| Bit 3 | 0 or 1 | Center → Right → Left |
| Bit 4 | 0 or 1 | Right → Left → Center |
| Bit 5 | 0 or 1 | Right → Center → Left |
| Bit 6 | 0 | Unused |
| Bit 7 | 0 | Unused |

※ Bits 0 to 5 are invalid when "0" is set, and are valid when "1" is set

FIG.33

Active stop button storage region

| Data | | Contents |
|---|---|---|
| Bit 0 | 0 or 1 | Left stop button operation |
| Bit 1 | 0 or 1 | Center stop button operation |
| Bit 2 | 0 or 1 | Right stop button operation |
| Bit 3 | 0 | Unused |
| Bit 4 | 0 or 1 | Left stop button operation is valid |
| Bit 5 | 0 or 1 | Center stop button operation is valid |
| Bit 6 | 0 | Right stop button operation is valid |
| Bit 7 | 0 | Unused |

※ As for bits 0 to 2, no operation is made when "0" is set, and the corresponding operation is made when "1" is set Bits 4 to 6 are invalid when "0" is set, and are valid when "1" is set

GAMING MACHINE

CROSS REFERENCE TO RELATED APPLICATIONS

This application claims priority of Japanese Patent Application No. 2011-150468 filed on Jul. 6, 2011, Japanese Patent Application No. 2011-150469 filed on Jul. 6, 2011, Japanese Patent Application No. 2011-150470 filed on Jul. 6, 2011 and Japanese Patent Application No. 2011-245975 filed on Nov. 9, 2011. The contents of these applications are incorporated herein by reference in their entirety.

BACKGROUND OF THE INVENTION

1. Field of the Invention

The present invention relates to a gaming machine such as a pachi-slot machine or a slot machine.

2. Description of the Related Art

Conventionally, it has been known that a gaming machine (a so called pachi-slot machine) is provided with: a casing adapted to house a plurality of reels of which a plurality of symbols are arranged on a respective one of peripheral faces; a front door that is mounted in an openable manner to a front side opening face of the casing; a front panel that is arranged on a front upper halve of the front door; and a base portion having control means on a top face portion. It has also been conventionally known that the gaming machine of such type is provided with an image display device that is arranged at a rear part of a front panel of the front door, the image display device being capable of displaying an image according to the play of game and transparently visualizing the reels.

In the front panel of such a gaming machine, it has been known that there is provided a technique in which a plurality of decorative sheets printed with pictures (including marks and characters or the like) drawn with the respective colors different from each other are provided on a rear face of a smoke or a half mirror, and a lamp that is provided on a rear face of the decorative sheet varies a color of emitted light, thereby varying a picture that a player can be recognize. For example, a smoke sheet, a red decorative sheet on which a red picture is drawn, and a blue decorative sheet on which a blue picture is drawn are superimposed in sequential order from a top side, and red or blue light is emitted to the lamp from the rear side of a respective one of the red and blue decorative sheets (for example, refer to Japanese Unexamined Patent Application Publication No. 2010-167193).

Under such a construction, in a case where a lamp emits red light, the red picture that is drawn on the red decorative sheet absorbs the color of light, and cannot be recognized, and only the blue picture that is drawn on the blue decorative sheet can be visually recognized. On the other hand, in a case where blue light is emitted, the blue picture that is drawn on the blue decorative sheet absorbs the color of light, and cannot be recognized, and only the red picture that is drawn on the red decorative sheet can be visually recognized. In this manner, the picture that can be recognized by a player is varied by varying the color of light to be emitted. It is to be noted that in a case where a lamp goes out, no picture is displayed by means of a smoke sheet.

However, in the technique as described above, in which a decorative sheet is provided on the rear face of the smoke or half mirror to thereby vary the color of light to be emitted and then vary a picture that can be recognized by a player, transparency of the smoke sheet or half mirror is low; and therefore, the pictures that are printed on the decorative sheets on the rear face of the smoke sheet or half mirror may be too dark to see through, and it has been impossible to print a finely drawn picture onto a decorative sheet. In addition, in the technique described above, only a picture with a color different from that of light emitted from a lamp can be visually recognized, and it has been impossible to arbitrarily determine a color to be used in a picture. As a result, there has been a first problem that an effect with its high entertainment property cannot be provided.

The present invention has been made in order to solve the first problem described above, and it is an object of the present invention to provide a gaming machine that is capable of providing an effect with its high entertainment property.

In addition, it has been conventionally known that a gaming machine such as a pachinko-type slot machine (a so called pachi-slot machine) or a pachinko machine is provided with a display device adapted to display an image according to the progress of game. Further, it has been conventionally known that a decorative panel, which is capable of transparently visualizing an image that is displayed on the display device from a front side, is provided on the front face side of such a display device as well (for example, refer to Japanese Unexamined Patent Application Publication No. 2010-148907.).

The decorative panel that is disclosed in Japanese Unexamined Patent Application Publication No. 2010-148907 constitutes a door simulating a Japanese traditional semi-transparent sliding door called "Shoji", and the contents that are displayed on a liquid crystal screen as a display screen can be slightly visually recognized from the outside, and even if the door is in a closed state, an effect employing the liquid crystal screen is possible.

However, the door simulating "Shoji", as described above, is not merely semitransparent; and therefore, it has been difficult to make a variety of expressions including a texture which is hardly expressed by only the liquid crystal screen, for example. Accordingly, while it is deemed to provide an effect utilizing a texture of Japanese traditional paper to show an image that is seen through such Japanese traditional paper, there has been a second problem that actual Japanese traditional paper may be degraded with an elapse of time, owing to an internal heat of a gaming machine or owing to an environment of installation of the gaming machine (such as a smoke exerted by cigarette smoking in gaming facility), its related transparency may lower, and finally a visual recognition of an image may lower as well.

Hence, it has been difficult to employ actual Japanese traditional paper in an effect of a gaming machine; and however, there would be something splendid that a unique texture of Japanese traditional paper deserves to be; and therefore, there has been a demand for a technique which enables Japanese traditional paper to be applicable to the effect of the gaming machine.

The present invention has been made in order to solve the second problem described above, and it is an object of the present invention to provide a gaming machine that is capable of providing a stage effect utilizing a texture of Japanese traditional paper over a long period of time without degradation of transparency with an elapse of time.

In addition, it has been conventionally known that a gaming machine (a so called pachi-slot machine) is provided with: a casing adapted to house a plurality of reels of which a plurality of symbols are arranged on a respective one of peripheral faces; a front door that is mounted in an openable manner to a front opening face of the casing; a front panel that is arranged on a front upper halve of the front door; and a base portion having control means on a top face portion. It has been conventionally known that the gaming machine of such type is provided with an image display device that is arranged at a rear part of a front panel of the front door, the image display device being capable of displaying an image according to the play of game and then transparently visualizing the reels as well.

In the gaming machine of such type, it has been known that there is provided a movable effect member that is operative at the same time as that of an effect display by means of an image display device, for example. In particular, such a movable effect member is provided in such a manner as to be superimposed on a display screen of the display device as well (for example, refer to Japanese Unexamined Patent Application Publication No. 2009-261599).

In this manner, the movable effect member that is operative while it is superimposed on the display screen is provided, thereby making it possible to invoke a player's attention to the effect display more strongly.

However, in the construction of Japanese Unexamined Patent Application Publication No. 2009-261599, as described above, in order to arrange a movable effect member in such a manner as to be superimposed on a display screen of a display device, an effect member storage space adapted to store the movable effect member is provided on a front panel. The effect member storage space, in addition to thickness of the movable effect member, requires a predetermined play space to be provided in such a manner as to disable the effect member to come into contact with any constituent element at its front or rear side as well. Therefore, there has been a third problem as described below. In other words, in the case of a gaming machine adapted to arrange a front panel having an effect member storage space therein, there is a need to reduce a space to be provided between a lower part of the front panel and a top face of the base portion.

In addition, if there is a need to reduce a space to be provided between the lower part of the front panel and the top face of the base portion, operability of the control means that is arranged on the top face of the base portion may be degraded. In particular, in a case where the front panel is formed in a frame shape having a top frame and left and right longitudinal portions, if the left and right longitudinal frame portions extend forward (to the player's side), it becomes difficult to make an operation of control buttons or the like that are proximal thereto.

The present invention has been made in order to solve the third problem described above, and it is an object of the present invention to provide a gaming machine in which even if an effect member storage space for storing a movable effect member is provided on a front panel, there is no need to reduce a space to be provided between the front panel and a top face part of a base portion, and operability of the control means that is provided on the top face of the base portion is not degraded.

Further, in the movable effect member described above, it is often requested to make a repetition operation at the same time as that of an effect display by means of a display device, and there has been a case in which a backlash occurs due to a load caused by the repetition operation or due to aging with an elapse of time. In particular, a possibility of such a backlash increases in a case of a cantilever support in which the movable effect member interlocks with and then couples to a turning shaft via a bearing portion that is provided at one end, and that is constructed in a vertically swingable manner which may be exerted by rotation of the turning shaft.

In this way, in the case of the construction in which the movable effect member interlocks with and then couples to the turning shaft via the bearing portion that is provided at one end, if a backlash occurs between the bearing portion and the turning shaft to be inserted through the bearing portion, it is deemed that a movable range of the movable effect member deviates from a designed predetermined range and then swings up to a reel transparent visualization region of the image display device. In that case, there has been a fourth problem as described below. In other words, there has been an apprehension that visual recognition of reel symbols may be degraded, thereby resulting in interference with an operation of a stop button, for example. In addition, there has been an apprehension that a stage effect may be lost with no match between a timing of driving a movable effect member and a timing of displaying an effect image by means of an image display device as well.

The present invention has been made in order to solve the fourth problem described above, and it is an object of the present invention to provide a gaming machine that is capable of preventing a backlash between a bearing portion in a movable effect member and a turning shaft to be inserted into the bearing portion to its required possible maximum.

SUMMARY OF THE INVENTION

The gaming machine of the present invention, to the first problem to be solved, is provided which includes: a casing (example, a cabinet 1*a*) adapted to house a plurality of reels in which a plurality of symbols are arranged on a respective one of peripheral faces; a front door (example, a front door 2) that is mounted in an openable manner to a front side opening face of the casing; a front panel that is arranged at a front upper half of the front door; an effect panel (example, an effect panel 813) including a first picture (example, a first picture 813*a*) that is printed with a color ink and a second picture (example, a second picture 813*a*) that is superimposed on the first picture, and is printed with a polarizing pearl ink with a higher light transmission property than the color ink, the effect panel being disposed at a predetermined position in the front panel; and a light emitting element (example, a lamp 813*c*) for emitting light to a rear face of the effect panel at higher luminance than that of external environmental light in accordance with a progress of a game.

According to the present invention, since the second picture is printed with a polarizing pearl ink with its high light transmission property, in a case where the light emitting element is lit, light emitted from the light emitting element transmits the second picture, and as a result, the first picture can be clearly displayed having almost no influence on the first picture. In this manner, the first picture can be clearly displayed, thus making it possible to produce the first picture as a finely depicted picture, and making it possible to provide an effect with its high entertainment property. In addition, since a color used for the first picture can be arbitrarily determined, the first picture can be produced as a colorful picture without limiting a color used for the first picture, and an effect with its high entertainment property can be provided.

The gaming machine of the present invention, further includes: a measuring portion for measuring luminance of environmental light; and an adjustment portion for adjusting luminance of the lamp so as to emit light at stronger luminance than that of the environmental light that is measured by means of the measuring portion.

According to the present invention, the luminance of environmental light is measured, and light is emitted with stronger luminance than that of the measured environmental light, thus making it possible to reliably display a clear first picture. In addition, in a case where the luminance of the environmental light is low, the first picture can be clearly displayed while the luminance of the light from the light emitting element is reduced, thus making it possible to restrain power consumption.

The gaming machine of the present invention, includes a plurality of light emitting elements respectively emitting light to a rear of the effect panel, at higher luminance than that of external environmental light, wherein the plurality of lamps 813c individually emits light in accordance with the progress of a game.

According to the present invention, in a case where a plurality of first pictures exist, light is emitted to only part of the plurality of first pictures, thereby making only a partial picture visually recognizable. In this manner, for example, diversified effects can be achieved by providing a variety of effects such as changing a degree of expectation according to kinds of pictures that can be visually recognized.

According to the present invention, the picture can be clearly displayed, thus making it possible to produce the picture as a finely depicted picture, and making it possible to provide an effect with its high entertainment property.

The gaming machine of the present invention, to the second problem to be solved, is provided which includes: a casing (example, a cabinet 1a) adapted to house a plurality of reels of which a plurality of symbols are arranged on a respective one of peripheral faces; a front door (example, a front door 2) that is mounted in an openable manner to a front side opening face of the casing; a front panel (example, a front panel 8) that is arranged at a front upper half of the front door; a display device (example, a liquid crystal display device 5) that is arranged at a rear part of the front panel of the front door, for displaying an image according to a progress of a game; and decorative panels (example, a first decorative panel 61, a second decorative panel 62) each having a Japanese paper portion that is fixed between the display device and the front panel, and that is capable of visualizing, from a front face side, an image that is displayed on the display device, wherein Japanese paper portions of the decorative panels has, on one side face of a substrate made of a light transmission material, a simulative Japanese paper face on which a Japanese paper pattern based on a Japanese paper image obtained by acquiring Japanese paper by means of a scanner is produced, and wherein the simulative Japanese paper face is printed by employing a nontransparent white ink, a transparent ink, and a white transparent ink of an intermediate color of these two inks.

According to the gaming machine, based on a Japanese paper image that is obtained by acquiring actual Japanese paper by means of a scanner, printing is performed with the use of a nontransparent white ink, a transparent ink, and a white transparent ink of an intermediate color of these two inks, whereby a Japanese paper patter having a unique texture can be easily produced, enabling a new effect utilizing a texture unique to Japanese paper. Moreover, unlike actual Japanese paper, there would be no apprehension that transmittance lowers with an elapse of time. In addition, a decorative panel can be easily mounted to the gaming machine.

The gaming machine of the present invention, is provided in such a manner that the decorative panels includes decorative frames which are fixed in a state in which part of these panels is inserted between the display device and the front panel and for which a design having at least one opening is made; the Japanese paper portions are sandwiched between the decorative frames and the display device; the simulative Japanese paper face employs, as a bottom layer, either a transparent ink or a white transparent ink from among a white ink, the transparent ink, and the white transparent ink; and the white ink, the transparent ink, and the white transparent ink are printed to be superimposed in a layered manner in a predetermined sequential order.

According to the present invention, a decorative panel which is attractive in an external view can be produced by combining the decorative frames and the Japanese paper portions with a variety of designs. In addition, the decorative panels can be easily and reliably mounted to the gaming machine.

The gaming machine of the present invention is provided in such a manner that two kinds of decorative panels with their different external views are disposed to be spaced from each other on the left and right sides of the display device, and on Japanese paper portions of the respective decorative panels, spacers are arranges to prevent the Japanese paper portions from coming into direct contact with a surface of the display device and to prevent the simulative Japanese paper face from coming into direct contact with the decorative frames.

According to the present invention, it becomes possible to prevent the simulative Japanese paper face from being worn out and damaged due to abutment against the decorative frames and to prevent a display face of the display device from worn out and damaged by the Japanese paper portions. In addition, more various stage effects can be obtained utilizing two different kinds of decorative panels and a texture unique to Japanese paper.

According to the present invention, there would be no apprehension that transmittance lowers with an elapse of time, and the stage effects can be obtained utilizing a texture unique to Japanese paper.

The gaming machine of the present invention, to the third problem to be solved, is provided which includes: a casing (example, a cabinet 1a) adapted to house a plurality of reels in which a plurality of symbols are arranged on a respective one of peripheral faces; a front door (example, a front door 2) that is mounted in an openable manner to a front side opening face of the casing; a base portion (example, a base portion 17) having control means (example, a medal insertion slot 10, a 1-BET button 11, and a MAX-BET button 12) on a top face part thereof, the base portion being arranged at a front lower half of the front door; a front panel (example, a front panel 8) which is arranged at a front upper half of the front door, a lower end part of which communicate with the top face part of the base portion; a display device (example, a liquid crystal display device 5) that is arranged at a rear part of the front panel, for displaying an image according to a play of a game and transparently visualizing reels; and a movable effect member (example, a torch-shaped movable member 91) that is arranged in a vertically swingable manner between the front panel and the display device, and that is movable from an initial position hidden behind a rear part of an upper part of the front panel up to a position covering part of the display device, wherein the front panel is gradually small in a degree of protrusion from a top part to a lower end part at which a maximum protrusion portion is formed.

According to the present invention, a predetermined space is formed between the front panel and the top face part of the base portion, enabling an impression effect that the movable effect member suddenly gets into a field of view; and therefore, there is no apprehension that operability of the control means that are provided at the top face part of the base portion is degraded.

The gaming machine of the present invention, is provided in such a manner that the movable effect member extends in a transversely widthwise direction of the front panel, and is a rod-like body, one end part of which is pivotably coupled with an appropriate site.

According to the present invention, equipment of a large-sized movable effect member that is capable of attracting a player's attention can be implemented with a simple construction in which only one end part is pivotably coupled with an appropriate site.

The gaming machine of the present invention, is provided in such a manner that the front panel is made of: a cover body (example, a cover body 82) for covering the front upper half of the front door; and a hard plate member (example, a reinforced acrylic plate 84) having a light transmission property, the plate member being mounted on a back face side of the cover, and a tilt angle of the hard plate member is defined as a tilt angle at which a maximum thickness portion of the movable effect member abuts against the hard plate member at a position that is more upward than that of a transparent region of the reels the display device.

According to the present invention, even in a case where the movable effect member disengages and drops for any reason, the movable effect member stops in abutment against the hard plate member at an position that is more upward than that of the transparent region of the reels and therefore, visual recognition of the reel is not interfered.

According to the present invention, a predetermined space is formed between the front panel and the top face part of the base portion, includes a movable effect member that is movable from an initial position hidden behind a rear part of an upper part of the front panel up to a position covering part of the display device; and therefore, there is no apprehension that operability of the control means that are provided at the top face part of the base portion is degraded.

The gaming machine of the present invention, to the forth problem to be solved, is provided which includes: a casing (example, a cabinet 1*a*) adapted to house a plurality of reels in which a plurality of symbols are arranged on a respective one of peripheral faces; a display device (example, a liquid crystal display device 5) that is provided at a front door (example, a front door 2) mounted in an openable manner to a front side opening face of the casing, and that is capable of displaying an image according to a play of a game and visualizing the reels; a movable effect member (example, a torch-shaped movable member 91) that, on a front face side of the display device, extends in a transversely widthwise direction of the display device, and that is arranged in a vertically swingable manner via a bearing portion (example, a bearing portion 92) that is provided at one end thereof; and a driving source (example, a motor 94) for driving the movable effect member, wherein the movable effect member has: an outer shell portion (example, an outer shell portion 91*a*) for which a predetermined design is made; and a board portion (example, a board portion 91*b*) that is mounted to a rear opening portion of the outer shell portion, the bearing portion is provided at the outer shell portion, and has: a first boss portion (example, a first boss portion 921) into which a turning shaft (example, a turning shaft 950) coupled to be interlocked with the driving source (example, the motor 94) is to be inserted; and a second boss portion (example, a second boss portion 922) that is provided at the board portion, engages with the first boss portion, and configures the bearing portion together with the first boss portion, wherein the first boss portion includes a pair of shaft pinching pieces (example, shaft pinching pieces 923) in which first tapered faces tapered toward tip ends are respective formed on outside faces, whereas the second boss portion is a boss portion at which a second tapered face (example, a second tapered face 922*a*) abutting against the first tapered face is formed on an inside face, a turning shaft has a flat face portion that is pinched between and compressed by means of the pair of the shaft pinching pieces, and the flat face portion is chamfered and formed on a respective one of shaft peripheral faces.

According to the present invention, the first boss portion that is provided at the outer shell portion is engaged with the second boss portion that is provided at the board portion, the first tapered face and the second tapered face are abutted against each other, whereby the shaft pinching piece is compressed inward, and the bearing portion and the turning shaft of the movable effect member are fixed to each other, and as a result, for example, it is possible to prevent, to its required maximum, a backlash from occurring between the bearing portion of the movable effect member and the turning shaft to be inserted therein. Thus, there would be no apprehension that a movable range of the movable effect member deviates from a designed predetermined range, and swings up to a real visualization region of the display device, and there would be no apprehension that visual recognition property of the reel symbols is degraded, thereby interfering operation of stop buttons, for example. In addition, the movable effect member is precisely driven, thereby making it possible to move together with display of an effect image by means of the display device without any shift. Further, the turning shaft is more reliably pinched between and compressed by means of the shaft pinching pieces, making it possible to more reliably prevent a backlash between the bearing portion and the turning shaft.

The gaming machine of the present invention is provided in such a manner that the movable effect member is capable of pinching and compressing the turning shaft by compressing the shaft pinching pieces inward by means of the second tapered face when the board portion is attached to the outer shell portion with the turning shaft being inserted into the first boss portion.

According to the present invention, when a worker assembles the movable effect member, the worker can feel that the turning shaft is firmly pinched and compressed and then is fixed to the bearing portion, thus making it possible to reliably fix the beating portion and the turning shaft to each other. As a result, a backlash between the bearing portion and the turning shaft can be prevented more reliably.

The gaming machine of the present invention is provided in such a manner that: the movable effect member is a member in which the outer shell portion and the board portion are assembled with each other in advance; at the shaft pinching pieces of the first boss portion, a third tapered face (example, a third tapered face 923*b*) is formed on an inside face so that at least tip end portion broadens as the turning shaft in inserted; when the turning shaft is inserted into the bearing portion, the shaft pinching pieces are compressed outward; and a caulking engagement is configured between the first boss portion and the second boss portion.

According to the present invention, the movable effect member is provided as a unit, thus making it very easy to mount the movable effect member, and there is no apprehension that a harness is bitted at the time of such mounting.

The gaming machine of the present invention is provided in such a manner that the movable effect member includes: a peripheral wall portion (example, a peripheral wall portion 912) surrounding a bearing portion; and an effect main body portion (example, an electrical decorative portion 910) that continuously extends to the peripheral wall portion, wherein: the peripheral wall portion is formed an outer shell portion 91*a*; and part of the peripheral portion is cut out, forming a lead-out space 915 for leading out the harness (example, a harness 917) electrically connecting the movable effect member (the torch-shaped movable member 91) and the casing to thereby configure the harness to be able to be led out from the lead-out space after a ring has been formed along an outer circumference of the second boss portion; and further, a harness engagingly lock portion (example, a harness engagingly lock portion 918) is provided for engagingly locking the harness that extends from the lead-out space 915.

According to the present invention, when the movable effect member is mounted to the front door, the harness that extends from a proximal end part of the movable effect member is temporarily engagingly locked with the harness engagingly lock portion, and thereafter, a harness tip end side can be suspended on the casing from a top side of a driving unit case, thus making it easier to mount the movable effect member.

According to the present invention, there would be no apprehension that a movable range of the movable effect member deviates from a designed predetermined range, and swings up to a real visualization region of the display device, and there would be no apprehension that visual recognition property of the reel symbols is degraded, thereby interfering operation of stop buttons, for example. In addition, the movable effect member is precisely driven, thereby making it possible to move together with display of an effect image by means of the display device without any shift.

BRIEF DESCRIPTION OF THE DRAWINGS

FIG. 22 is a view showing a symbol disposition table;

FIG. 23 is another view showing a symbol combination table;

FIG. 24 is a still another view showing an internal lottery table;

FIG. 25 is a yet another view showing an internal lottery table;

FIG. 26 is a view showing an internal winning combination determination table;

FIG. 27 is another view showing an internal winning combination determination table;

FIG. 28 is a view showing a variety of regions of a RAM;

FIG. 29 is another view showing a variety of regions of the RAM;

FIG. 30 is a still another view showing a variety of regions of the RAM;

FIG. 31 is a yet another view showing a variety of regions of the RAM;

FIG. 32 is a further view showing a variety of regions of the RAM;

FIG. 33 is a still further view showing a variety of regions of the RAM;

DESCRIPTION OF THE PREFERRED EMBODIMENTS

Figure 1:
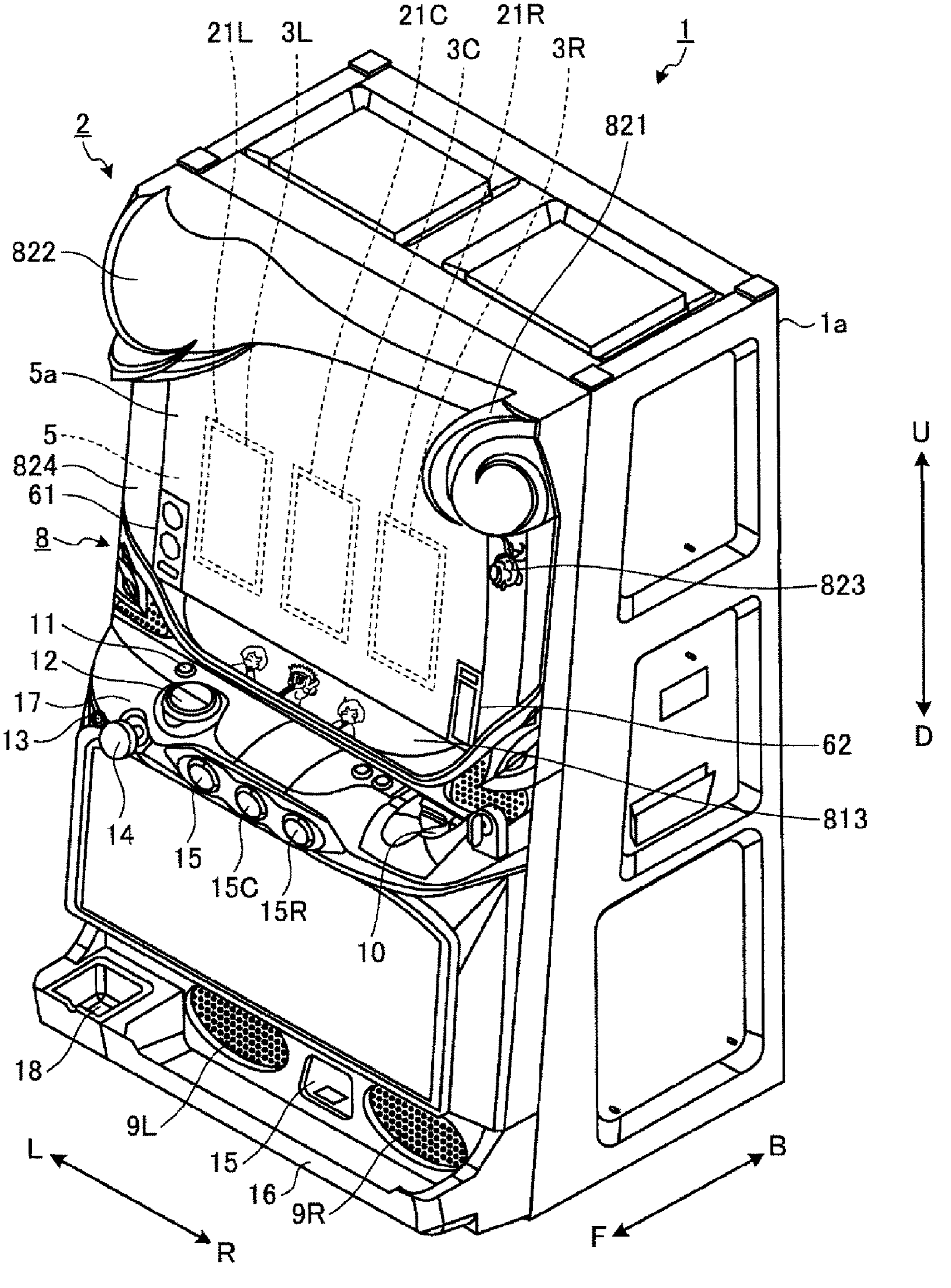
FIG. 1 is a perspective view of an appearance of a gaming machine according to an embodiment.

Hereinafter, embodiments of a gaming machine according to the present invention will be described with reference to the drawings. While, in the following embodiments, upward and downward, leftward and rightward, and forward and backward directions are occasionally indicated in describing a relative positional relationship in the respective constituent elements of the gaming machine, the reference in each direction assumes a case in which the gaming machine is installed on a horizontal face, as shown in FIG. 1. In the figure, the directions designated by uppercase letters L and R are defined as being leftward and rightward in a horizontal direction; the directions designated by uppercase letters F and B are defined as being forward and backward in a horizontal direction; and the directions indicated by uppercase letters U and D are defined as being upward and downward in a vertical direction.

[Outline of Gaming Machine]

First, an outline of a gaming machine will be briefly described. FIG. 1 is a perspective view showing an external view of a gaming machine according to an embodiment. As illustrated, a gaming machine 1 includes: a cabinet 1*a* that is a casing for housing three reels 3L, 3C, and 3R or a variety of circuit boards (not shown); and a front door 2 that is mounted in an openable manner on an opening face in a front face side of the cabinet 1*a* (the direction designated by F in the figure). At a front upper halve of the front door 2, a front panel 8 is provided in such a manner that a liquid crystal display device 5 for displaying an image according to the progress of a game are mounted at a rear part thereof.

The reels 3L, 3C, and 3R that are housed in the cabinet 1*a* are arranged in line in the leftward and rightward directions (the directions designated by uppercase letters L and R in the figure), and respectively, on the peripheral faces of cylindrical frames, band-shaped sheets on which a plurality of symbols as identification information are continuously disposed along their rotating direction are attached and formed. In the reels 3L, 3C, and 3R, a rotary shaft of each frame is rotated by means of a driving unit such as a stepping motor, whereby a plurality of symbols are displayed in a variable manner.

The liquid crystal display device 5 is provided on an upper side from the center of the front panel 8 (in the direction designated by uppercase letter U in the figure) and between the front door 2 and the front panel 8. The liquid crystal display device 5 is fixed to an upper part of the front door 2 by means of a mount frame, and displays and controls an image through a display screen 5*a*. The display screen 5*a* displays an image displayed and controlled by a sub-control circuit 72, according to a state of the play of game, and displays the respective symbols of the sheets that are attached to the frames of the reels 3L, 3C, and 3R, through reel windows 21L, 21C, and 21R that are provided on a slightly lower side of the display screen 5*a*.

On a lower side of the front panel 8, that is, at the front lower half of the front door 2, a base portion 17 is provided. At a top face part of the base portion 17, a variety of control means are provided to accept an operation for the play of game by a player. A medal insertion slot 10 that is provided on the right side of the base portion 17 accepts a metal to be inserted by a player. The medals that are inserted into the medal insertion slot 10 are consumed in one play of game in the gaming machine 1 with a predetermined number of medals (for example, three medals) being an upper limit, and if the predetermined number is exceeded, the resultant excess is accumulated as a credit in the gaming machine 1.

On the other hand, a 1-BET button 11 that is provided on a slight left side of the base portion 17 is depressed by a player in order to consume one medal with respect to one play of game from the medals that are inserted or accumulated in the gaming machine 1. A MAX-BET button 12 that is provided at a slightly right side front position of the 1-BET button 11 is depressed by a player in order to consume a maximum number of medals (for example, three medals) that can be consumed with respect to one play of game from the medals that are inserted or accumulated in the gaming machine 1. A fare adjustment button 13 that is provided in proximity to a left side end part of the base portion 17 is depressed by a player in order to draw out all the medals that are accumulated in the gaming machine 1.

A start lever 14 that is protruded on the right side of the fare adjustment button 13 is operated by a player in order to start spinning of the reels 3L, 3C, and 3R. At the right side of this start lever 14, stop buttons 15L, 15C, and 15R that are disposed side by side at a substantial center of the base portion 17 are respectively associated with three reels 3L, 3C, and 3R, and with a timing of a depressing operation by a player, spinning of the corresponding reels 3L, 3C, and 3R can be stopped.

In addition, at a lower part of the base portion 17, a medal payout opening 15 for ejecting medals that are acquired by the play of game is provided, and speakers 9L and 9R for outputting a sound such as an effect sound or music according to the predetermined contents of effect are provided so as to sandwich the medal payout opening 15. On the front face side thereof, a medal receiving portion 16 is provided, and the medals that are ejected from the metal payout opening 15 are accumulated in this medal receiving portion 16. Further, on the left side of the medal receiving portion 16, an ashtray 18 is provided.

[Functional Configuration of Gaming Machine]

Next, a functional configuration included in the gaming machine 1 in an embodiment will be described. In the gaming machine 1 of the embodiment, at an internal upper position of a cabinet 1*a*, a board that configures a main control circuit 71 and a sub-control circuit 71; and peripheral devices (such as a variety of devices) that are electrically connected thereto are provided.

Figure 2:
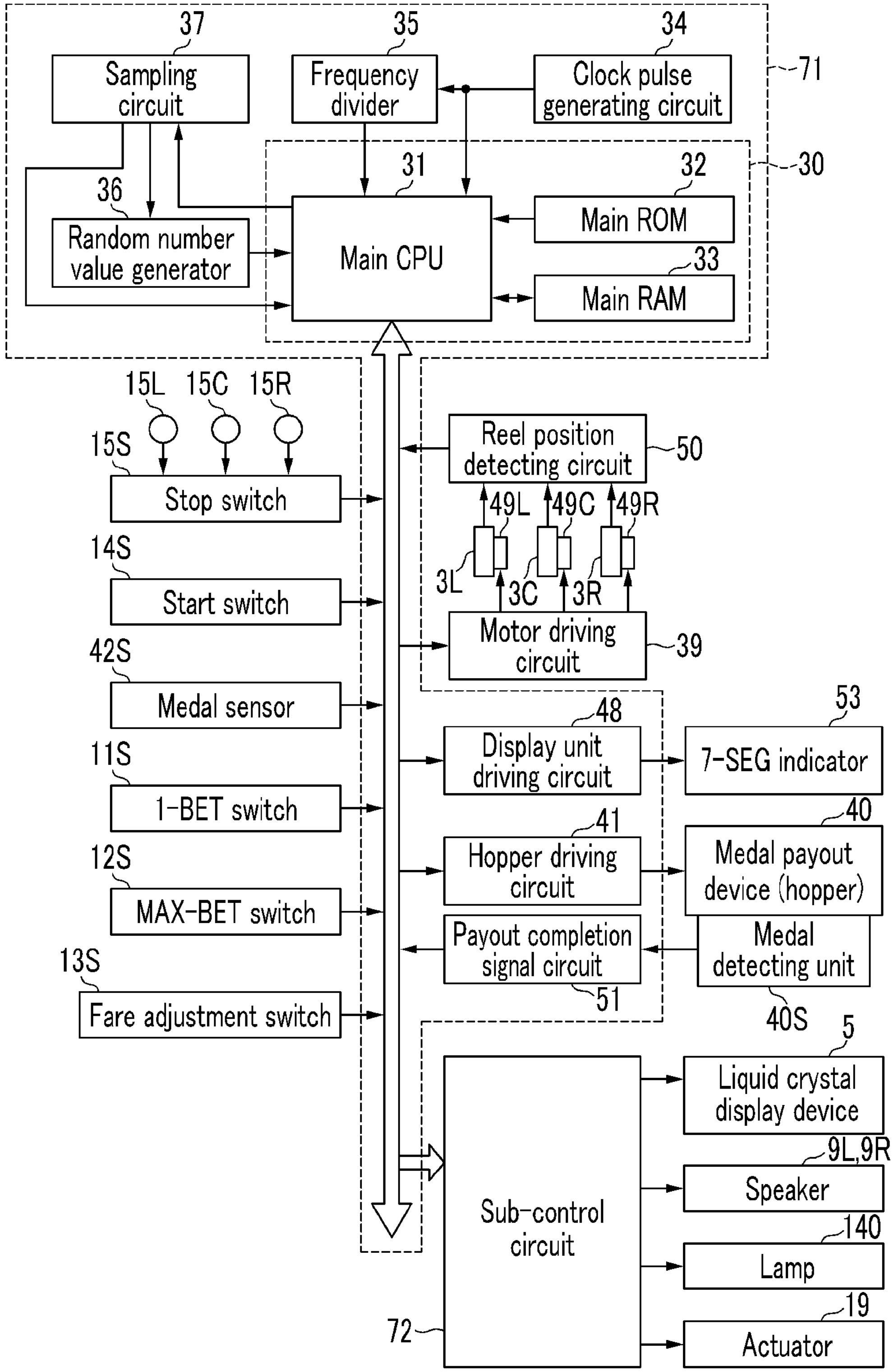
FIG. 2 is a block diagram of the gaming machine according to the embodiment.

FIG. 2 is a block diagram of a gaming machine according to an embodiment. The main control circuit 71 consists essentially of a microcomputer 30 that is disposed on a circuit board. The microcomputer 30 includes a main CPU 31, a main ROM 32, and a main RAM 33 or the like.

The main ROM 32 stores: control programs to be executed by means of the main CPU 31; a variety of data tables; and data or the like such as a variety of control instructions (such as commands) to be transmitted to the sub-control circuit 72. In the main RAM 33, a storage area is provided for storing a variety of data such as internal winning combinations that are determined by execution of the control programs.

To the main CPU 31, a clock pulse generating circuit 34, a frequency divider 35, a random number value generator 36, and a sampling circuit 37 are connected. The clock pulse generating circuit 34 and the frequency divider 35 generate a clock pulse. Based on the generated clock pulse, the main CPU 31 executes a control program. The random number value generator 36 generates one random number from a predetermined range (for example, 0 to 65 or 535).

Switches or the like are connected to input ports of the microcomputer 30. Upon the receipt of inputs from a variety of switches, the main CPU 31 controls operation of peripheral devices such as stepping motors 49L, 49C, and 49R.

A stop switch 15S detects that three stop buttons 15L, 15C, and 15R are depressed by a player in order to stop spinning of the reels 3L, 3C, and 3R. In addition, a start switch 14S detects that a start lever 14 is operated by a player in order to start spinning of the reels 3L, 3R, and 3R.

A medal sensor 42S detects a medal that is accepted by the medal insertion slot 10. A 1-BET switch 11S detects that a 1-BET button 11 is depressed by a player. A MAX-BET switch 12S detects that a MA-BET button 12 is depressed by a player. A fare adjustment switch 13S detects that a fare adjustment button 13 is depressed by a player.

Peripheral devices of which operations are controlled by means of the microprocessor 30 include stepping motors 49L, 49C, and 49R, a 7-segment indicator 53, and a hopper 40. In addition, a circuit adapted to control an operation of each of the peripheral devices is connected to an output port of the microcomputer 30.

A motor driving circuit 39 controls driving of the stepping motors 49L, 49C, and 40R that are provided for the reels 3L, 3C, and 3R. A reel position detecting circuit 50 detects reel indexes indicating that the reels 3L, 3C, and 3R spin one turn, according to the reels 3L, 3C, and 3R, by means of an optical sensor having a light emitting portion and a light receiving portion.

The stepping motors 49L, 49C, and 49R of which rotating speeds each are proportional to the output number of pulses include a configuration that is capable of stopping a rotary shaft at a specified angle. Driving forces of the stepping motors 49L, 49C, and 49R are transmitted to the reels 3L, 3C, and 3R via gears with a predetermined deceleration ratio. Every time one pulse is outputted to the stepping motors 49L, 49C, and 49R, the reels 3L, 3C, and 3R spin at a predetermined angle.

Having thus detected the reel indexes, the main CPU 31 counts the output number of pules relative to the stepping motors 49L, 49C, and 49R, thereby managing a spinning angle of the reels 3L, 3C, and 3R. The main CPU 31 manages the spinning angle of the reels 3L, 3C, and 3R, thereby managing the respective positions of a plurality of symbols that are disposed on the surfaces of the reels 3L, 3C, and 3R.

A display unit driving circuit 48 controls an operation of a 7-segment indicator 53. In addition, a hopper driving circuit 41 controls an operation of a hopper 40. Further, a payout completion signal circuit 51 manages detection of a medal to be conducted by means of a medal detecting unit 40S that is provided in the hopper 40, and checks whether or not the medals ejected from the hopper 40 to the outside reaches a predetermined number of ejections.

A sub-control circuit 72 is electrically connected to a main control circuit 71, and conducts a process such as determination or execution of the contents of effect, based on a command that is transmitted from the main control circuit 71. To the control circuit 71, the liquid crystal display device 5, the speakers 9R and 9L, a lamp 140, and an actuator 19 are connected to thereby control operations thereof in accordance with a command that is transmitted from the main control circuit 71. It is to be noted that the lamp 140 includes LEDs 83, 8211*a*, 8221*a*, and 8234 or the like to be described later, and the actuator 19 includes a motor 94 or a solenoid to be described later. By means of such sub-control circuit 72, a variety of effect members including a movable effect members described hereinafter are controlled.

[Front Panel Configuration and Effect Member]

Figure 3:
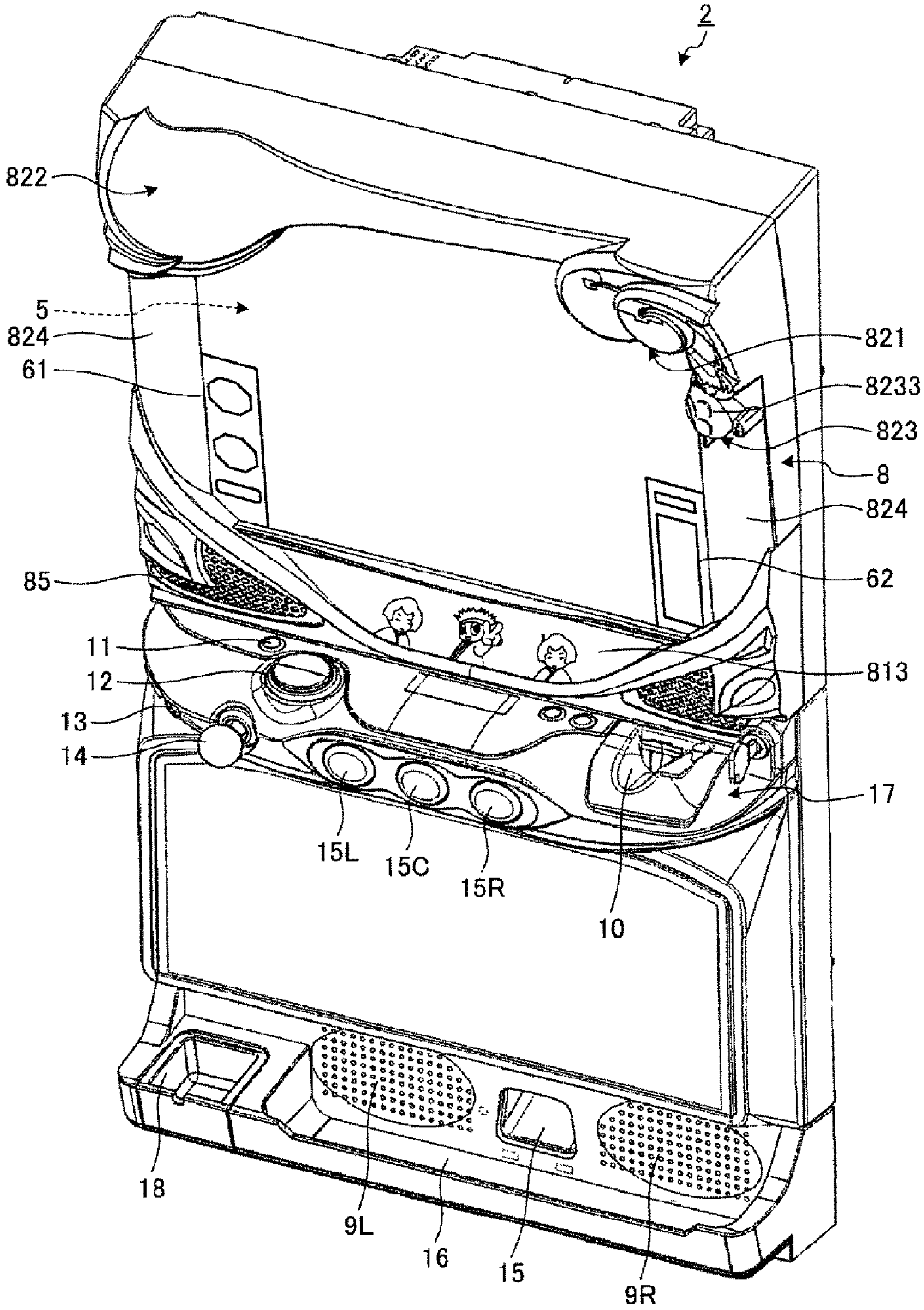
FIG. 3 is an illustrative view of a front door of the gaming machine according to the embodiment.
Figure 4:
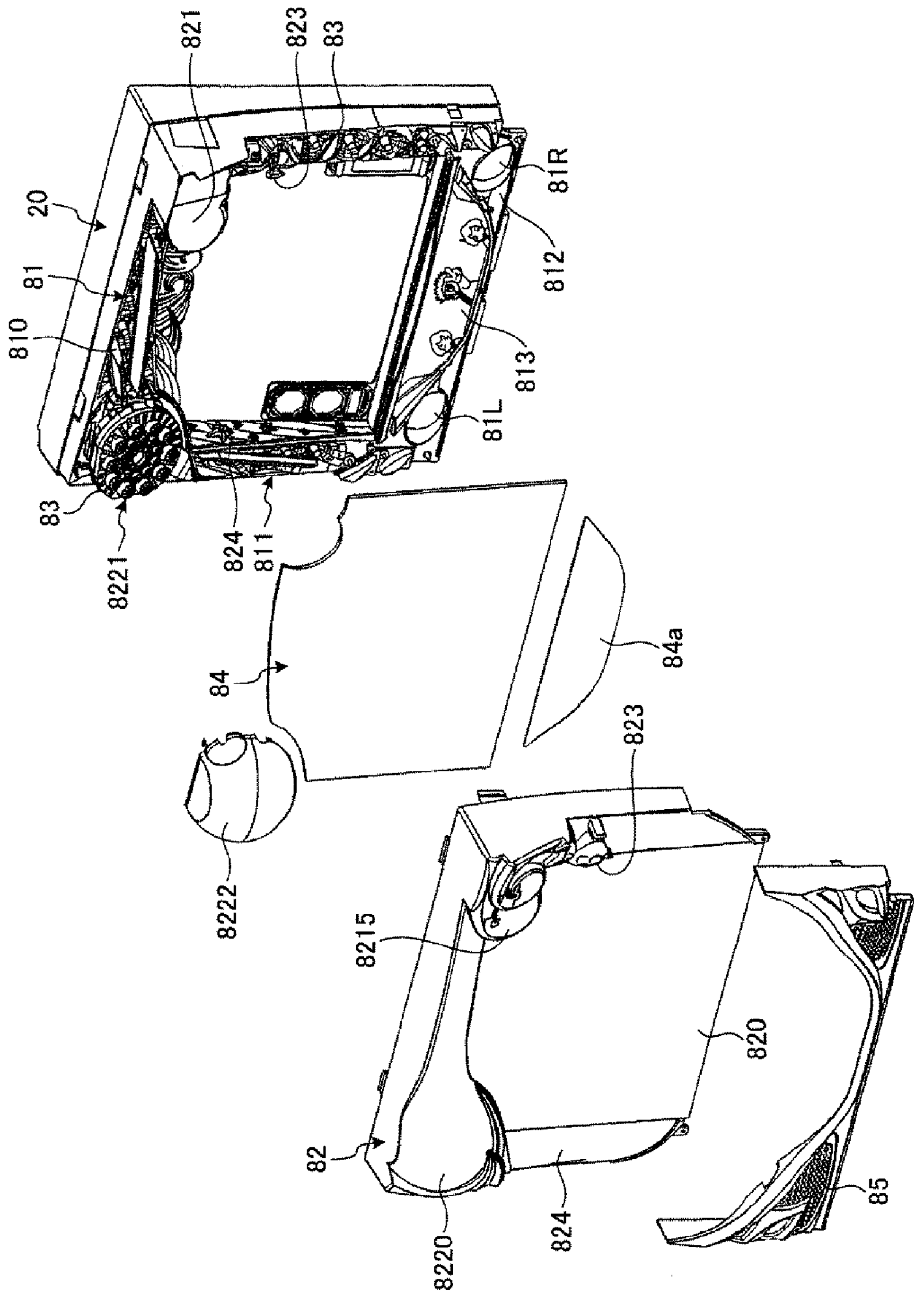
FIG. 4 is an exploded perspective view of a front door of the gaming machine according to the embodiment.
Figure 5:
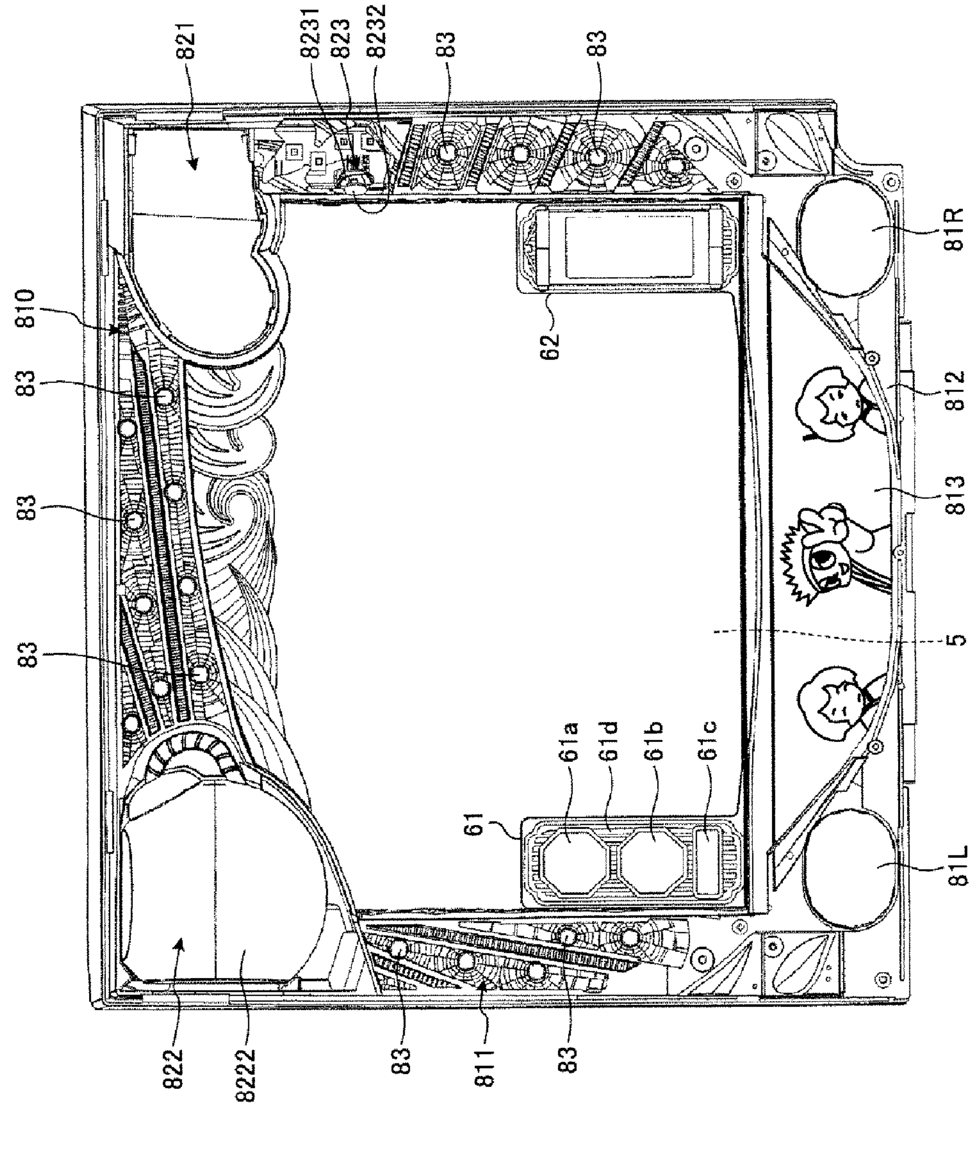
FIG. 5 is an illustrative view showing a state in which a cover body of the front panel of the gaming machine according to the embodiment is removed.
Figure 6:
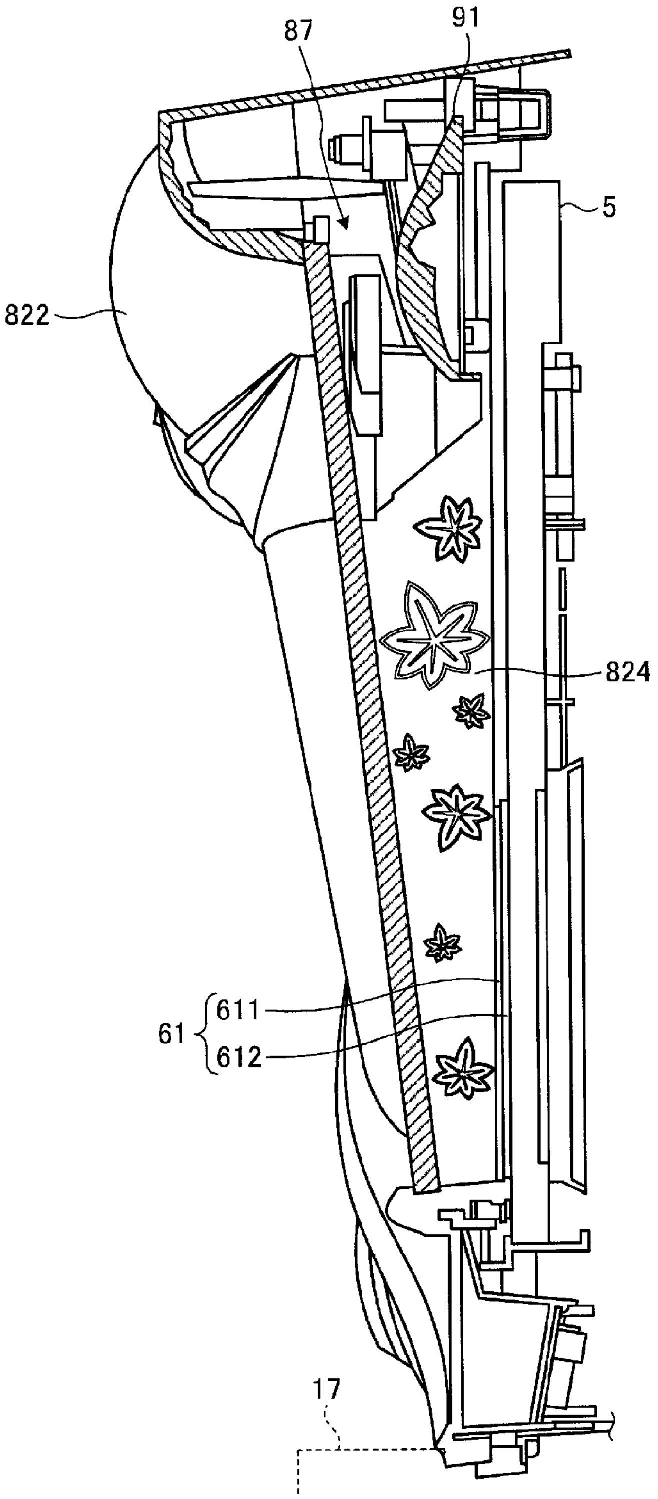
FIG. 6 is a longitudinal cross section of an upper halve of the front door of the gaming machine according to the embodiment.

The gaming machine 1 according to the embodiment includes a variety of effect members including a movable effect member, many of which are provided on the front panel 8. With reference to FIG. 3 to FIG. 6, first, the front panel 8 will be described. FIG. 3 is an illustrative view of the front door 2; FIG. 4 is an exploded perspective view of the front panel 8; FIG. 5 is an illustrative view showing a state in which a cover body 82 is removed from the front panel 8; and FIG. 6 is a longitudinal cross section of an upper half of the front door 2. It is to be noted that in FIG. 4 to FIG. 6, a lower half of the front door 2 is not shown.

The front panel 8 includes a decorative member or a variety of effect members, and is configured with an elaborate design, a lower end part of which is provided at an upper half of the door frame 20 of the front door 2 so as to communicate with a top face part of the base portion 17 on which the 1-BET button 11 and the MAX-BET button 12 or the like are arranged. While a detailed description will be given later, as shown in FIG. 3, those which are provided on the front panel 8 are: a first effect portion 821 in which tidal waves and ripples are combined with each other; a second effect portion 822 simulating a firework; a third effect portion 823 simulating a goldfish; and a fourth effect portion 824 in which red leaves appear or disappear due to light emission. On the front panel 8 according to the embodiment, the second effect portion 822 simulating a spherical firework having a configuration that protrudes most forward is disposed at an upper left side. In addition, while a detailed description will be given later, an effect panel 813 on which pictures are displayed in a variable manner according to turning ON or OFF of the lamp is provided at a lower part of the front panel 8.

In addition, as shown in FIG. 4, the front panel 8 includes: a frame-shaped panel board 81 that is fixedly provided at the door frame 20 of the front door 2; a cover body 82 for covering the frame-shaped panel board 81; and a first reinforced acrylic plate 84 and a second reinforced acrylic plate 84*a* having light transmission property as a hard plate body that is provided between the frame-shaped panel board 81 and the cover body 82. Further, as illustrated, at a lower part of the cover body 82, a decorative panel 85 for covering speaker arrangement holes 81L and 81R is mounted.

The frame-shaped panel board 81 is formed in the shape of a square frame by means of an upper frame portion 810, a left and right longitudinal frame portion 811, and a lower frame portion 812; and a plurality of LEDs 83 are appropriately arranged as required. In addition, at the lower frame portion 812, speaker arrangement holes 81L and 81R are formed. Further, the cover body 82 is formed of a molded article made of a resin having its light transmission property, and a protective plate 820 having its light transmission property is integrally formed. The protective plate 820 and the first reinforced acrylic plate 84 are capable of preventing an illegal act such as inserting a special cable for illegal use into a cabinet 1*a*. Further, the cover body 82 is integrally formed with the first effect portion 821 in which tidal waves and ripples are combined with each other; the second effect portion 822 simulating a firework; the third effect portion 823 simulating a goldfish; and the fourth effect portion 824 in which red leaves appear or disappear due to light emission; and therefore, a gap between the protective plate 820 and a decorative member or an effect member (such as the first effect member 821) that is provided around the protective plate 820 can be eliminated, and as a result, it is possible to prevent an illegal act such as inserting a special cable or the like into the cabinet 1*a*. Furthermore, the second reinforced acrylic plate 84*a* serves to cover a surface of the effect panel 813, thereby protecting the surface of the effect panel 813.

In addition, on the front panel 8 from which the cover body 82 is removed, as shown in FIG. 5, a half mirror portion 8222 covering an LED board portion 8221 (refer to FIG. 4) is provided at the left side of the upper frame portion 810 of the frame-shaped panel board 81. Therefore, when the frame-shaped panel board 81 is covered with the cover body 82 on which a cover portion 8220 with its design imaging a firework is formed, the second effect portion 822 simulating a firework is also formed. In addition, at the right side of the upper frame 810, an LED board 8211, an insulation sheet 8212, a first prism sheet 8213, and a second prism sheet 8214 are arranged in a laminated state (refer to FIG. 4). Therefore, when the frame-shaped panel board 81 is covered with the cover body 82 on which a cover 8215 that is designed so as to image tidal waves and ripples is formed, the first effect portion 821 simulating waves is also formed. In addition, on the right side of the left and right longitudinal frame portion 811, an internal structure of the third effect portion 823 having a white eye portion 8231 and a black eye portion 8232 (refer to FIG. 5) is provided at a slightly upper position from the center. Therefore, when the frame-shaped panel board 81 is covered with the cover body 82 on which a cover 8233 simulating a goldfish having a white eye and a black eye is formed, the third effect portion 823 simulating a goldfish is also formed. In addition, at the left and right of the lower frame portion 812, the speaker arrangement holes 81L and 81R are formed. In addition, at the center of the lower frame portion 812, the effect panel 813 is provided. Further, a plurality of LEDs 83 are arranged at the upper frame portion 810, the left and right longitudinal frame portion 811, and the lower frame portion 812. Moreover, a first decorative panel 61 and a second decorative pane 62 are arranged on a front face side of the liquid crystal display panel 5.

Further, as shown in FIG. 6, a torch-shaped movable member 91 is arranged in an effect member storage space 87 that is formed between an upper part of the front panel 8 and the liquid crystal display device 5. Moreover, on an inside face of the left and right longitudinal frame portion 811, the fourth effect portion 824 is provided in such a manner that red leaves appear or disappear due to light emission. In addition, a base portion 17 is provided at a front lower half of the front door 2, and the front panel 8 is provided at a front upper half of the front door 2 in such a manner that its lower end part communicates with an upper face depth part of the base portion 17. It is to be noted that the lower end part of the front panel 8 communicating with the upper face depth part of the base portion 17 indicates that members enabling the lower end part of the front panel 8 and the upper face depth part of the base portion 17 to be separated from each other may be adjacently disposed or may be integrally formed.

Figure 7:
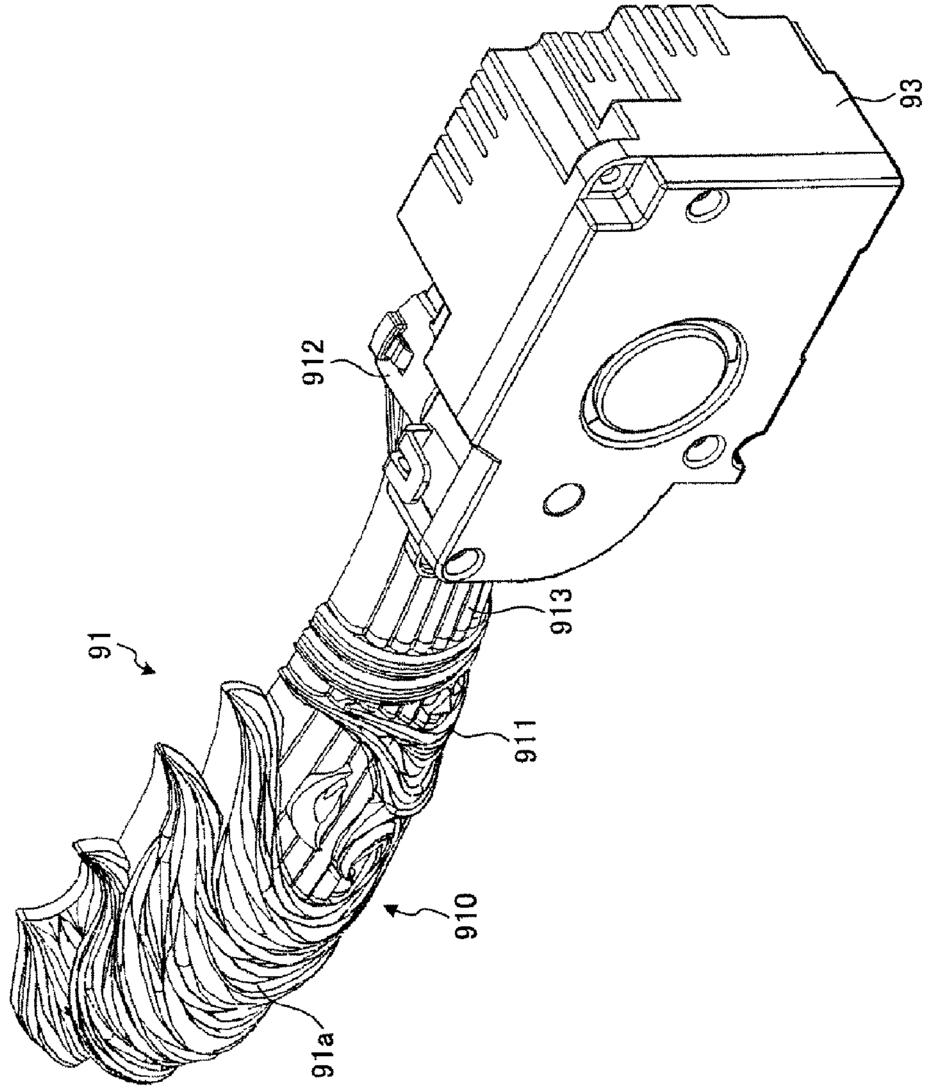
FIG. 7 is a perspective view of a movable effect member of the gaming machine according to the embodiment.
Figure 8:
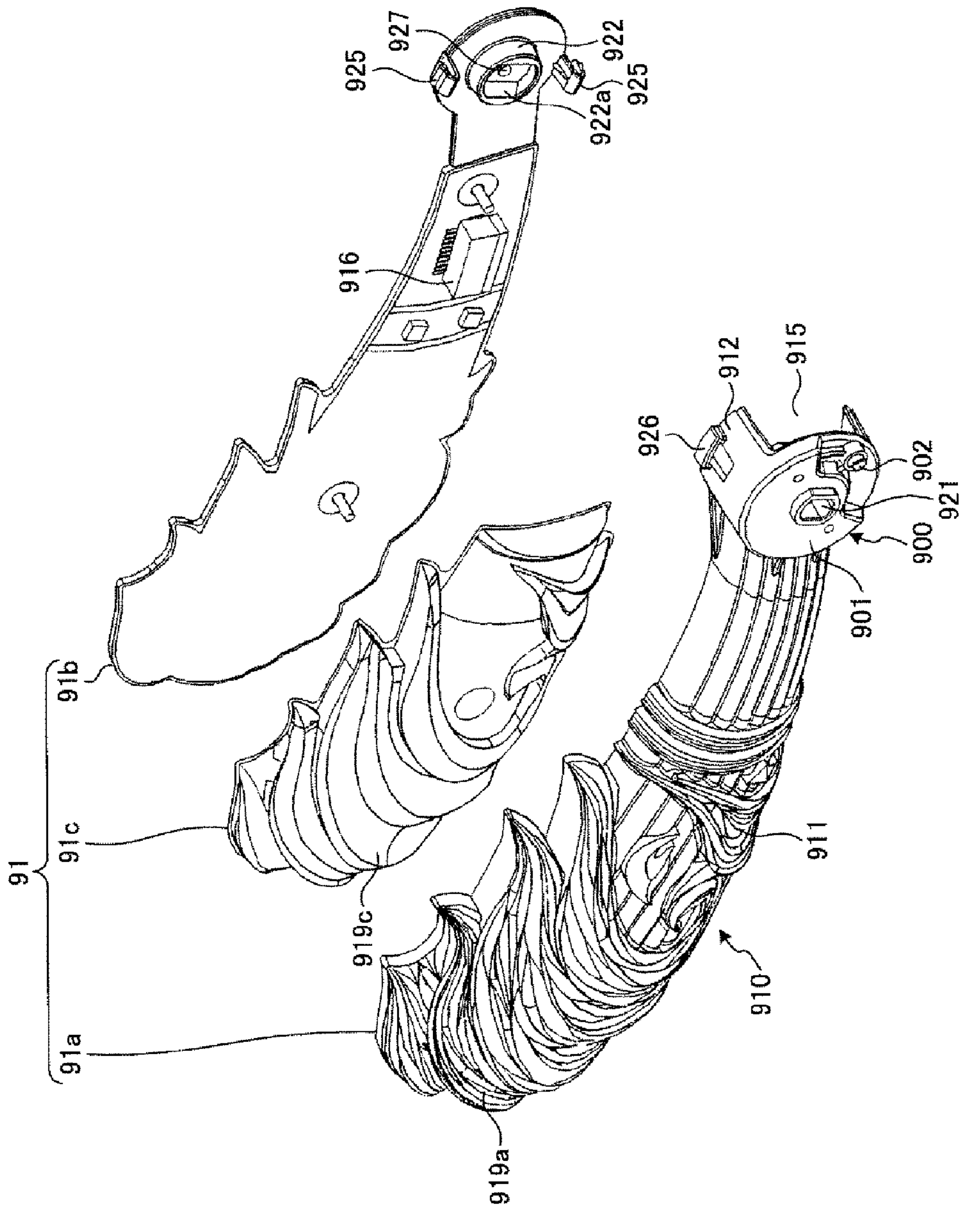
FIG. 8 is an exploded perspective view of the movable effect member of the gaming machine according to the embodiment.
Figure 9:
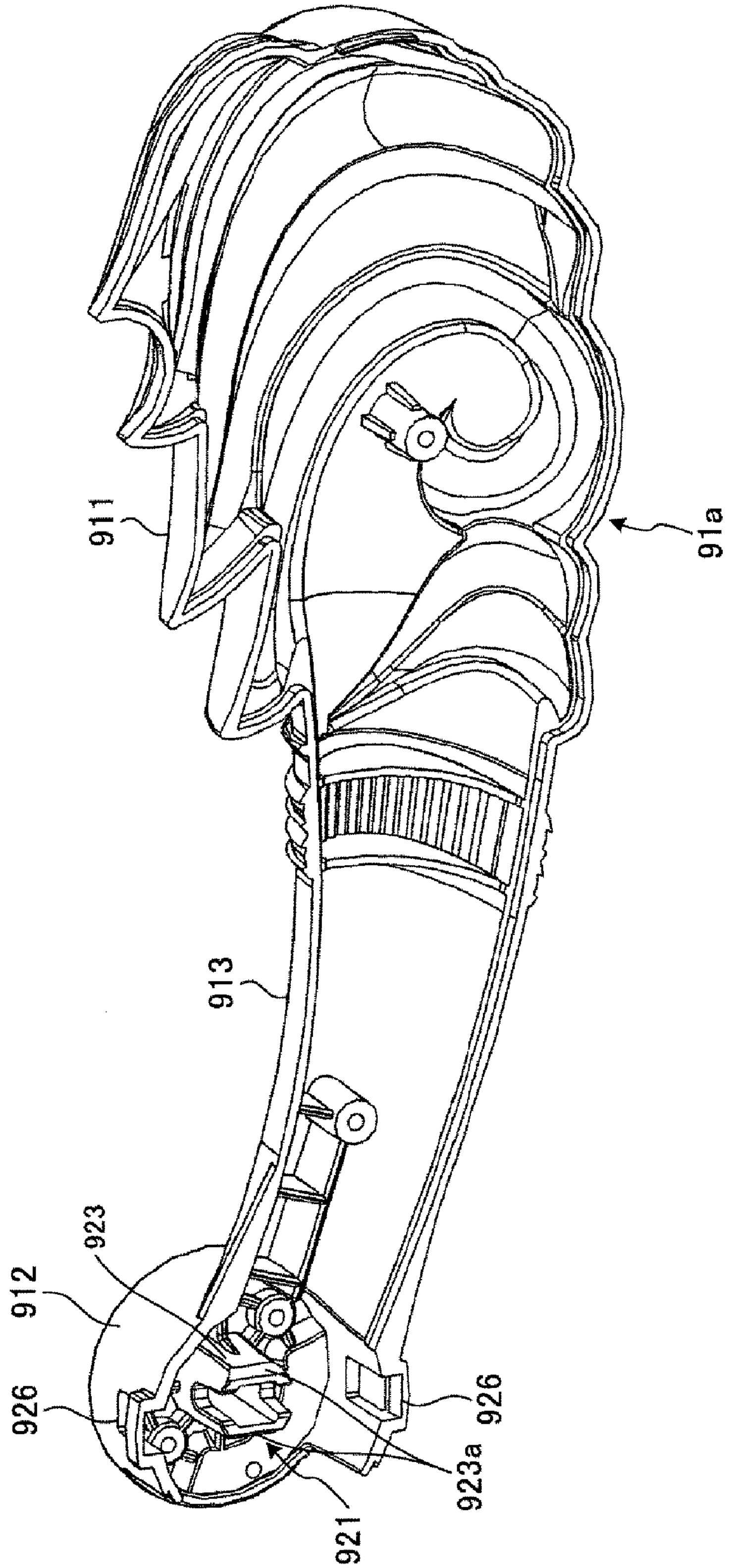
FIG. 9 is an illustrative view seen in rear view of an outer shell portion of the movable effect member of the gaming machine according to the embodiment.
Figure 10:
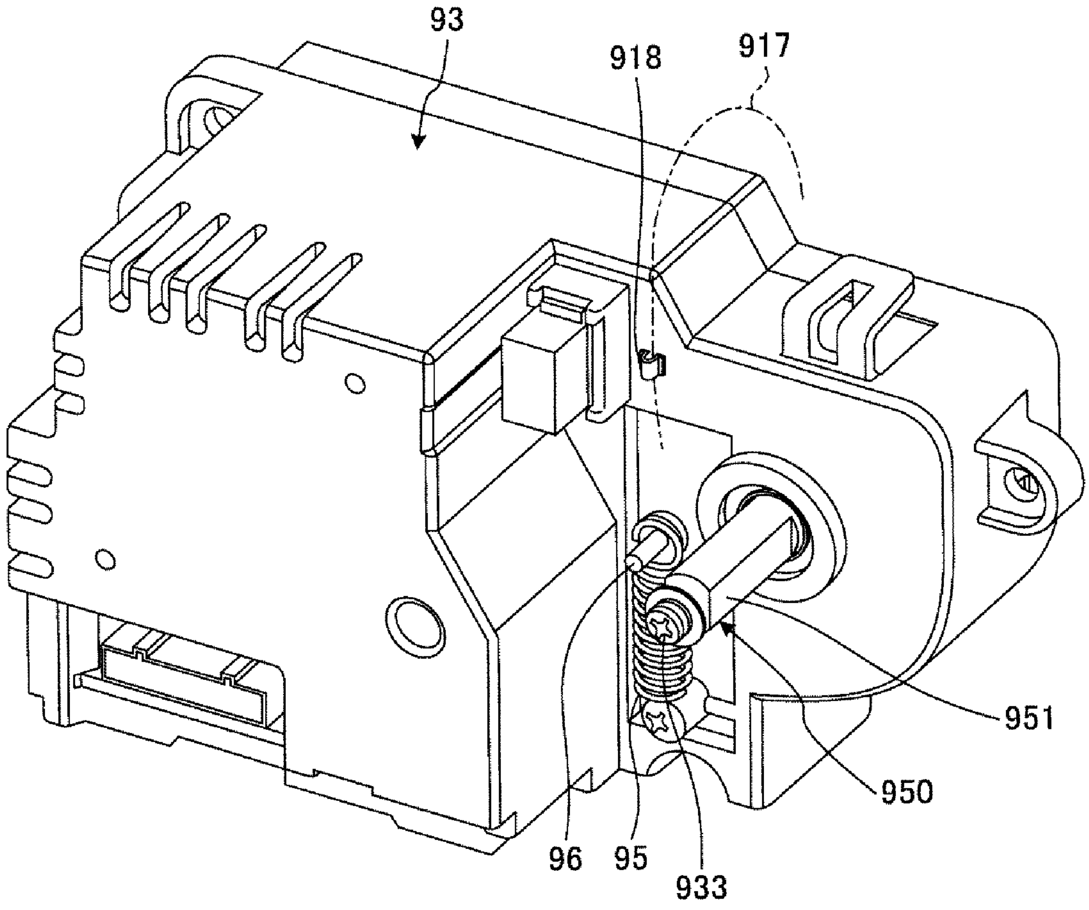
FIG. 10 is a perspective view of a driving unit case of the movable effect member of the gaming machine according to the embodiment.
Figure 11:
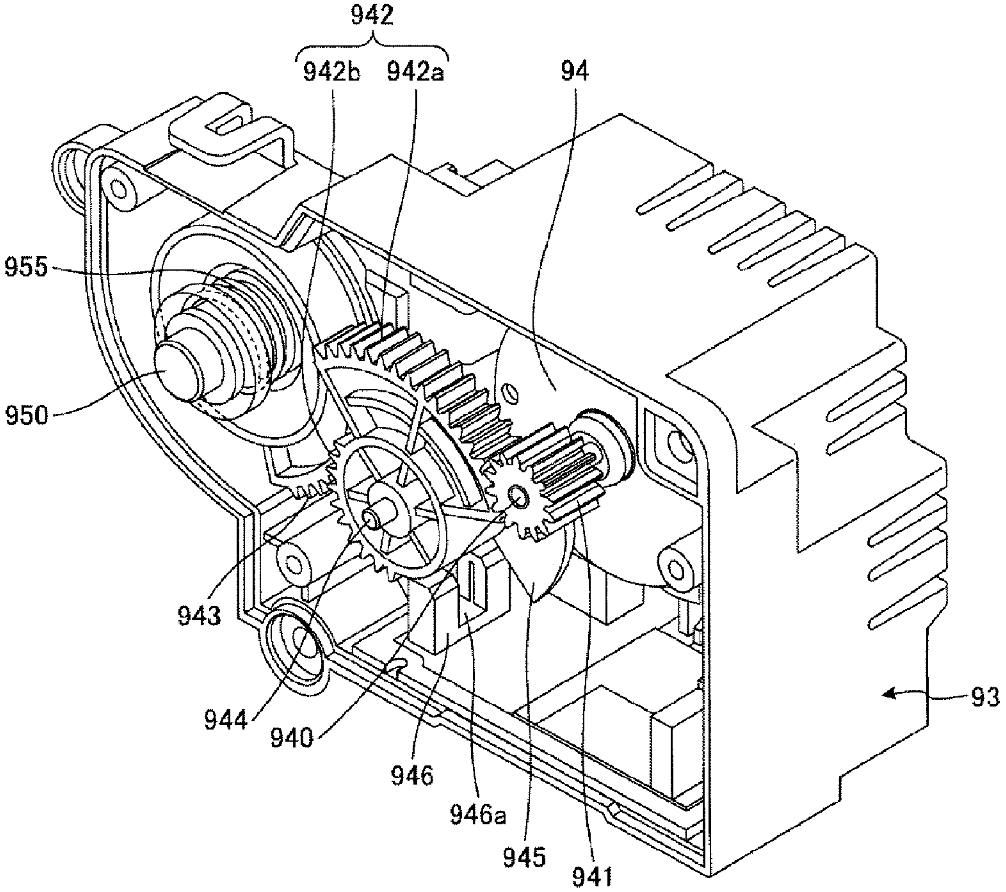
FIG. 11 is an illustrative view showing an internal structure of the movable unit case of the movable effect member of the gaming machine according to the embodiment.

Moreover, the gaming machine 1 according to the embodiment includes a torch-shaped movable member 91 as an example of the movable effect member. FIG. 7 is a perspective view of the torch-shaped movable member 91; FIG. 8 is an exploded perspective view of the torch-shaped movable member 91; FIG. 9 is an illustrative view of an outer shell portion of the torch-shaped movable member 91; FIG. 10 is a perspective view of a driving unit case 93 for driving the torch-shaped movable member 91; and FIG. 11 is an illustrative view showing an internal structure of the driving unit case 93.

The torch-shaped movable member 91 shown in FIG. 7 is arranged (refer to FIG. 13) in a vertically swingable manner via a bearing portion 92 that is provided at one end part in an effect member storage space 87 (refer to FIG. 6) that is provided between an upper part of the front panel 8 and the liquid crystal display device 5, and can be turned from an initial position at which its entirety is hidden behind a rear part of an upper side part of the front panel 8 up to a position at which its tip end portion covers part of the display screen 5*a* of the liquid crystal display device 5.

That is, the torch-shaped movable member 91 is formed of a rod-like body simulating a torch, one end part of which is pivotably coupled with the bearing portion 92, and extends substantially to its maximum in a transversely widthwise direction in the effect member storage space 87 that is formed at the rear part of the front panel 8. In addition, this movable member can be turned from an initial position to a lower side by a predetermined quantity by means of a motor 94 (refer to FIG. 11) serving as a driving source that is arranged in the driving unit case 93.

Thus, the torch-shaped movable member 91 is covered with the front panel 8 in a case where the member is at an initial position, cannot be visually recognized from a front face side, and can be first visually recognized by a player when the member is turned. Therefore, in a case where the torch-shaped movable member 91, the presence of which has not been noticed, suddenly gets into the field of view, a player who first plays a game at the gaming machine 1 will be surprised at and be strongly impressed with the fact, thus remarkably enhancing entertainment. In addition, in a case where the movement of the torch-shaped movable member 91 becomes a sign for moving to the stage of game favorable to a player, the player expects the movement of the torch-shaped movable member 91, and enhancement of entertainment can be expected. Further, it is possible to realize equipment of an attractive large-scaled movable effect member that is capable of attracting a player's attention in spite of a simple construction in which only one end part is pivotably coupled with an appropriate site. Moreover, an upper region of the reels 3L, 3C, and 3R on which the torch-shaped movable member 91 appears and a transparent region of the reels 3L, 3C, and 3R are the same regions, that is, no partition or the like is provided between the upper region of the reels 3L, 3C, and 3R on which the torch-shaped movable member 91 appears and the transparent region of the reels 3L, 3C, and 3R; and therefore, movement of the torch-shaped movable member 91 can be made real, and enhancement of entertainment can be further expected.

In addition, as shown in FIG. 8, the torch-shaped movable member 91 is made of: an outer shell portion 91*a* formed of a semitransparent member, a design of which is made such that torch light scatters; a board portion 91*b* on which a plurality of LEDs (not shown) are arranged as light emitting elements; and a prism sheet 91*c* for randomly reflecting light. At the outer shell portion 91*a*, a first boss portion 921 into which a turning shaft 950 of a motor 94 is to be inserted is formed. Further, at the board portion 91*b*, a second boss portion 922 to be engaged with the first boss portion 921 is formed.

In addition, as shown in FIG. 9, the first boss portion 921 of the outer shell portion 91*a* includes a pair of shaft pinching pieces 923 in which first tapered faces 923*a* tapered toward tip ends are respectively formed on outside faces. It is to be noted that a detailed description of construction of the torch-shaped movable member 91 will be given later.

FIG. 10 is a perspective view from a rear side of the driving unit case 93. As illustrated, in the driving unit case 93, a turning shaft 950 that is coupled to be interlocked with an incorporated motor 94 (refer to FIG. 11) is caused to protrude to a rear face. The turning shaft 950 is coupled with the torch-shaped movable member 91 by means of a fixing screw 933. In addition, on a rear face of the driving unit case 93, a coil spring 95 is provided for restoring the torch-shaped movable member 91 to its initial position.

Here, an internal structure of the driving unit case 93 for driving the torch-shaped movable member 91 will be described with reference to FIG. 11. As illustrated, in the driving unit case 93, a motor 94 and a deceleration mechanism are housed so as to transmit a driving force of this motor 94 to a turning shaft 950 coupled to the torch-shaped movable member 91 via a bearing portion 92. The deceleration mechanism includes: a pinion 941 that is mounted to a driving shaft 940 of the motor 94; an intermediate gear 942 that is geared with this pinion 941; and a follower gear 943 that is coupled with the turning shaft 950.

The intermediate gear 942 is mounted to an intermediate shaft 944, and is made of a large diameter portion 942*a* that is geared with the pinion 941 and a small diameter portion 942*b* that is smaller in diameter than the large diameter portion 942, and the small diameter portion 942*b* and the follower gear 943 are geared with each other. In addition, on a start end side of the large diameter portion 942*a* of the intermediate gear 942, a fan-shaped sensor plate 945 is formed, and on a lower side of the intermediate gear 942, a substantially U-shaped sensor 946 having a gap portion 946*a* is arranged. When the motor 94 is driven, if the sensor 945 is about to pass through the gap portion 945*a* of the sensor 946, the sensor 946 detects the passing so as to stop the motor 94. Therefore, a lower turning quantity of the torch-shaped movable member 91 can be set depending on how to form the sensor plate 945. It is to be noted that a pressure applying spring for restraining a rotating vibration of the turning shaft 950 is designated by reference numeral 955 in FIG. 11.

In addition, in order to restore the torch-shaped movable member 91 that is turned to a lower side to its initial position, as shown in FIG. 10, a coil spring 95 is arranged on a mount face of the torch-shaped movable member 91 in the driving unit case 93. The coil spring 95 at its lower end is coupled with the driving unit case 93 side, whereas the spring at its lower end is coupled with a proximal end portion 900 side of the torch-shaped movable member 91 via an engagingly lock pin 96. It is to be noted that the engaging lock pin 96 is engagingly fitted to a pin insert hole 902 that is provided on a bearing-formed face 901 of the proximal end portion 900 (refer to FIG. 8).

With such a construction, the motor 94 is driven, the torch-shaped movable member 91 is turned against a force of pulling the coil spring 95, and thereafter, if a driving force by means of the motor 94 is released and then the torch-shaped movable member 91 is set free, the torch-shaped movable member 91 is turned upward, and is restored to its initial position by means of a resilient force of the coil spring 95.

In the gaming machine 1 according to the embodiment, including the torch-shaped movable member 91 described above, as shown in FIG. 6, a degree of a forward protrusion of the front panel 8 is gradually reduced from an upper part to a lower part. That is, a second effect portion 822 simulating a firework, which is a maximum protrusion portion, is provided; the degree of forward protrusion is gradually reduced from an upper side on which the torch-shaped movable member 91 is positioned, to a top side of the base portion 17 on which a variety of control means such as a medal insertion slot 10, a 1-BET button 11, and a MAX-BET button 12 are disposed; and a space for improving operability of the control means is provided between the front panel 8 and the top part of the base portion 17. In this manner, a sufficient space is allocated so as to enable smooth medal insertion or smooth operation of a variety of buttons without any problem.

As a specific construction for forming the space described previously, the front panel 8, as shown in FIG. 6, forms a second effect portion 822 of a firework shape that is relatively the greatest degree of protrusion as an effect member. Moreover, on an upper back side of the front panel 8, an effect member storage space 87 for storing the torch-shaped movable member 91 is formed, and in the effect member storage space 87, in addition to a maximum thickness of the torch-shaped movable member 91, a predetermined backlash space is also provided so as not to come into contact with any other member during actuation. Therefore, of course, the maximum protrusion portion of the gaming machine 1 is formed at an upper part of the cover body 82, whereas an especially protrusive member or the like is not provided at a lower part of the front panel 8. That is, the cover body 82 is arranged at a front upper half of the front door 2 so that the degree of protrusion is gradually reduced from the upper part at which the maximum protrusion portion is formed to a lower end part, and the lower end part communicates with a top face of the base portion 17. Further, a first reinforced acrylic plate 84 that is mounted on a back side of this cover body 82 is arranged in a state in which an upper end part thereof is positioned at a maximum protrusion position of the first reinforced acrylic plate 84 itself, and a lower end part thereof is positioned at a minimum protrusion position.

Therefore, even if a variety of effect members are arranged on the front panel 8, a space adapted to enable smooth operation of a variety of buttons without any problem is formed upward of a top face of the base portion 17 as described previously, thus enabling a player to advance the play of game while enjoying an effect and with smooth operation.

Incidentally, a tilt angle of the first reinforced acrylic plate 84 may be defined at an angle at which a maximum thickness portion of the torch-shaped movable member 91 abuts against the first reinforced acrylic plate 84 at an upper position than that of a transparent region of the reels 3L, 3C, and 3R in the liquid crystal display device 5. The tilt angle of the first reinforced acrylic plate 84 is thus defined, whereby, for example, even in a case where the torch-shaped movable member 91 disengages and drops for any reason, visual recognition of the reels 3L, 3C, and 3R is not interfered.

in addition, in such a case where the tilt angle of the first reinforced acrylic plate 84 is defined at a predetermined angle, a thickness of a movable effect member can be defined. For example, the above thickness is defined in such a manner that the maximum thickness portion of the torch-shaped movable member 91 abuts against the first reinforced acrylic plate 84 at an upper position than that of the transparent region of the reels 3L, 3C, and 3R in the liquid crystal display device 5. With such a construction as well, in a case where the torch-shaped movable member 91 disengages and drops, visual recognition of the reels 3L, 3C, and 3R is not interfered similarly.

Here, a construction of the torch-shaped movable member 91 will be further described. As shown in FIG. 8, the torch-shaped movable member 91 is formed of a semitransparent member having fine irregularities, and includes: an outer shell portion 91*a* of which a design is made such that torch light scatters; and a board portion 91*b* which is mounted to a rear opening portion of this outer shell portion 91*a* and on which a plurality of LEDs (not shown) are arranged as light emitting elements. In addition, in the torch-shaped movable member 91, a bearing portion 92 is provided at a proximal end portion 900, a peripheral wall portion 912 surrounding the bearing portion 92 is formed at the outer shell portion 91*a*, and a connecting portion 913 and a design portion 911 are continuously formed so as to communicate with this peripheral wall portion 912.

As an LED which is a light emitting element, an orange LED is arranged at an edge part of the board portion 91*b*, and a red LED is arranged in a region other than the edge part.

In addition, between the outer shell portion 91*a* and the board portion 91*b*, a prism sheet 91*c* is arranged so that light emission from an LED is collected forward, luminance is improved, and the light is randomly reflected, thereby configuring an electrically decorative portion 910 serving as an effect main body portion that is capable of showing light emission from an LED more beautifully. That is, as shown in FIG. 8, on a surface of the prism sheet 91*c*, a first light refraction face 919*c* which is large in size based on a flame image is formed, and at the design portion 911 of the outer shell portion 91*a*, a second light refraction face 919*a* based on a torch flame image is formed to be finer than the first light refraction face 919*c*. Therefore, if an LED emits light, the torch-shaped movable member 91 can be visually recognized as if an actual torch were flaming, depending on a selected color and its disposition.

Thus, in the torch-shaped movable member 91 according to the embodiment, the design portion 911 (an effect main body portion) is formed as seen in an external view so as to communicate with the peripheral wall portion 912 that is provided at the proximal end part 900, and to emit light beautifully as if a torch were flaming.

In addition, at the peripheral wall portion 912 that is formed at the outer shell portion 91*a*, a lead-out space 915, part of which is cut out and formed, is provided. That is, as shown in FIG. 8, on the board portion 91*b* that configures this torch-shaped movable member 91, a power feeding connector 916 is arranged, and to the power feeding connector 916, one end of a harness 917 (refer to FIG. 10) electrically connecting to a cabinet 1*a* is connected. The lead-out space 915 for drawing such harness 917 is formed at the peripheral wall portion 912. In addition, the drawn harness at its tip end is extended in a temporarily loosely slackened state with some rings are made along an outer circumference of a second boss portion 922.

The lead-out space 915 is thus provided, whereby even if the torch-shaped movable member 91 swings and then the harness 917 is pulled, the harness 917 moves in the lead-out space 915 so as to follow movement of the torch-shaped movable member 91, and therefore, a large load is not applied to the harness 917, and a failure such as wire cutting can be prevented in advance. Moreover, the harness 917 that electrically connects to the connector 916 loosely makes some rings along the outer circumference of the second boss portion 922, thereby reducing a load exerted by being frequently pushed and pulled together with movement of a movable body. It is to be noted that in FIG. 8, reference numeral 925 designates an engagingly lock claw that is provided at the board portion 91*b*, and when the board portion 91*b* is attached to the outer shell portion 91*a*, this engagingly lock claw is engagingly locked with an engagement portion 926 that is provided at the outer shell portion 91*a*.

In addition, as shown in FIG. 10, a harness engagingly lock portion 918 for engagingly locking the harness 917 that extends from the lead-out space 915 is provided on a back face of the driving unit case 93 that is more proximal to a player than the bearing portion 92.

For example, in a case where one end of the harness 917 is provided as a unit after coupled with a connector 916 in advance, when the torch-shaped movable member 91 is mounted to the front door 2, the harness 917 that extends from a proximal end part 900 of the torch-shaped movable member 91 is temporarily engagingly locked with a harness engagingly lock portion 918, and thereafter, a tip end of the harness can be suspended on the cabinet 1*a* side that serves as a connection destination from an upper side of the driving unit case 93, making it possible to simplify the work of mounting the torch-shaped movable member 91 (movable member).

Figure 12:
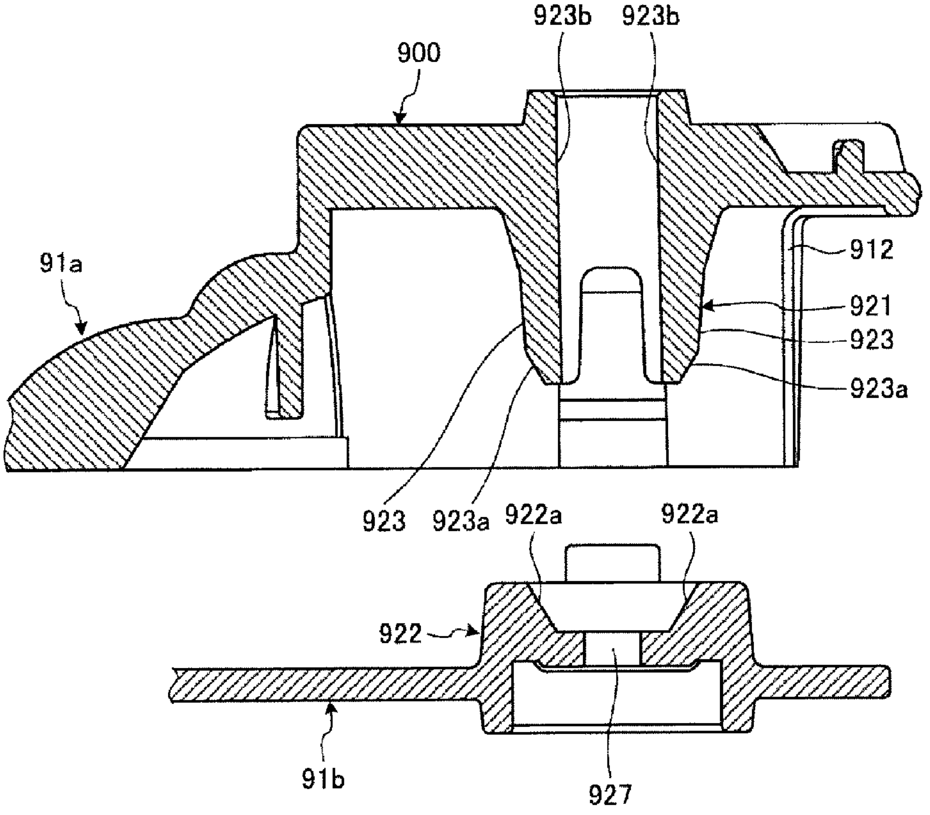
FIG. 12 is an illustrative view of a first boss portion and a second boss portion of the movable effect member of the gaming machine according to the embodiment.
Figure 13:
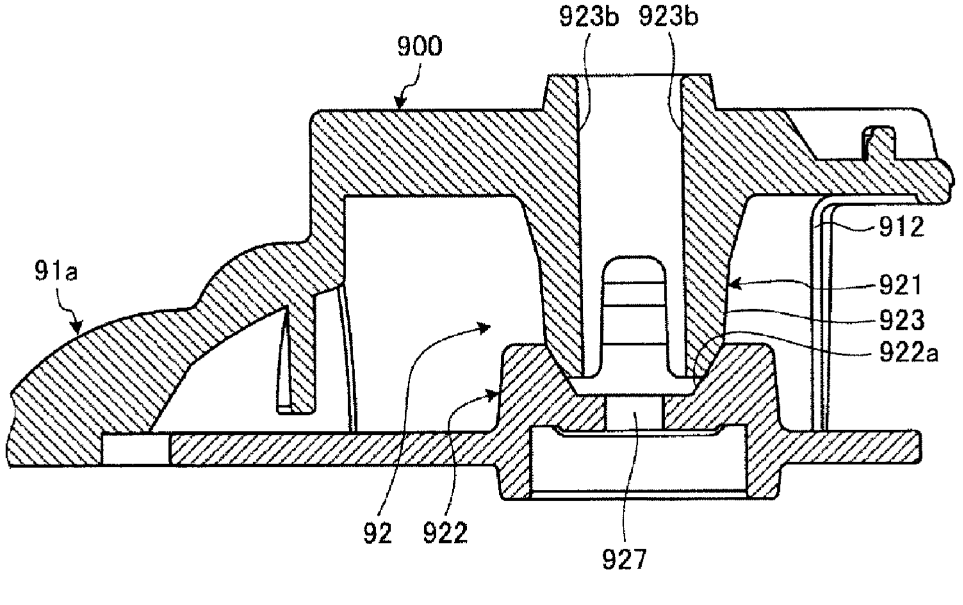
FIG. 13 is an illustrative view of a bearing portion of the movable effect member of the gaming machine according to the embodiment.

Here, a configuration of the bearing portion 92 employed to couple the torch-shaped movable member 91 with the front door 2 in a swingable manner will be described. FIG. 12 is an illustrative view of a first boss portion 921 and a second boss portion 922 that configure a bearing portion 92 of the torch-shaped movable member 91, and FIG. 13 is an illustrative view of the bearing portion 92.

As shown in FIG. 8 and FIG. 9 and FIG. 12 and FIG. 13, the bearing portion 92 is made of: the first boss portion 921 which is provided at the outer shell portion 91*a*, and into which the turning shaft 950 of the motor 94 is to be inserted; and the second boss portion 922 that is provided at the board portion 91*b*, and that engages with the first boss portion 921.

The first boss portion 921 includes a pair of shaft pinching pieces 923 in which first tapered faces 923*a* tapered toward to top ends are respectively formed on outside faces. On the other hand, in the second boss portion 922, a second tapered face 922*a* abutting against the first tapered face 923*a* is formed on an inside face.

With such a construction, when the torch-shaped movable member 91 is mounted to the front door 2, first, the turning shaft 950 is inserted through the first boss portion 921 that is provided at the outer shell portion 91*a*, and in such a state if the board portion 91*b* is attached to the outer shell portion 91*a*, a pair of shaft pinching pieces 923 and 923 can be compressed inward by means of the second tapered face 922*a*, and by means of its compression force, the turning shaft 950 can be firmly pinched and compressed.

In the turning shaft 950 of the embodiment, as shown in FIG. 10, flat face portions 951 corresponding to a pair of shaft pinching pieces 923 and 923 are respectively chambered and formed on shaft circumferential faces so as to enable the turning shaft 950 to be reliably pinched between and compressed by means of the shaft pinching pieces 923 and 923. It is to be noted that in FIG. 10, reference numeral 933 designates a fixing screw for coupling the turning shaft 950 and the torch-shaped movable member 91 with each other, and after the turning shaft 950 has been inserted into the bearing portion 92, this fixing screw is helically fitted to the turning shaft 950 via a screw hole 927 that is provided at the second boss portion 922 of the board portion 91*b* (refer to FIG. 8, FIG. 10, and FIG. 11).

The torch-shaped movable member 91 according to the embodiment has the structure described above, and thus, a backlash can be restrained to its required maximum between the turning shaft 950 and the bearing portion 92, and the torch-shaped movable member 91 does not deviate from a movable range as designed. Therefore, there would be no apprehension that a tip end of the torch-shaped movable member 91 gets into a transparent region of the reels 3L, 3C, and 3R in the liquid crystal display device 5 due to a backlash, and visibility of symbols of the reels 3L, 3C, and 3R is degraded, and for example, there would be no apprehension that operation of the stop buttons 15L, 15C, and 15R is interfered due to interruption of the field of a player's view relative to the reels 3L, 3C, and 3R. Further, by restraining a backlash to its required maximum, it becomes easy to match a driving riming of the torch-shaped movable member 91 and a display timing of an effect image by means of the liquid crystal display device 5 each other. That is, there would be no apprehension that an interlocking timing of both parties is shifted, and a stage effect is degraded.

Incidentally, while, in a case where the torch-shaped movable member 91 is mounted to the front door 2, the turning shaft 950 is inserted through the first boss portion 921 that is provided at the outer shell portion 91*a*, and thereafter, the board portion 91*b* is attached to the outer shell portion 91*a*, as described previously, as long as the torch-shaped movable member 91 is provided as a unit in which one end of the harness 917 is coupled with the connector 916 in advance, the turning shaft 950 can be firmly coupled with the bearing portion 92 even in a state in which the board portion 91*b* and the outer shell portion 91*a* are assembled and integrated with each other in advance.

Thus, in the shaft pinching piece 923 of the first boss portion 921, it is sufficient if a third tapered face 923*b* is formed on an inside face so that at least a tip end portion broadens as the turning shaft 950 is inserted. With such a construction, when the turning shaft 950 is inserted through the bearing portion 92, the shaft pinching piece 923 is compressed outward, a caulking engagement is formed between the first boss portion 921 and the second boss portion 922, and in this case as well, the turning shaft 950 can be reliably pinched between and compressed by means of the shaft pinching pieces 923 and 923. In addition, if the outer shell portion 91*a* and the board portion 91*b* are separated from each other, the harness 917 may be geared when the board portion 91*b* is mounted, and however, there would be no such possibility as long as the torch-shaped movable member 91 is provided as a unit.

Next, a decorative panel which is one of the characterizing effect members of the gaming machine 1 according to the embodiment will be described.

Figure 14A:
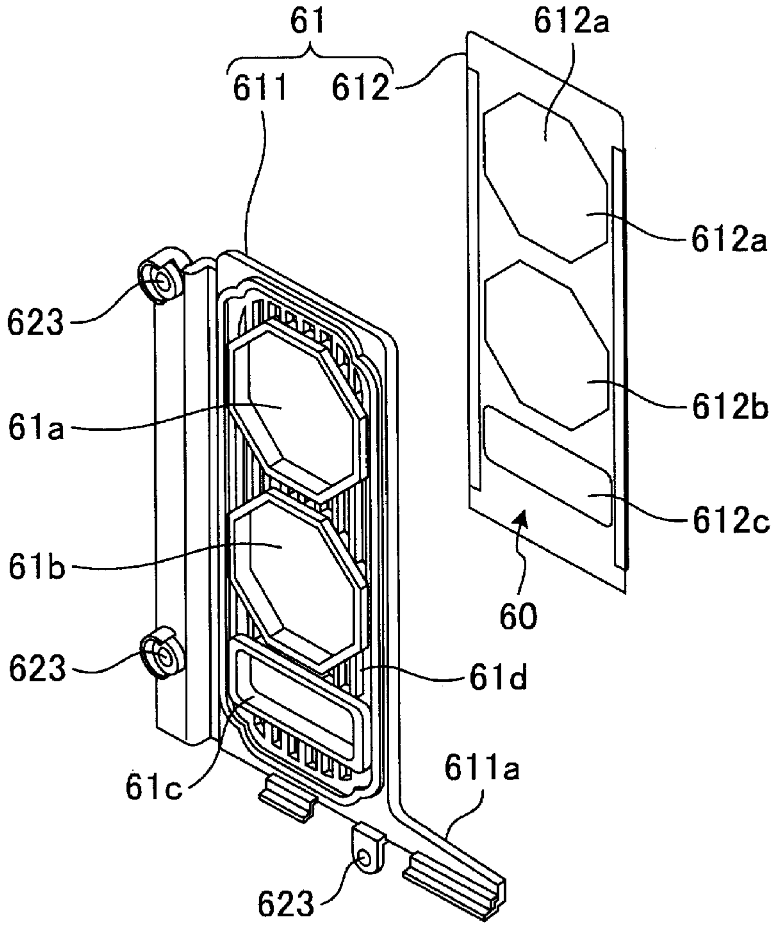
FIG. 14A is an illustrative view when it is seen from a front side of a first decorative panel of the gaming machine according to the embodiment.
Figure 14B:
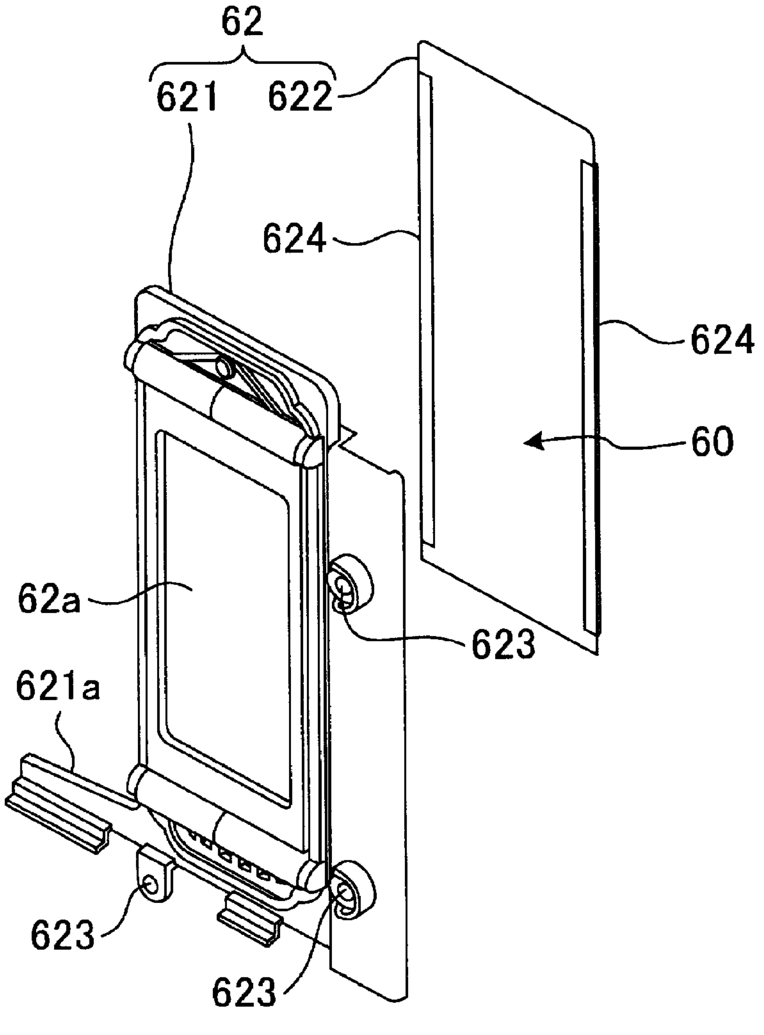
FIG. 14B is an illustrative view when it is seen from a front side of a second decorative panel of the gaming machine according to the embodiment.
Figure 15A:
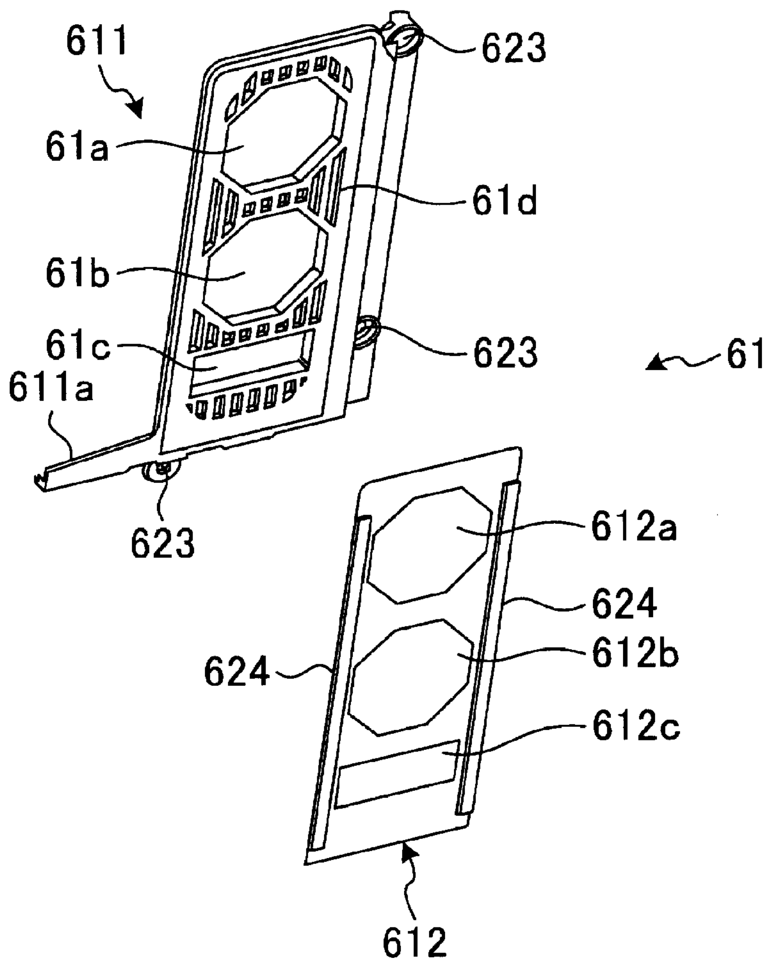
FIG. 15A is an illustrative view when it is seen front a rear side of the first decorative panel of the gaming machine according to the embodiment.
Figure 15B:
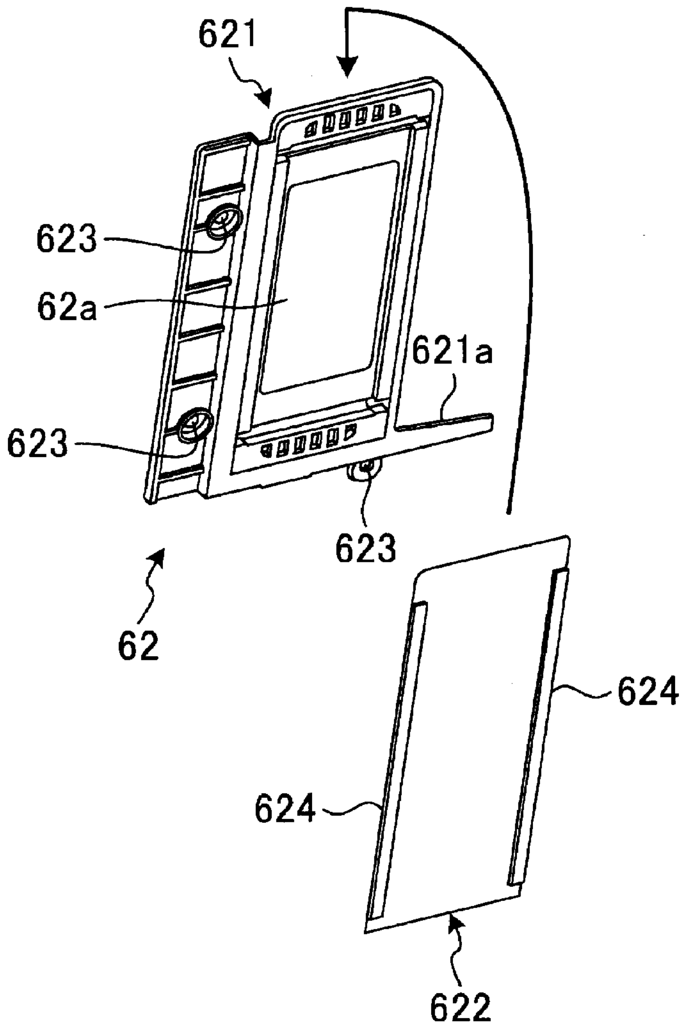
FIG. 15B is an illustrative view when it is seen from a rear side of the second decorative panel of the gaming machine according to the embodiment.

First, the above decorative panel will be described with reference to FIG. 5 and FIG. 6 and FIG. 14 and FIG. 15. FIG. 14A is an illustrative view when seen from a front face side of a first decorative panel 61 forming essential portions of the embodiment; FIG. 14B is an illustrative view when seen from a front face side of a second decorative panel 62 similarly; FIG. 15A is an illustrative view when seen a rear side of the first decorative panel 61; and FIG. 15B is an illustrative view when seen from a rear side of the second decorative panel 62.

A decorative panel included in the gaming machine 1 of the embodiment is arranged on a front face side of the liquid crystal display device 5, and as shown in FIG. 5 and FIG. 6 and FIG. 14 and FIG. 15, there are two different types of decorative panels, i.e., a first decorative panel 61 and a second decorative panel 62. The first decorative panel 61 and the second decorative panel 62 are disposed to be spaced from each other on the left and right sides of the liquid crystal display device 5, and as shown in FIG. 14 and FIG. 15, each of the first decorative panel 61 and the second decorative panel 62 is made of: decorative frames 611 and 621 for which a predetermined design is made; and soft Japanese paper portions 612 and 622 formed in a substantially rectangular shape with its size suitable for the decorative frames 611 and 612. The first decorative panel 61 in the embodiment is of a decorative window type of which a plurality of window portions 61*a*, 61*b*, and 61*c* and a paper sliding door portion 61*d* are formed at a longitudinally elongated decorative frame 611, whereas the second decorative panel 62 is of a hanging scroll type of which a hanging scroll is arranged at an longitudinal elongated decorative frame 621.

It is preferable that a design for decorative panel be associated with an image displayed as an effect by means of the liquid crystal display device 5, and the first decorative panel 61 and the second decorative panel 62 are made different from each other in their external view according to an effect display, whereby in the light of their external view and effect also, a player's interest for the play of game can be aroused more.

In addition, in each of the first and second decorative panels 61 and 62, a player can visualize an image (not shown) that is displayed on a display screen 5*a* of the liquid crystal display device 5, via the Japanese paper portions 612 and 622. That is, the image or the like of the display screen 5*a* can be obscurely visually recognized by a player by transmitting the Japanese paper portions 612 and 622 having a texture unique to Japanese paper. Therefore, a variety of images including a texture that is hardly expressed only by the display screen 5*a* of the liquid crystal display device 5 can be displayed. In addition, even if a similar image or character is displayed all over the region of the display screen 5*a*, the images in regions in which the first and second decorative panels 61 and 62 are arranged are visualized via the Japanese paper portions 612 and 622, thus making it possible to easily achieve different tastes of display while in the same display screen 5*a*.

At the Japanese paper portion 612 of the first decorative panel 61, as illustrated, opening portions 612*a*, 612*b*, and 612*c* are formed corresponding to a plurality of window portions 61*a*, 61*b*, and 61*c* that are formed at the decorative frame 611, and a portion other than these opening portions 612*a*, 612*b*, and 612*c* is superimposed on the paper sliding door portion 61*d*. Therefore, an image display that is visualized through a Japanese paper texture is possible only via the paper sliding door portion 61*d* in the first decorative panel 61. On the other hand, the Japanese paper portion 622 of the second decorative panel 62 is formed in the shape of a rectangular plate, as illustrated, and is superimposed on a hollowed-out portion 62*a* that is equivalent to a main paper portion of a hanging scroll that is formed at the decorative frame 621, thus making it possible to provide an image display visualized through a Japanese paper texture in a wide region equivalent to the main paper portion of the hanging scroll.

Here, a characterizing construction of the decorative panel described above is characterized in that a simulative Japanese paper face 60 having the Japanese paper portions 612 and 622 of the first and second decorative panels 61 and 62 expressed as a Japanese paper pattern (refer to FIG. 18) is formed by means of printing on one side face of a substrate made of a light transmission material such as an acrylic plate.

Figure 18:
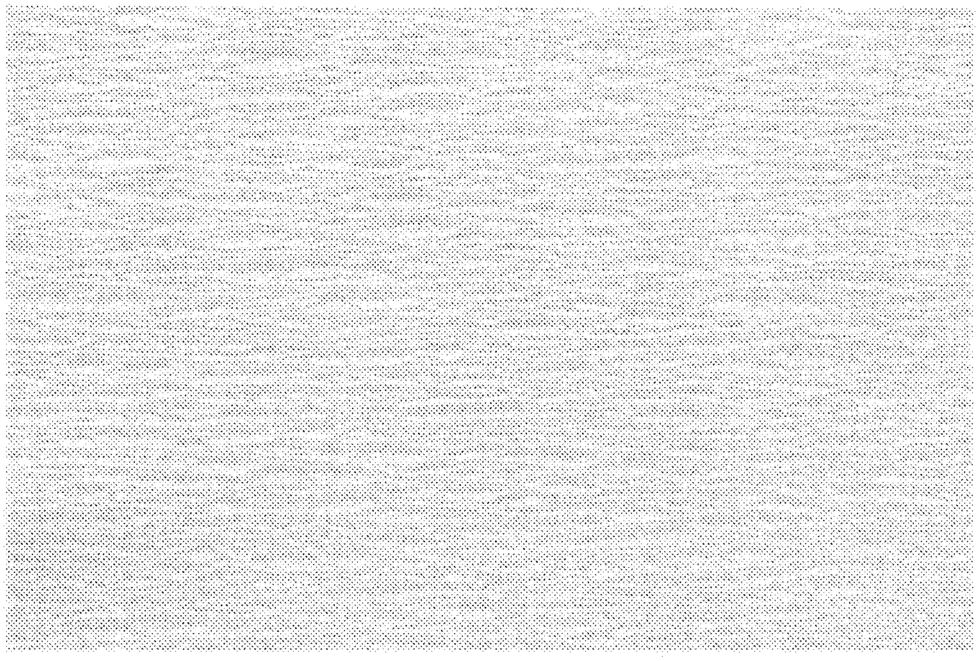
FIG. 18 is an illustrative view of a simulative Japanese traditional paper face included in a decorative panel of the gaming machine according to the embodiment.

Since Japanese paper has a fiber which is much longer than Western paper, and employs a unique Japanese papermaking technique called "Nagashi-Zuki", it has a unique texture made of irregularities or shading as seen in a tie-dyed pattern called "Shibori", as shown in FIG. 18. In reproducing such Japanese paper pattern, the Inventor found out that the shading or the like of the Japanese paper pattern as shown in FIG. 18 can be reproduced in real by means of printing on a transparent substrate with the use of three types of inks made of a white ink, a transparent ink, and a third ink of an intermediate color that is an intermediate color of these two inks.

Therefore, in forming a simulative Japanese paper face 60, first, a Japanese paper pattern is reproduced based on a Japanese paper image obtained by acquiring actual Japanese paper by means of a scanner, and a white ink, a transparent ink, and an intermediate-color ink of intermediate color of these two inks were printed to be superimposed in a layered manner in appropriate sequential order on a transparent substrate. For example, if a white ink, a white transparent (intermediate color) ink, and a transparent ink are printed in a layered manner in sequential order, an ordinary Japanese paper pattern is produced. In addition, a transparent ink, a white transparent ink, and a white ink are printed to be superimposed in a layered manner in sequential order, the shading of a white portion occurs, and white becomes conspicuous. If a transparent ink, a white transparent ink, a white ink, a white transparent ink, and a transparent ink are printed to be superimposed in a layered shape in sequential order, white becomes striking and more conspicuous. If a white transparent ink, a white ink, and a transparent ink are printed to be superimposed in a layered manner in sequential order, white becomes conspicuous.

Thus, a Japanese paper image is acquired by means of a scanner, and based on the acquired image, printing is conducted with the use of three-color inks, and thereafter, if a Japanese paper pattern is produced on a simulative Japanese paper face 60, the produced Japan paper pattern becomes as if it were an actual Japanese paper pattern in spite of the fact that an ordinary ink is employed, and a Japanese paper pattern is finely reproduced as if actual Japanese paper were employed.

Therefore, an image display having a special texture as if it were visualized through Japanese paper becomes possible. Moreover, unlike actual Japanese paper, the Japanese paper portions 612 and 622 are not degraded in quality with the elapse of time, and thus, transmittance does not lower. Therefore, even in a gaming facility (such as a Pachinko facility) with an environment filled with smoker's smoke or the like, a new effect utilizing a texture unique to Japanese paper becomes possible for a long period of time.

In addition, in order to arrange the first and second decorative panels 61 and 62 on a front face side of the liquid crystal display device 5, part of each of the first and second decorative panels 61 and 62 is fixed while it is inserted between the liquid crystal display device 5 and the front panel 8. Further, the Japanese paper portions 612 and 622 are sandwiched between the decorative frames 611 and 621 and the liquid crystal display device 5.

That is, as shown in FIG. 14 and FIG. 15, at a lower end edge of each of the decorative frames 611 and 612, insert pieces 611*a* and 621*a* whose length is substantially ½ of a transverse width of the decorative frames 611 and 621 are formed to be extended in the same face as the surface of the decorative frame 611 and 621.

Further, with the Japanese paper portions 612 and 622 being interposed between the decorative frames 611 and 612 and the liquid crystal display device 5, the insert pieces 611*a* and 621*a* are inserted between the liquid crystal display device 5 and the front panel 8 and then the inserted pieces are appropriately provided at the decorative frames 611 and 621, and are screw-tightened via a screw insert portion 623, thereby making it possible to easily mount the first and second decorative panels 61 and 62 to the gaming machine 1 such as a pachi-slot machine as introduced in the embodiment. While, in the decorative frames 611 and 621 of the embodiment, the screw insert portions 623 are formed at a side edge portion and a lower edge portion, its quantity and positions to be formed or the like may be appropriately determined.

At this time, at the Japanese paper portions 612 and 622, spacers 624 are arranged to prevent the Japanese paper portions 612 and 622 from coming into direct contact with the display screen 5*a* of the liquid crystal display device 5 and to prevent each simulative Japanese paper face 60 from coming into direct contact with the decorative frames 611 and 621. The spacers 624 are respectively provided at the left and right side edges of the Japanese paper portions 612 and 622 that are formed in the shape of a longitudinally elongated substantial rectangle. In order to stably retain the Japanese paper portions 612 and 622, it is preferable that the spacers 624 should be formed of a flexible material such as a sponge material, and that its length should be defined on the same order as a substantial full length of the left and right side edges of the Japanese paper portions 612 and 622.

With such a construction, it is possible to prevent the simulative Japanese paper face 60 from being worn out and damaged due to abutment against the decorative frame 611 and 621 and to prevent the display screen 5*a* of the liquid crystal display device 5 from being worn out and damaged by the Japanese paper portions 612 and 622.

Figure 16:
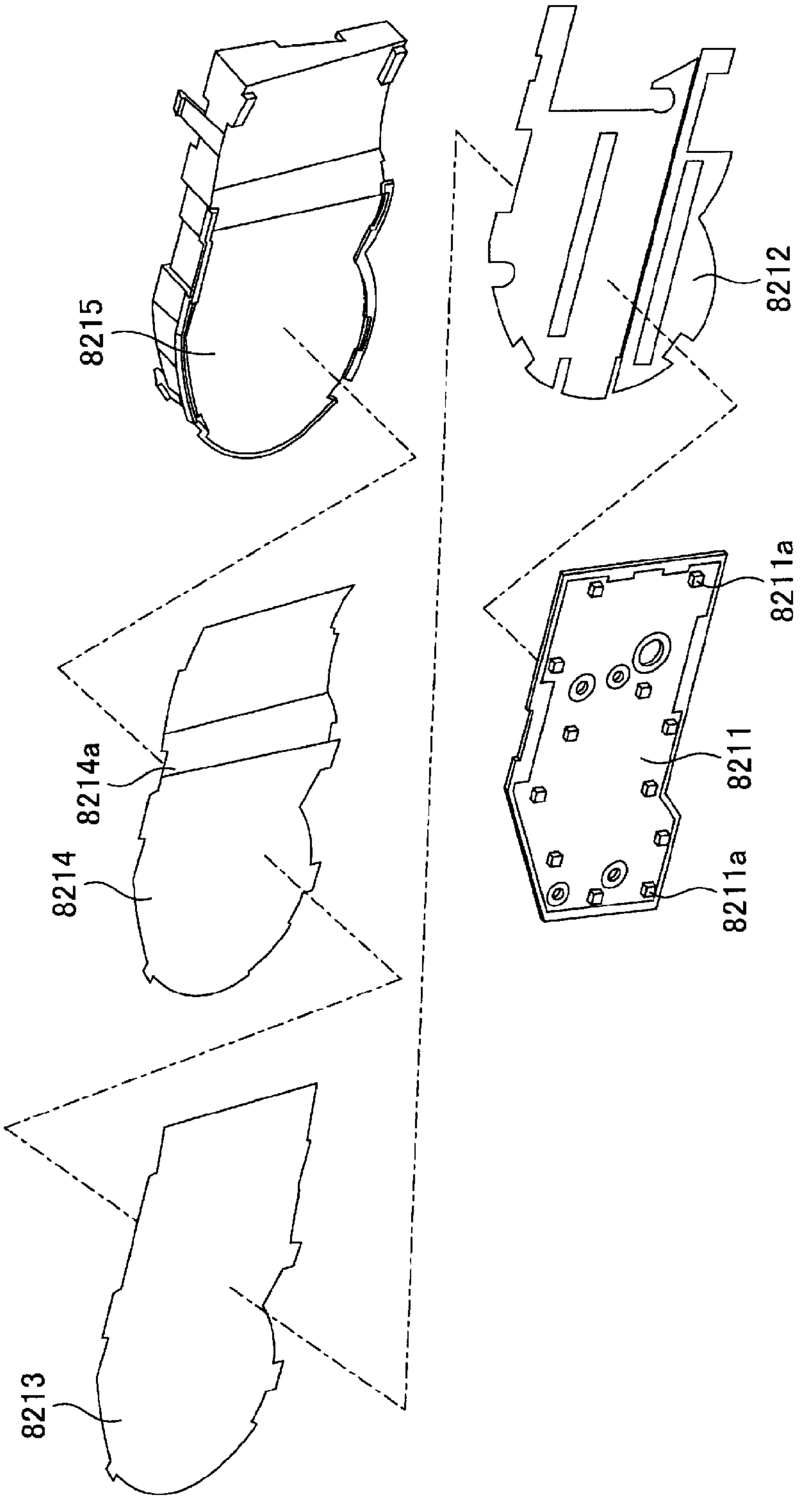
FIG. 16 is an illustrative view of another effect member of the gaming machine according to the embodiment.
Figure 17:
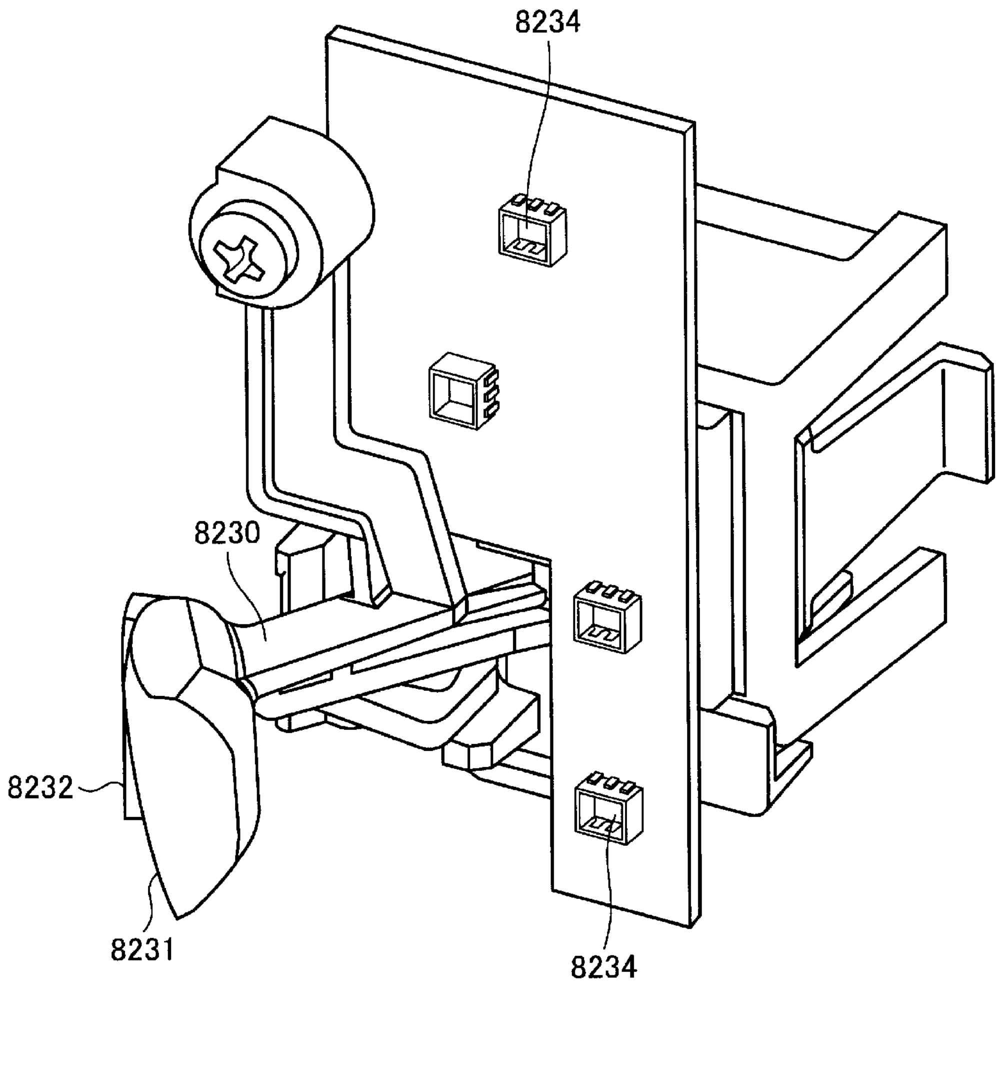
FIG. 17 is an illustrative view of another effect member of the gaming machine according to the embodiment.

Next, first to fourth effect portions 821 to 824 made of other effect members included in the gaming machine 1 according to the embodiment will be described. FIG. 16 is an illustrative view of the first effect portion 821, and FIG. 17 is an illustrative view of the third effect portion 823.

The first effect portion 821 shown in FIG. 16 is formed in such a fashion as to image waves (refer to FIG. 3), and is shaped such that tidal waves and ripples are combined with each other. This first effect portion 821 includes, in sequential order from a bottom side, an LED board 8211 on which a plurality of LEDs 8211*a* (some of which are not shown in FIG. 16); an insulation sheet 8212; a first prism sheet 8213; a second prism sheet 8214; and a cover 8215 that is designed so as to image tidal waves and ripples.

This first effect portion 821 includes the first prism sheet 8213 and further the second prism sheet 8214 so as to be thereby able to express an image that waves roll and tidal waves and ripples appear. That is, on a surface of the transparent cover 8215, an image of tidal waves and ripples are figuratively designed and then a flat sheet is employed for the first prism sheet 8213, whereas a step portion 8214*a* is formed therefor and then the second prism sheet 8214 whose shape is similar to that of the cover 8215 is combined.

These LEDs 8211*a* are merely controlled to emit light in sequential order from one side, whereby a wavy image is produced, and roll of waves is expressed by viewing light through the first prism sheet 8213, the second prism sheet 8214, and the cover 8215, making it possible to effectively express a wavy pattern in which tidal waves and ripples appear.

In addition, the second effect portion 822 simulates a firework, as described previously, (refer to FIG. 5), and as shown in FIG. 4, this effect portion includes: a cover portion 8220 with its design made to image a firework; a half mirror portion 8222 imaging a firework similarly; and an LED board portion 8221 at which a plurality of LEDs 8221*a* are provided. The half mirror portion 8222 forms a half mirror by applying a silver mirror coating to a resin member having light transmission property, and on an internal face, a predetermined picture is drawn as a hidden character. With such a construction, when viewed from a player's side, although this half mirror portion generally looks like a mere firework, if the LED 8221*a* emits light, the hidden character is visualized through the half mirror portion 8222. Thus, the gaming machine 1 according to the embodiment includes the second effect portion 822 utilizing a half mirror function, whereby a hidden character or the like can be visually recognized with an appropriate timing, and a stage effect is enhanced more significantly.

A polarizing pearl ink may be employed for the second effect portion 822. For example, in the second effect portion 822, a picture of a three-feet-sized firework is printed with the use of the polarizing pearl ink, a decoration simulating a firework is exposed to its inside, or alternatively, a picture of firework is printed. Then, by causing the LED 8221*a* to emit light, it is possible to make an expression as if a three-feet-sized firework were bursting.

The third effect portion 823 is one of movable effect members, and is configured such a manner as to simulate a goldfish, as shown in FIG. 3. A movable effect is designed such that a black eye of a goldfish moves, and has an internal structure shown in FIG. 17. That is, there are arranged: a white eye portion 8231 that is fixed by means of an arm 8230; and a movable black eye portion 8232 that is coupled to be interlocked with a solenoid, although not shown, in front of this white eye portion 8231. Moreover, a cover 8233 (FIG. 3) for covering eye portions of a goldfish consisting of these white eye portion 8231 and black eye portion 8232 is formed of a fisheye lens. Therefore, even if the black eye portion 8232 slightly moves, the movement is seen as if it were moving more significantly than actual if it is seen via the fisheye lens. Thus, even if a slight movement is made by a small solenoid, such slight movement can be seen as if it were seemingly moving more significantly, and thus, a stage effect can be enhanced. It is to be noted that in FIG. 17, reference numeral 8234 designates an LED for third effect portion.

In addition, the fourth effect portion 824 is the one in which a symbol of red leaves appears or disappears, and as shown in FIG. 3, FIG. 4, and FIG. 6, this effect portion is formed on the respective inside face of the left and right longitudinal frame portion 811 in a frame-shaped panel board 81 of a front panel 8. In this fourth effect portion 824, a special process having engraved a symbol of red leaves is applied to the left and light longitudinal frame portion 811 made of a transparent acryl, and if the inside is emitted with light by means of an LED or the like, a symbol of red leaves appears clearly, or alternatively, in a state in which the inside is not emitted with light, a symbol of red leaves cannot be clearly visually recognized from a player's side.

In the embodiment, the torch-shaped movable member 91 described above is provided, and the left and right longitudinal frame portion 811 of the front panel 8 becomes thick. The fourth effect portion 824 is provided utilizing an inside face of the left and right longitudinal frame portion 811, whereby the gaming machine 1 according to the embodiment is a gaming machine with its enhanced entertainment, enabling more various effects.

Figure 19:
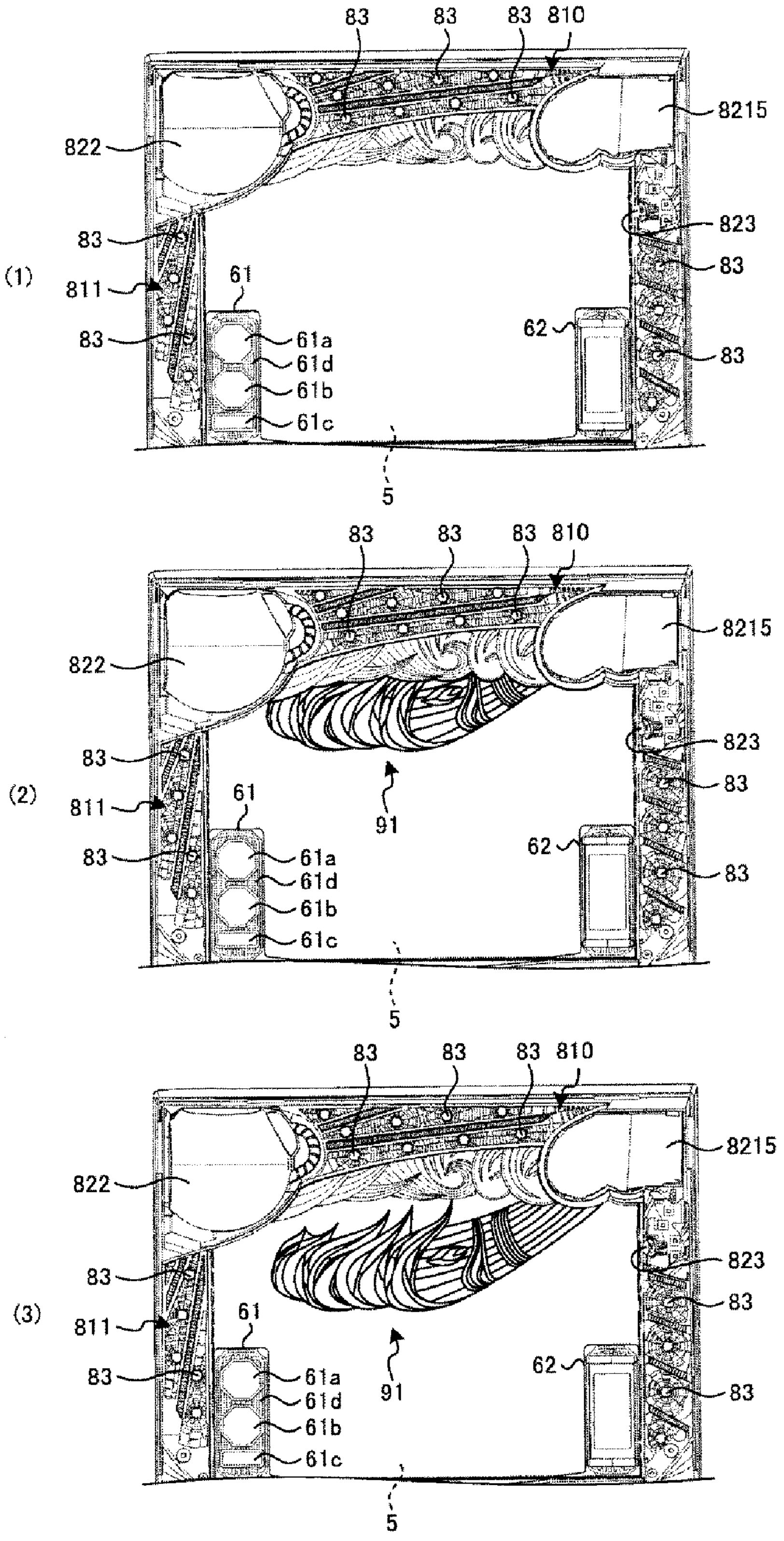
FIG. 19 is a view showing an example of an operation of a movable effect member of the gaming machine according to the embodiment.

Next, an example of operation of a movable effect member in a gaming machine according to an embodiment will be described. FIG. 19 is a view showing an example of operation of a movable effect member in a gaming machine according to an embodiment.

As described above, a torch-shaped movable member 91 that is a movable effect member is formed in the shape of a rod-like body simulating a torch at one end part which is pivotably coupled with a bearing portion 92, and extends substantially fully in a transversely widthwise direction at a rear part of the front panel 8. As shown in (1) of FIG. 19, in a case where this movable member is set at its initial position, the movable member is covered with the front panel 8, and cannot be visually recognized from a front face side.

Further, as shown in (2) of FIG. 19, the torch-shaped movable member 91 is turned from its initial position to its lower side by a predetermined quantity by means of the motor 94 (refer to FIG. 11) serving as a driving source that is arranged in the driving unit case 93. The torch-shaped movable member 91 can be first visually recognized from a player's side when this member turns to its lower side.

Subsequently, as shown in (3) of FIG. 19, the torch-shaped movable member 91 further turns to its lower side, and the entirety of a torch portion in the torch-shaped movable member 91 appears in an upward region of the reels 3L, 3C, and 3R. In this manner, for example, the torch-shaped movable member 91 is caused to appear upward of the reels 3L, 3C, and 3R and downward of the second effect portion 822 formed in the shape of a large firework; and an imaginary effect or the like indicating an ignition for the second effect portion 822 is provided, making it possible to arouse a sense of expectation of a player relative to a big hit. It is to be noted that a torch portion in the torch-shaped movable member 91 appears in the upward region of the reels 3L, 3C, and 3R and thus visual recognition of the reels 3L, 3C, and 3R is not interfered.

Figure 20:
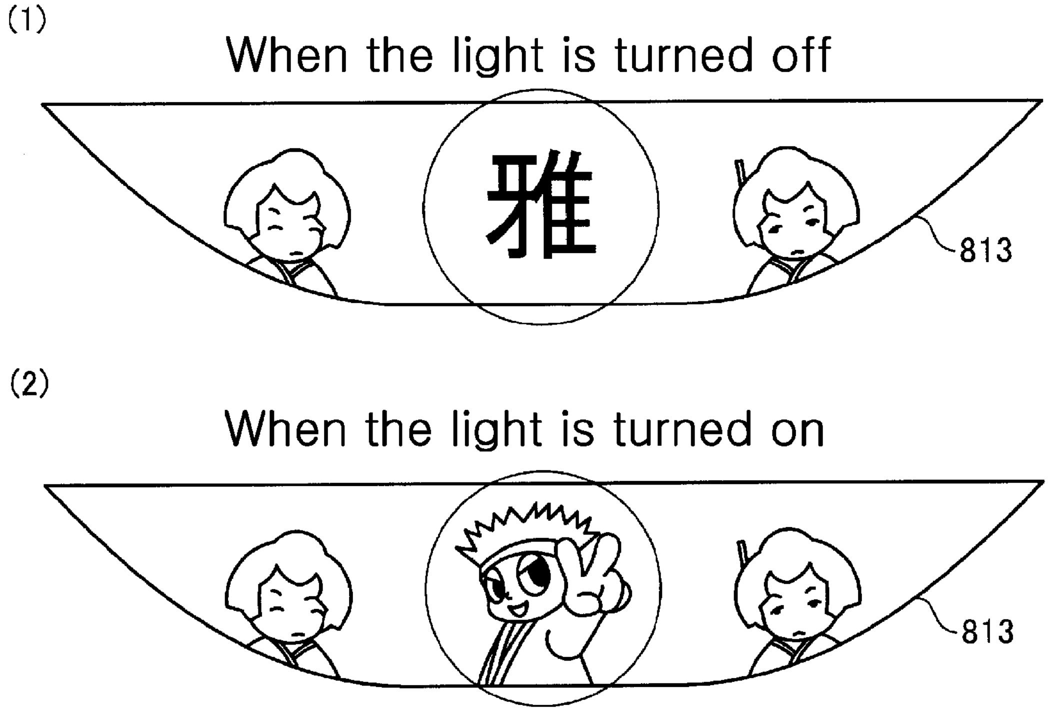
FIG. 20 is a view showing an example of display of symbols when an effect panel of the gaming machine according to the embodiment is turned on and turned off.
Figure 21:
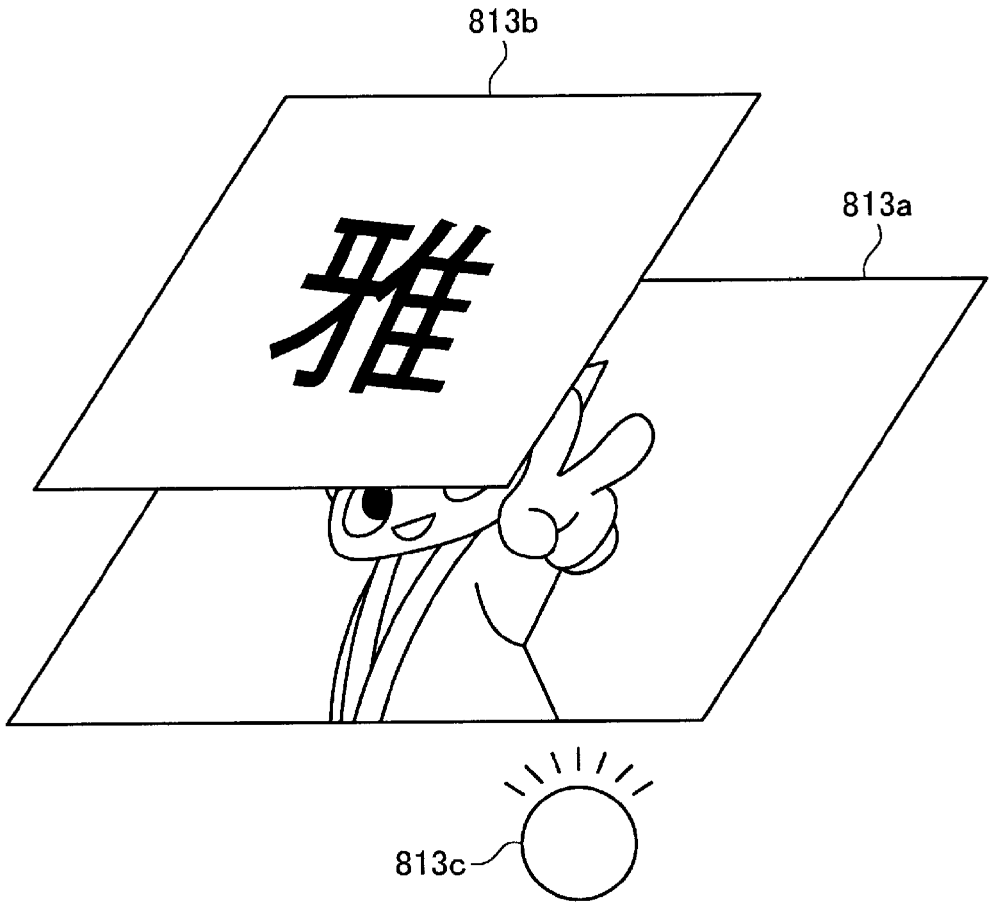
FIG. 21 is an illustrative view of a first picture and a second picture, each of which is printed on the effect panel of the gaming machine according to the embodiment, and a lamp.

Next, as shown in FIG. 20 ad FIG. 21, a display mode of a picture in an effect panel 813 and a configuration of the effect panel 813 will be described. FIG. 20 is a view showing a display example of a picture at the time of turning OFF and ON of the effect panel 813 in a gaming machine according to an embodiment. FIG. 21 is an illustrative view of a first picture 813*a* and a second picture 813*b* that are printed on the effect panel 813 in the gaming machine according to the embodiment; and a lamp 813*c*. As illustrated in FIG. 20 (1), on the effect panel 813, a Japanese graphic character is displayed when the lamp 813*c* is turned OFF. In addition, as shown in FIG. 20 (2), a character picture is displayed at a center when the lamp 813*a* is turned ON.

In addition, as shown in FIG. 21, those which are printed in a superimposed manner on the effect panel 813 are: the first picture 813*a* that is printed in an ordinary manner with the use of color ink (such as silk printing or offset printing, for example); and the second picture 813*b* that is printed with a polarizing pearl ink with its higher light transmission property than that of color ink. Further, the lamp 813*c* is disposed on a rear side of the effect panel 813, and light is emitted to a rear face of the effect panel 813 at higher luminance than that of external environmental light in accordance with the progress of game.

Specifically, with respect to the first picture 813*a*, characters are drawn on one by one picture basis in a respective one of the left and right and the center, and the second picture 813*b* is printed from top relative to a central character. In addition, if the lamp 813*c* lights, light is emitted to back faces of the first picture 813*a* and the second picture 813*b*. Here, the light emitted from the lamp 813*c* is transmitted from the back face to a top face of the second picture 813*b*, whereby the Japanese graphic character of polarizing pearl ink, which is drawn as the second picture 813*b*, is unable to be visualized from the front face of the effect panel 813, and only the first picture 813*a* printed with color ink can be visually recognized.

In addition, the second picture 813*b* transmits or reflects a fraction of the environmental light that is incident from the outside. Thus, the lamp 813*c* is turned OFF, whereby the second picture 813*b* reflects a fraction of the environmental light, and only the Japanese graphic character that is printed on a surface of the effect panel 813 can be visually recognized.

Further, the lamp 813*c* is turned OFF in an ordinary state, and is turned ON as triggered by winning of a specific internal winning combination (winning of watermelon, for example), by move to a favorable state of game (for example, move to BB gaming state, RB gaming state, or any of RT1 to RT3 gaming states), or by overriding of the number of RT games or the like. Furthermore, as to time when the lamp 813*c* is turned ON, although the lamp may be turned ON any longer as long as time is allocated to an extent such that printing of the first picture 813*a* can be visually recognized, for example, the lamp may be turned on over a predetermined period of time that is a favorable state such as turning ON only when an RT3 gaming state being a favorable gaming state is established from among the RT1 to RT3 gaming states.

In addition, a mode in which the lamp 813*c* is turned ON may be the one in which the lamp continuously emits light or in which the lamp blinks. Further, superiority or inferiority may be provided for light emission and blinking. For example, in a case where the RT1 gaming state is established or where the RT2 gaming state is established, the lamp 813*c* may be turned ON, or alternatively, in a case where the RT3 gaming state that is more favorable than the RT1 gaming state and the RT2 gaming state is established, the lamp 813*c* may be blinked. Furthermore, the luminance of the light emitted from the lamp 813*c* is assumed to be preset at higher luminance than that of the external environmental light.

[Symbol Disposition Table]

Next, a symbol disposition table will be described with reference to FIG. 22. The symbol disposition table defines positions of the respective symbols in the spinning direction of the respective reels 3L, 3C, and 3R and data for specifying kinds of the symbols arranged at the respective positions (hereinafter, referred to as symbol codes).

In the symbol disposition table, numerals "0" to "20" are respectively assigned to the positions of the respective symbols in sequential order of advancing in the spinning direction of the reels 3L, 3C, and 3R while a position of a symbol existing at a middle stage in the symbol display regions 21L, 21C, and 21R is defined as "0" when a reel index is detected. Therefore, by referring to the symbol disposition table while it is managed as to how many symbols have been rotated after the reel index has been detected, the positions and kinds of symbols mainly existing at the middle stage of the symbol display region (reel window) 21L, 21C, and 21R can always be managed.

[Symbol Combination Table]

A symbol combination table will be described with reference to FIG. 23. In the embodiment, in a case a combination of symbols that are displayed by means of the respective reels 3L, 3C, and 3R along a payline coincides with a combination of symbols that are defined by the symbol combination table, it is determined to be won, a bonus such as payout of medals, activation of replay, or activation of bonus game will be awarded to a player. FIG. 23 is a view showing the symbol combination table.

The symbol combination table defines: combinations of symbols predetermined according to kinds of bonuses; storage region types, and data indicating the number of payouts. A display combination is data for identifying a combination of symbols that are displayed along a payline. A storage region type is data that is provided for a main CPU 31 to identify a display combination storage region to be described later, for storing a winning activation flag. The winning activation flag is represented as data of 1 byte obtained when a combination of specific symbols are assigned to the respective bits.

In addition, in a case where numeric value 1 or more is determined as the number of payouts, payout of medals is conducted. In the embodiment, when any of mirror combinations 1 to 6 is determined as a display combination, payout of medals is conducted. Further, the number of payouts is specified according to the number of entries, and the payout is conducted while a predetermined upper limit is defined as a limit.

Moreover, when any of replays 1 to 5 is determined as a display combination, activation of replay is conducted. When any of BB (BIG BONUS), RB1 (REGULAR BONUS 1), and RB2 (REGULAR BONUS 2) is determined as a display combination, activation of bonus game is conducted. In addition, when an RT (RPLAY TIME) move symbol is displayed along a payline for example, the routine moves to the RT1 gaming state. Further, in the RT1 gaming state, when replay 5 is won, the routine moves to the RT2 gaming state. Furthermore, in the RT1 gaming state, when any of replays 2 to 4 is won, the routine moves to the RT3 gaming state. It is to be noted that the RT move symbol is displayed if none of the mirror combinations 1 to 3 is won. In addition, in a case where a combination of symbols that are displayed along a payline fails to coincide with any one combination of the symbols specified by the symbol combination table, it is determined to be a so called "losing".

[Internal Lottery Table]

An internal lottery table will be described with reference to FIG. 24 and FIG. 25. FIG. 24 and FIG. 25 are views showing the internal lottery table. The internal lottery table defines data pointers and lottery values in accordance with lottery numbers. A data pointer is data to be acquired as a result of a lottery that is conducted with reference to the internal lottery table, and is also data for specifying an internal winning combination that is defined by an internal winning combination determination table to be described later. As data pointers, a data pointer for mirror combination/replay and a data pointer for bonus are provided.

In the embodiment, random number values for lottery to be sampled from a predetermined numeric range of "0 to 65535" are sequentially subtracted by the lottery values according to the respective winning numbers and then a judgment is made as to whether or not a result of the subtraction becomes negative (whether or not a so called "borrow" occurs), whereby an internal lottery is conducted.

Therefore, the greater the numeric value defined as a lottery value is, the higher the probability of determining data to which the numeric value is assigned (namely a data pointer) is. The winning probability of the respective winning numbers can be represented by the lottery values corresponding to the respective winning numbers/the number of all random number values that can be sampled (65536). It is to be noted that unless otherwise specified in particular in the figure, the lottery range is "0 to 65535", that is, a probability denominator is "6556".

In the embodiment, a plurality of kinds of internal lottery tables are fully used, thereby varying the kinds or winning probabilities of internal winning combinations to be determined, and as a result, a rise or fall occurs in expectation that a player has.

[Internal Winning Combination Determination Table]

An internal winning combination determination table will be described with reference to FIG. 26 and FIG. 27. The internal winning combination determination table defines internal winning combinations according to data pointers. When a data pointer is determined, an internal winning combination is configured to be uniquely acquired.

The internal winning combinations are data for identifying combinations of symbols on the respective reels 3L, 3C, and 3L allowed to be displayed along a payline. Like display combinations, the internal winning combinations are represented as data of 1 byte obtained when combinations of specific symbols are assigned to the respective bits. It is to be noted that when a data pointer is "0", the content of an internal winning combination is determined to be "losing", which indicates that any display of a combination of the symbols defined by the symbol combination table described previously is not allowed.

FIG. 26 is an internal winning combination determination table for minor combination replay, and defines internal winning combinations related to payout of medals and internal winning combinations related to activation of replay. FIG. 27 is an internal winning combination determination table for bonus, and defines internal winning combinations related to activation of bonus.

[Configuration of Storage Regions Provided in Main RAM]

Next, a configuration of a variety of storage regions that are provided in a main RAM 33 will be described with reference to FIG. 28 to FIG. 33.

[Internal Winning Combination Storage Region]

FIG. 28 shows an internal winning combination storage region 1 and an internal winning combination storage region 2 in which data indicating an internal winning combination (a winning request flag) is to be stored. An internal winning combination that is determined in an internal lottery process is stored in a region corresponding thereto.

[Carryover Combination Storage Region]

FIG. 29 shows a carryover combination storage region in which data related to carryover combinations is to be stored.

For example, in a case where BB is determined as an internal winning combination in the internal lottery process, "1" is stored in bit 0 of the carryover combination storage region. The carryover combination used here is information that is provided for the main CPU 31 to identify a data pointer in a case where a combination of symbols corresponding to the data pointer that is determined in the internal lottery process to be described later is displayed along a payline over one or a plurality of games.

[Display Combination Storage Region]

FIG. 30 shows a display combination storage region 1 and a display combination storage region 2 in which data indicating a display combination (a winning activation flag) is to be stored. In the display combination storage regions, the values in the symbol code storage region are reflected as is. Thus, the display combination storage region is updated every time the reels 3L, 3C, and 3R stop. The values in the display combination storage region are employed for the main CPU 31 to identify a display combination when all of the reels 3L, 3C, and 3R stop.

[Gaming State Flag Storage Region]

FIG. 31 shows a gaming state flag storage region in which data indicating a gaming state flag is to be stored. A value of the gaming state flag is employed for the main CPU 31 to identify a current gaming state. For example, in a case where a BB gaming state is established, "1" is stored in bit 0.

[Depressing Sequential Order Storage Region]

FIG. 32 shows a depressing sequential order storage region in which data indicating a sequential order of stop operation is to be stored. For example, in a case where a left stop button 15L is operated as a first stop operation, "1" is stored in bits 0 and 1. Subsequently, if a center stop button 15C is operated as a second stop operation, bit 1 is updated to "0" and bit 0 is maintained to be "1" as it is, from among bits 0 and 1 in which "1" is stored.

[Active stop Button Storage Region]

FIG. 33 shows an active stop button storage region in which data indicating the stop buttons 15L, 15C, and 15R depressed at this time, a so called active stop button is to be stored. It is to be noted that in the active stop button storage region, data indicating the stop buttons 15L, 15C, and 15R whose press operations are valid is also stored. In an exemplary embodiment, the main CPU 31 identifies the stop buttons 15L, 15C, and 15R that are depressed at this time, based on the data that is stored in bits 0 to 2 of the activation stop button storage region. In addition, the main CPU 31 identifies stop buttons 15L, 15C, and 15R that are not pressed yet, based on the data that is stored in bit 4 to 6 of the active stop button storage region.

[Program Flow to be Executed in Pachi-Slot]

Next, the contents of programs to be executed by means of the main CPU 31 of the main control circuit 71 will be described with reference to FIG. 34 to FIG. 40.

[Main Flowchart by Means of Control of Main CPU of Main Control Circuit]

Figure 34:
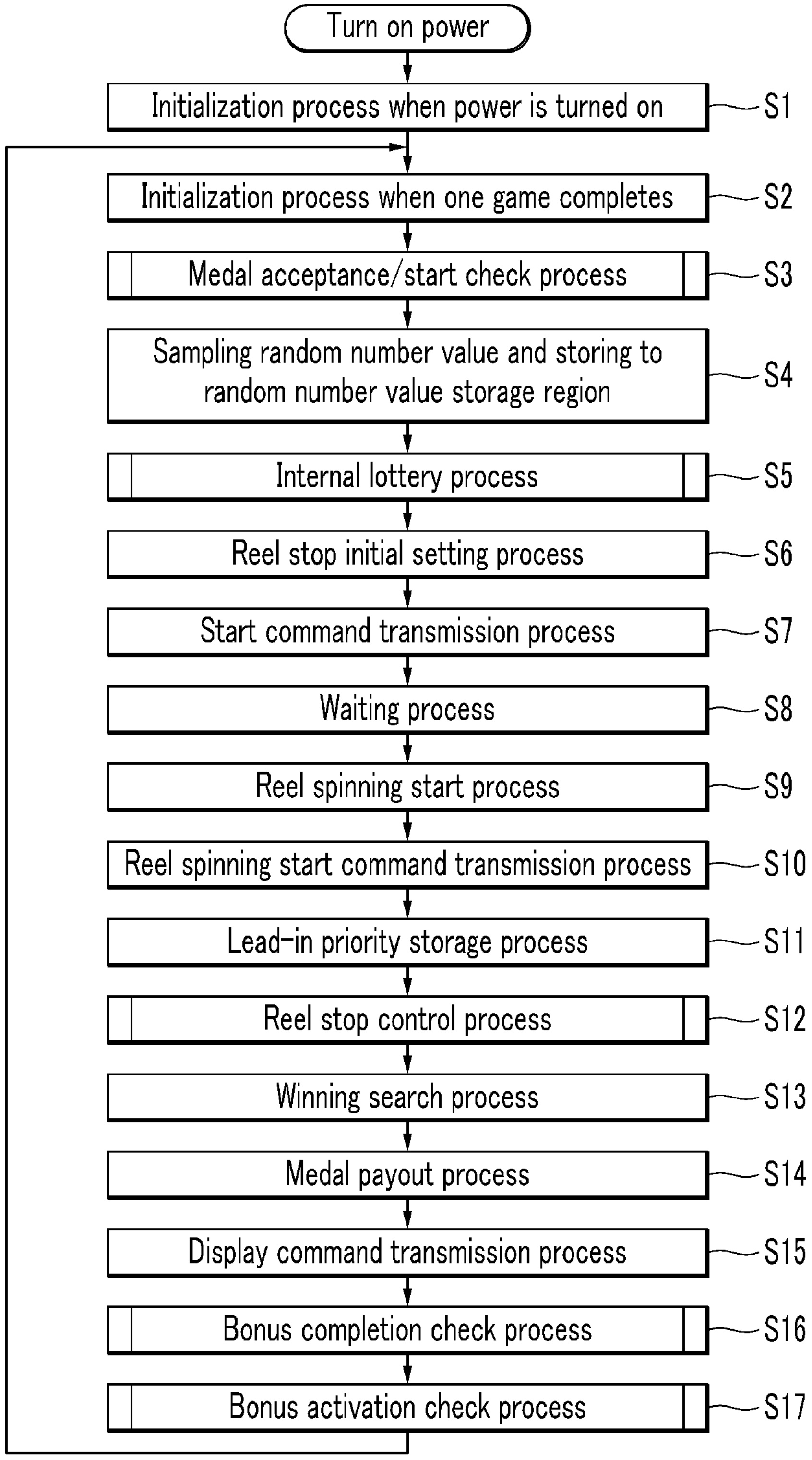
FIG. 34 is a main flowchart showing a main process to be conducted by a main CPU.

A main flowchart showing a main process to be executed by the main CPU 31 will be described with reference to FIG. 34.

First, the main CPU 31 conducts an initialization process (step S1) and then causes the routine to move to step S2. It is to be noted that in this process, the main CPU 31 determines whether or not backup is normal, that is whether or not setting change is appropriately conducted, and conducts the initialization process according to a determination result.

Subsequently, the main CPU 31 conducts an initialization process to be done at the time of completion of one game (step S2). For example, the main CPU 31 clears data to be stored in a region such as the internal winning combination storage region or in the display combination storage region. The main CPU 31 then conducts a medal acceptance/start check process to be described later with reference to FIG. 35 (step S3).

Next, the main CPU 31 samples random number values for lottery and then stored the sampled values in a random number value storage region (step S4). The ransom numbers for lottery sampled in the processing operation of step S4 are used in internal lottery process (in FIG. 36 to be described later). Subsequently, the main CPU 31 conducts the internal lottery process to be described later with reference to FIG. 36 (step S5). It is to be noted that in this process, the main CPU 31 determines an internal winning combination.

Subsequently, based on a result of the internal lottery process, the main CPU 31 conducts a reel stop initial setting process for storing each item of information related to reel stop control (step S6). In this process, the main CPU 31 conducts initialization of a region related to control for stopping spinning of the reels 3L, 3C, and 3R or the like.

Next, the main CPU 31 conducts a start command transmission process (step S7). In this process, the main CPU 31 stores a start command in a communication data storage region of the main RAM 33. This start command includes gaming states, internal winning combinations, and results of a lock lottery (whether or not a lock occurs), and these items of information are transmitted to the sub-control circuit 72 in a command data transmission process of an interruption process to be described later. In this manner, the sub-control circuit 72 can conduct an effect in accordance with a start operation.

Subsequently, the main CPU 31 conducts a waiting process (step S8). In this process, the main CPU 31 waits until a predetermined period of time (for example, 4.1 seconds) elapses after the previous play of game has started, or alternatively, until a locked period of time (for example, 5 seconds) set in a lock lottery process elapses. Subsequently, the main CPU 31 conducts a reel spinning start process (step S9). In this process, the main CPU 31 requests start of spinning of the reels 3L, 3C, and 3R, and stores a reel spinning start command in a communication data storage region of the main RAM 33.

Subsequently, the main CPU 31 conducts a command transmission process for starting reel spinning (step S10). In this process, the reel spinning start command that is stored in the communication data storage region is transmitted to the sub-control circuit 72 in the command data transmission process of the interruption process to be described later.

Subsequently, the main CPU 31 conducts a lead-in priority storage process (step S11). In this process, based on a result of an internal lottery process, in a case where stop is allowed, the lead-in priority data is stored by symbol position of each reel in spinning, or alternatively, in a case where stop is not allowed (that is, in a case where no winning occurs, but a combination is won as such), stop disable is stored.

Next, the main CPU 31 conducts a reel stop control process to be described later with reference to FIG. 37 (step S12). Subsequently, the main CPU 31 conducts a winning search process (step S13). In this process, the main CPU 31 cross-checks a symbol combination that is displayed along a payline after the reels 3L, 3C, and 3R has stopped, against a symbol combination table, determines a display combination, and determines the number of payouts of medals.

Next, the main CPU 31 pays out medals based on the number of payouts of medals determined in step S13 (step S14). Subsequently, the main CPU 31 stores a display command in the communication data storage region of the main RAM 33 (step S15). The stored display command is transmitted to the sub-control circuit 72 in the command data transmission process of the interruption process to be described later.

Figure 38:
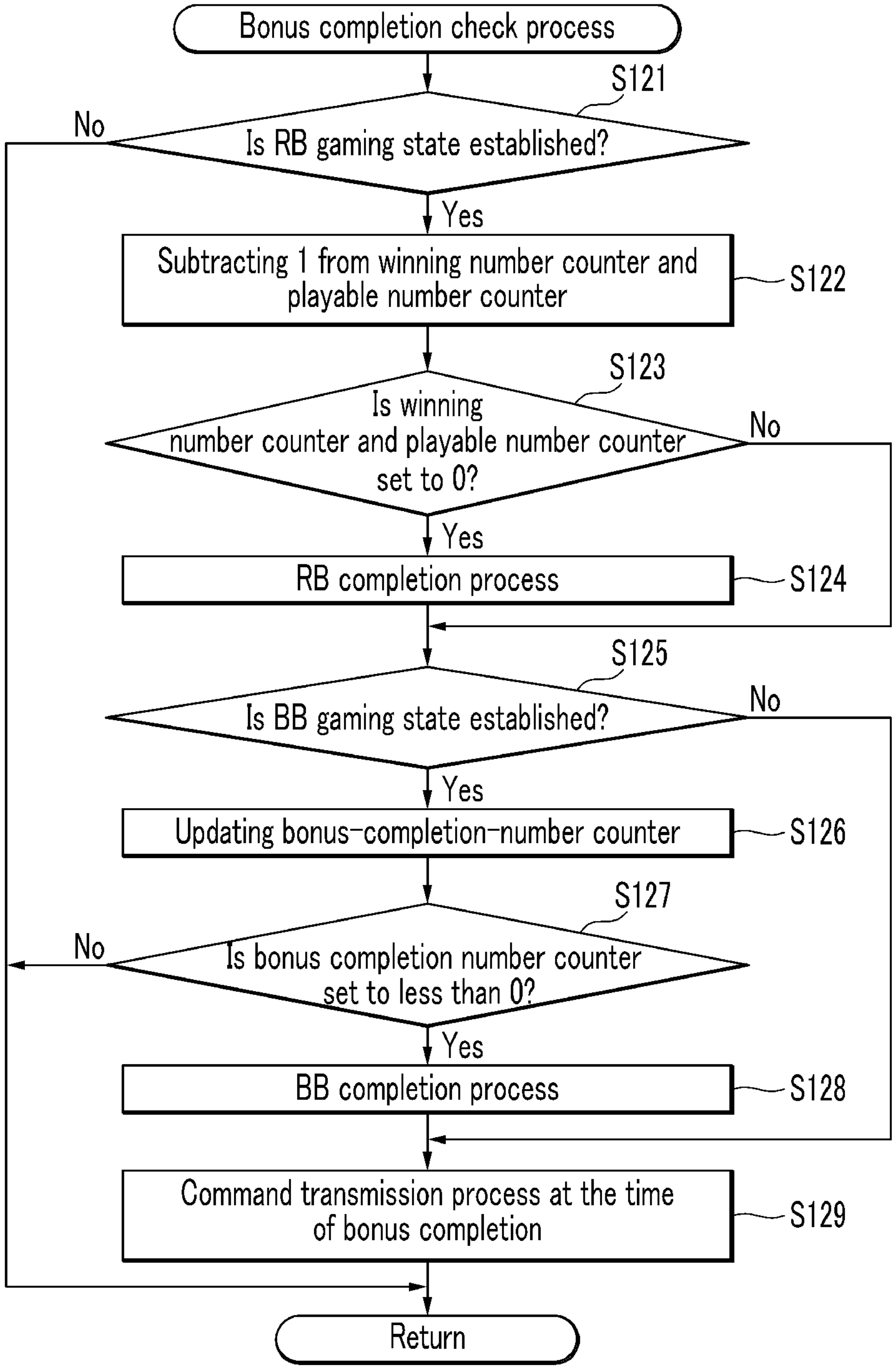
FIG. 38 is a flowchart showing a bonus completion check process.

Subsequently, the main CPU 31 conducts a bonus completion check process to be described later with reference to FIG. 38 (step S16). In this process, the main CPU 31 completes activation of bonus game in a case where a condition for completing bonus game is met. Subsequently, the main CPU 31 conducts a bonus activation check process to be described later with reference to FIG. 39 (step S17) and then conducts the processing operation of step S2. It is to be noted that in this process, the main CPU 31 starts activation of bonus game in a case where a condition for starting bonus game is met, and activates replay in a case where a replay condition is met.

[Medal Acceptance/Start Check Process]

Figure 35:
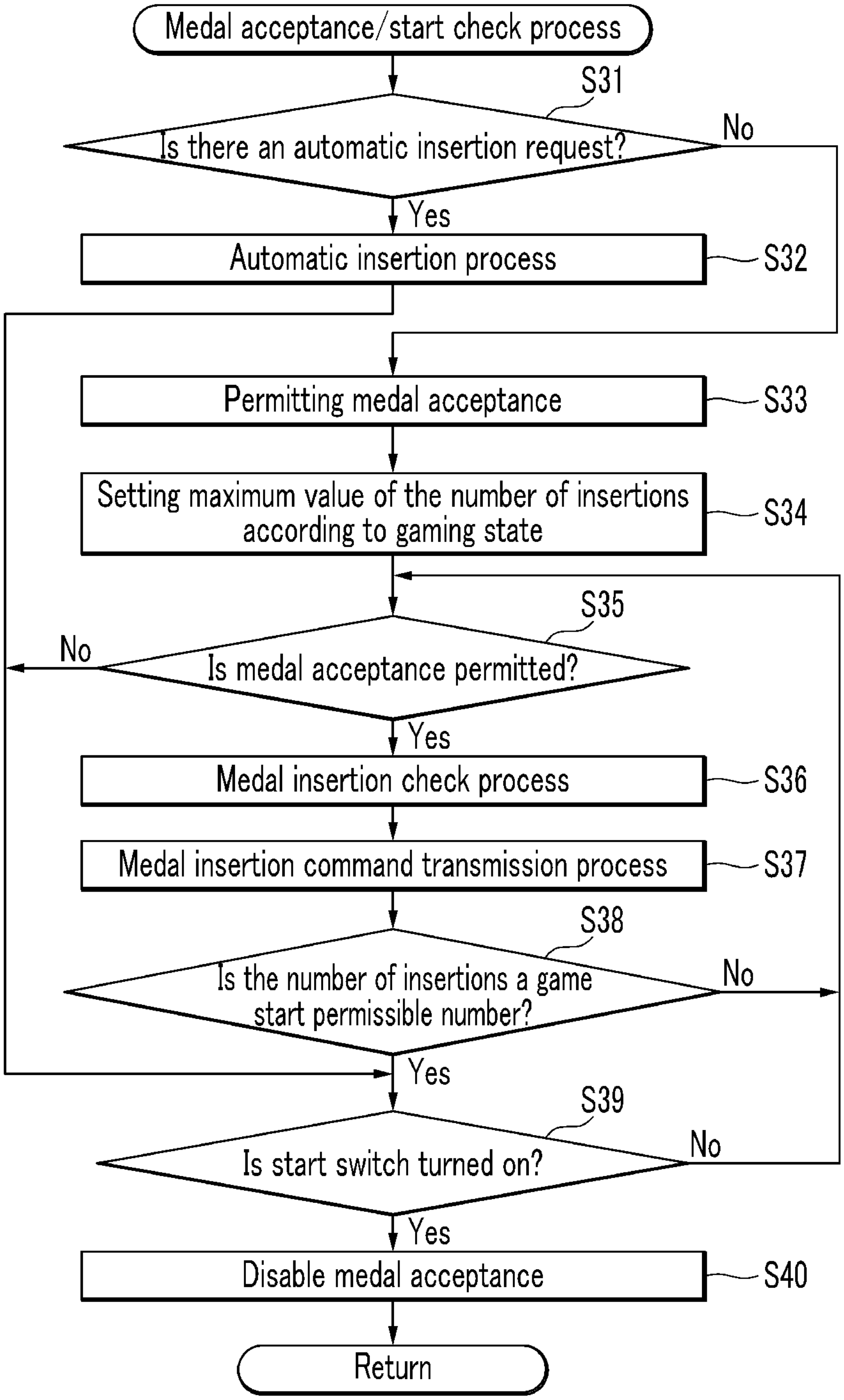
FIG. 35 is a main flowchart showing a medal acceptance/start check process.

With reference to FIG. 35, a description will be given with respect to a medal acceptance/start check process showing an operating procedure for the main CPU 31 to determine whether or not a start operation is possible based on the number of insertions.

First, the main CPU 31 determines whether or not a value of an automatic insertion counter exists, that is, whether or not the value is set to "0" (step S31). At this time, in a case where the value of the automatic insertion counter exists, that is, in a case where a value other "0" is set, the main CPU 31 subsequently conduct an automatic insertion process (step s32) and then causes the routine to move to step S39. Specifically, the main CPU 31 copies the value of the automatic insertion counter to an insertion number counter. It is to be noted that the automatic insertion counter is a counter that is provided for the main CPU 31 to count the number of medals automatically inserted, and that the insertion number counter is a counter that is provided for the main CPU 31 to count the number of inserted medals. The automatic insertion counter and the insertion number counter are stored in a predetermined region of the main RAM 33.

On the other hand, in a case where a value of an automatic insertion number counter does not exist, that is, in a case where the value is set to "0", the main CPU 31 allows medal acceptance (step S33) and then conducts the processing operation of step S34.

In step S34, the main CPU 31 sets a maximum value of the number of insertions in accordance with a gaming state. In the embodiment, the main CPU 31 sets the maximum value of the number of insertions to "3" in a general gaming state or the like, and sets the maximum value of the number of insertions to "2" in an RB gaming state.

Subsequently, the main CPU 31 determines whether or not medal acceptance is allowed (step S35). When this determination is YES, the main CPU 31 then conducts the processing operation of step S36, or alternatively, when the determination is NO, the main CPU 31 then conducts the processing operation of step S39.

In step S36, the main CPU 31 conducts a medal insertion check process. In this process, the main CPU 31 checks an input from a medal sensor 42S. Subsequently, the main CPU 31 conducts a medal insertion command transmission process (step S37). In this process, the main CPU 31 stores a medal insertion command in the communication data storage region of the main RAM 33. The stored medal insertion command is transmitted to the sub-control circuit 72 in the command data transmission process of the interruption process to be described later.

Subsequently, the main CPU 31 determines whether or not the number of insertions is a game start permissible number (step S38). For example, the main CPU 31 determines whether or not the value of the insertion number counter is a maximum value of the number of insertions. At this time, in a case where the value of the insertion number counter is the maximum value of the number of insertions, the main CPU 31 then conducts the processing operation of step S39, or alternatively, in a case where the value is not the maximum value, the main CPU 31 then conducts the processing operation of step S35.

In step S39, the main CPU 31 determines whether or not the start switch 14S is set to ON. Specifically, the main CPU 31 determines whether or not an input from the start switch 14S based on operation of the start lever 14 occurs. At this time, in a case where the input from the start switch 14S occurs, the main CPU 31 disables medal acceptance (step S40) and then completes a medal acceptance/start check process. On the other hand, in a case where the input from the start switch 14S does not occur, the main CPU 31 then conducts the processing operation of step S35.

[Internal Lottery Process]

Figure 36:
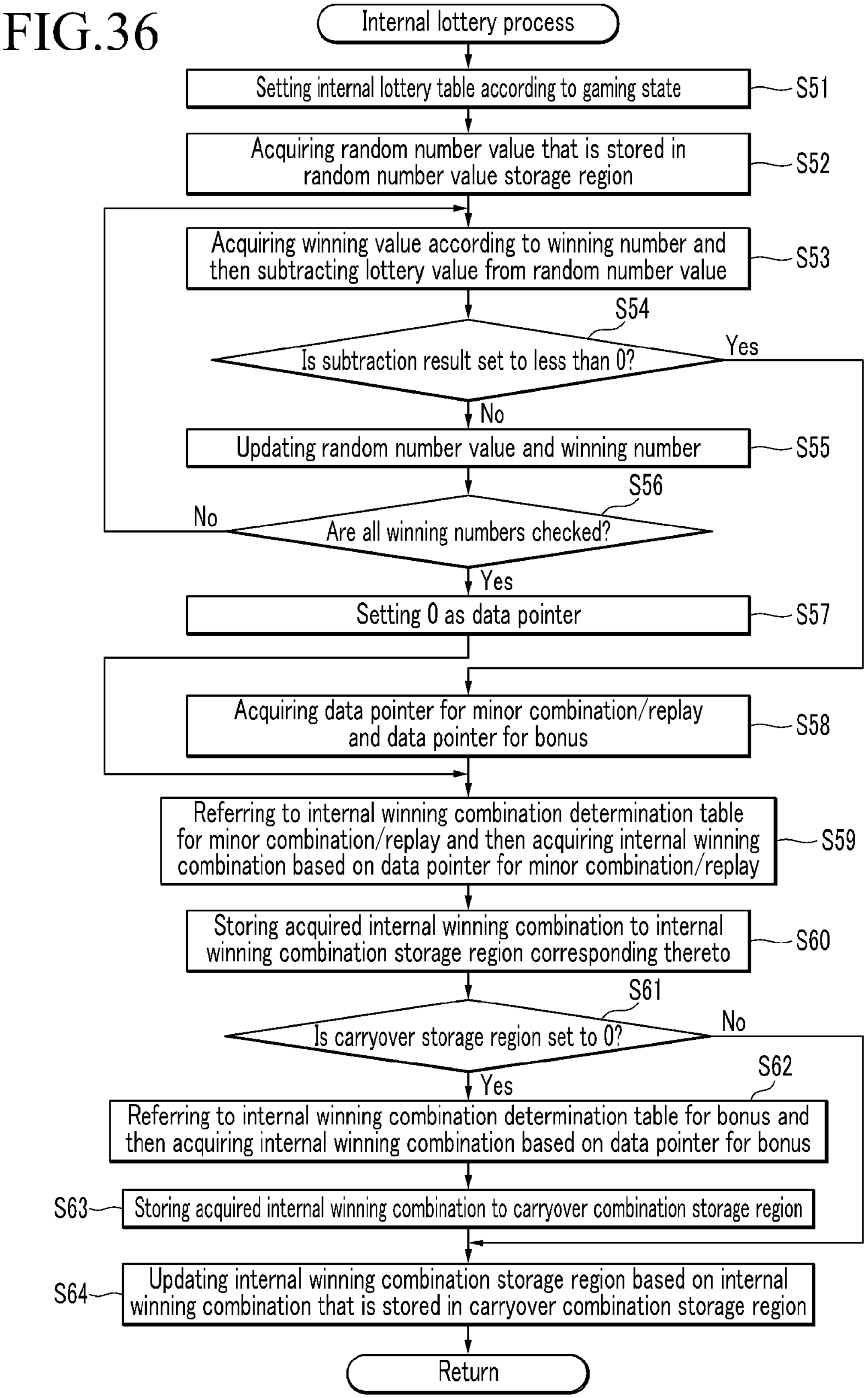
FIG. 36 is a flowchart showing an internal lottery process.

With reference to FIG. 36, a description will be given with respect to an internal lottery process showing an operating procedure for the main CPU 31 to determine an internal winning combination based on a random number value and a gaming state or the like.

First, the main CPU 31 sets an internal lottery table according to a gaming state (step S51). Subsequently, the main CPU 31 acquires random number values that are stored in a random number value storage region (step S52).

Next, the main CPU 31 acquires a lottery value corresponding to a lottery number with reference to the internal lottery table and then subtracts the lottery value from the random number value (step S53). Subsequently, the main CPU 31 determines whether or not a subtraction result is less than "0" (negative) (step S54). At this time, in a case where the subtraction result is negative, the main CPU 31 acquires data pointer for mirror combination/replay and a data pointer for bonus (step S58) and then conducts the processing operation of step S59. On the other hand, in a case where the subtraction result is not negative, the main CPU 31 then conducts the processing operation of step S55.

In step S55, the main CPU 31 updates random number values, and updates lottery numbers. Specifically, the main CPU 31 updates a random number value to a value after subtracted in step S53, and updates a lottery number which is not checked yet. Subsequently, the main CPU 31 determines whether or not all the lottery numbers are checked (step S56). At this time, in a case where all the lottery numbers are checked, the main CPU 31 sets a data pointer to "0" (step S57) and then causes the routine move to step S59. On the other hand, in a case where all the lottery numbers are not checked, the main CPU 31 causes the routine to move to step S53.

In step S59, the main CPU 31 refers to an internal winning combination determination table for mirror combination/replay and then acquires an internal winning combination based on the data pointer for mirror combination/replay. Subsequently, the main CPU 31 stores the acquired internal winning combination in a corresponding internal winning combination storage region corresponding thereto (step S60).

Subsequently, the main CPU 31 determines whether or not a carryover combination region is set to "0" (step S61). In a case where the carryover combination storage region is set to "0" as a result of the determination, the main CPU 31 refers to an internal winning combination table for bonus and then acquires an internal winning combination based on the data pointer for bonus (step S62).

Subsequently, the main CPU 31 stores the acquired internal winning combination to an internal winning combination storage region corresponding thereto (step S639 and then causes the routine to move to step S64. On the other hand, in a case where the carryover combination storage region is not set to "0", the main CPU 31 moves to step S64. In step S64, the main CPU 31 updates the internal winning combination storage region based on the internal winning combination that is stored in the carryover combination storage region (step S64) and then completes the internal lottery process.

[Reel Stop Control Process]

Figure 37:
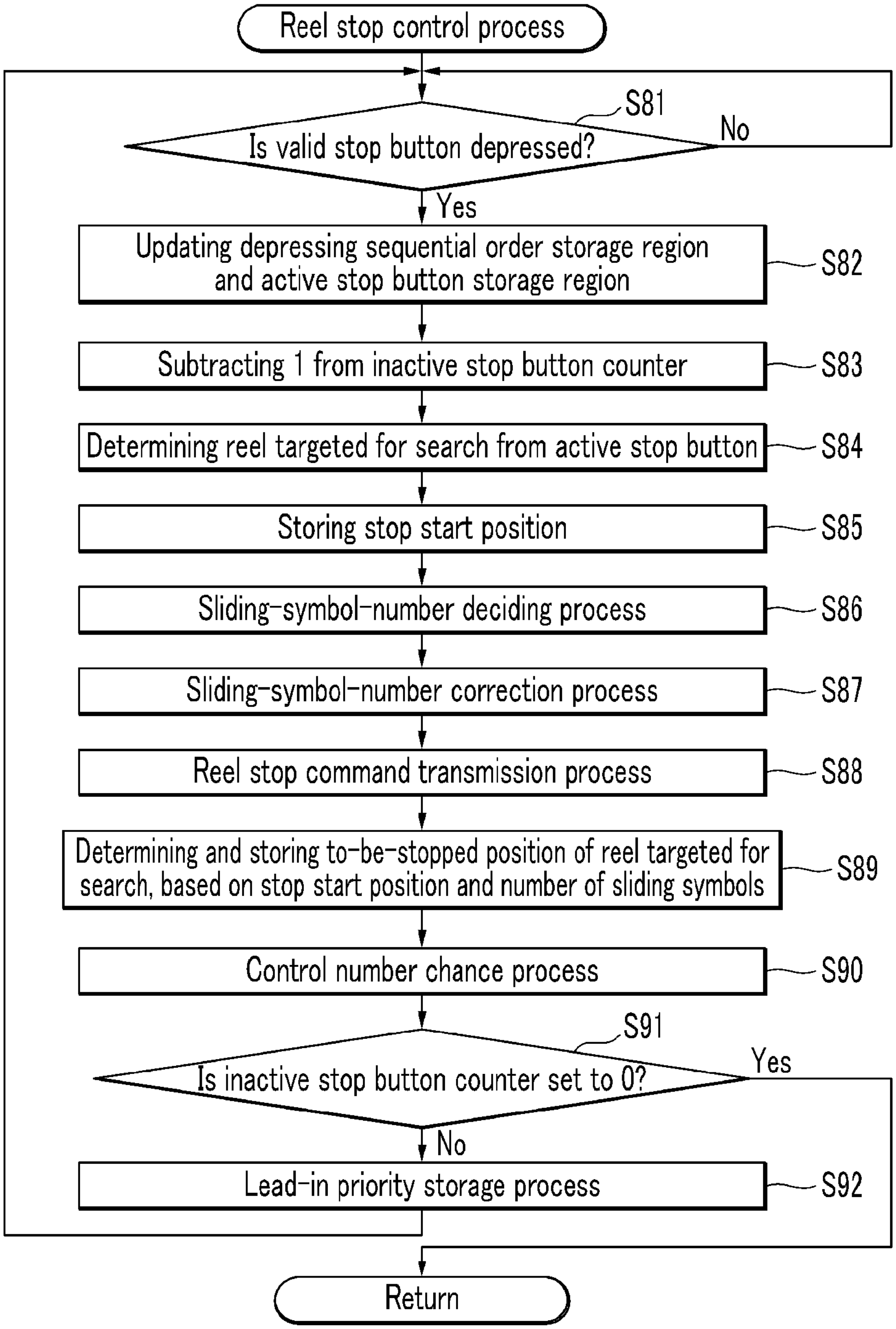
FIG. 37 is a flowchart showing a reel stop control process.

With reference to FIG. 37, a description will be given with respect to a reel stop control process showing an operating procedure for the main CPU 31 to stop spinning of the reels 3L, 3C, and 3R based on an internal winning combination or timing or the like of stop operation by a player.

First, the main CPU 31 determines whether or not any of valid stop buttons 15L, 15C, and 15R is depressed (step S81). At this time, in a case where any of these valid stop buttons 15L, 15C, and 15R is depressed, the main CPU 31 then conducts the processing operation of step S82. On the other hand, in a case where any of the valid stop buttons 15L, 15C, and 15R is not depressed, the main CPU 31 conducts the processing operation of step S81 again.

In step S82, the main CPU 31 updates a depressing sequential order storage region and an active stop button storage region. Subsequently, the main CPU 31 subtracts "1" from a value of an inactive stop button counter (step S83). Subsequently, the main CPU 31 determines a reel targeted for search from an active stop button (step S84).

Subsequently, in step S85, the main CPU 31 stores a stop start position based on a symbol counter. Next, the main CPU 31 conducts a sliding-symbol-number deciding process (step S86). In this process, the main CPU 31 refers to a stop table and then determines sliding-symbol-number deciding data defined for a stop start position. Next, the main CPU 31 conducts a sliding-symbol-number correction process (step S87). In this process, lead-in priority data for each symbol is acquired in accordance with a sequential order of depressing operation, it is determined whether or not the lead-in priority data for symbols of the acquired sliding-symbol-number is the highest in the range of the maximum number of sliding symbols (0 to 4 symbols), and in a case where higher lead-in priority data exists, the number of sliding symbols is corrected such a manner as to stop at that position.

Subsequently, the main CPU 31 conducts a reel stop command transmission process (step S88). In this process, the main CPU 31 stores a reel stop command in the communication data storage region of the main RAM 33. This reel stop command includes information on inactive stop buttons or the like, and is transmitted to the sub-control circuit 72 in the command data transmission process of the interruption process to be described later. In this manner, the sub-control circuit 72 can conduct an effect in accordance with a stop operation.

Subsequently, the main CPU 31 determines and stores a predetermined stop position of a reel targeted for search, based on a stop start position and the number of sliding symbols (step S89). In a case where a specific stop position is determined, the main CPU 31 then conducts control-number change process for updating a group of reel stop control information (step S90).

Next, the main CPU 31 determines whether or not a value of an inactive stop button counter is set to "0" (step S91). At this time, when the value of the inactive stop button counter is not set to "0" (in a case where a third stop does not occur), the main CPU 31 conducts a lead-in priority storage process (step S92) and then conducts the processing operation of step S81. That is, in the gaming machine 1, before a process for stopping the nest reels 3L, 3C, and 3R is conducted, a process for storing lead-in priority data is conducted as to the respective symbol positions of the reels 3L, 3C, and 3R that are still spinning. On the other hand, in a case where the value of the inactive stop button counter is set to "0", the main CPU 31 determines that stop control at the time of the third stop completes and then completes reel stop control process.

[Bonus Completion Check Process]

A bonus completion check process will be described with reference to FIG. 38. As shown in FIG. 38, the main CPU 31 determines whether or not an RB gaming state is established (step S121). In a case where the RB gaming state is not established as a result of the determination, the main CPU 31 completes a bonus completion check. On the other hand, in a case where the RB gaming state is established, the main CPU 31 subtracts 1 from a current value of a winning number counter and a playable number counter (step S122).

The main CPU 31 then determines whether or not the winning number counter and the playable number counters indicate "0" (step S123). In a case where the winning number counter and the playable number counter do not indicate "0" as a result of the determination, the routine moves to step S125. Alternatively, in a case where the winning number counter and the playable number counter indicates "1", a RB completion process for setting the RB game playing stat flag to OFF is conducted (step S124) and then the routine moves to step S125.

Subsequently, the main CPU 31 determines whether or not a BB gaming state is established (step S125). In a case where the BB gaming state is not established as a result of the determination, the main CPU 31 causes the routine to move to step S129. Alternatively, in a case where the BB gaming state is established, the main CPU 31 updates a bonus completion number counter (step S126) and then determines whether or not a value of the bonus completion number counter is smaller than "0" (step S127).

In a case where the value of the bonus completion number counter is not smaller than "0" as a result of the determination, the main CPU 31 completes a bonus completion check process. Alternatively, in a case where the value of the bonus completion number counter is smaller than "0", the main CPU 31 conducts a BB completion process for setting the BB gaming state flag to OFF and then setting the RB gaming state to OFF (step S128).

Subsequently, the main CPU 31 conducts a command transmission process to be done at the time of completion of bonus, for transmitting command data at the time of completion of bonus to the sub-control circuit 72 (step S129) and then completes the bonus completion check process.

[Bonus Activation Check Process]

Figure 39:
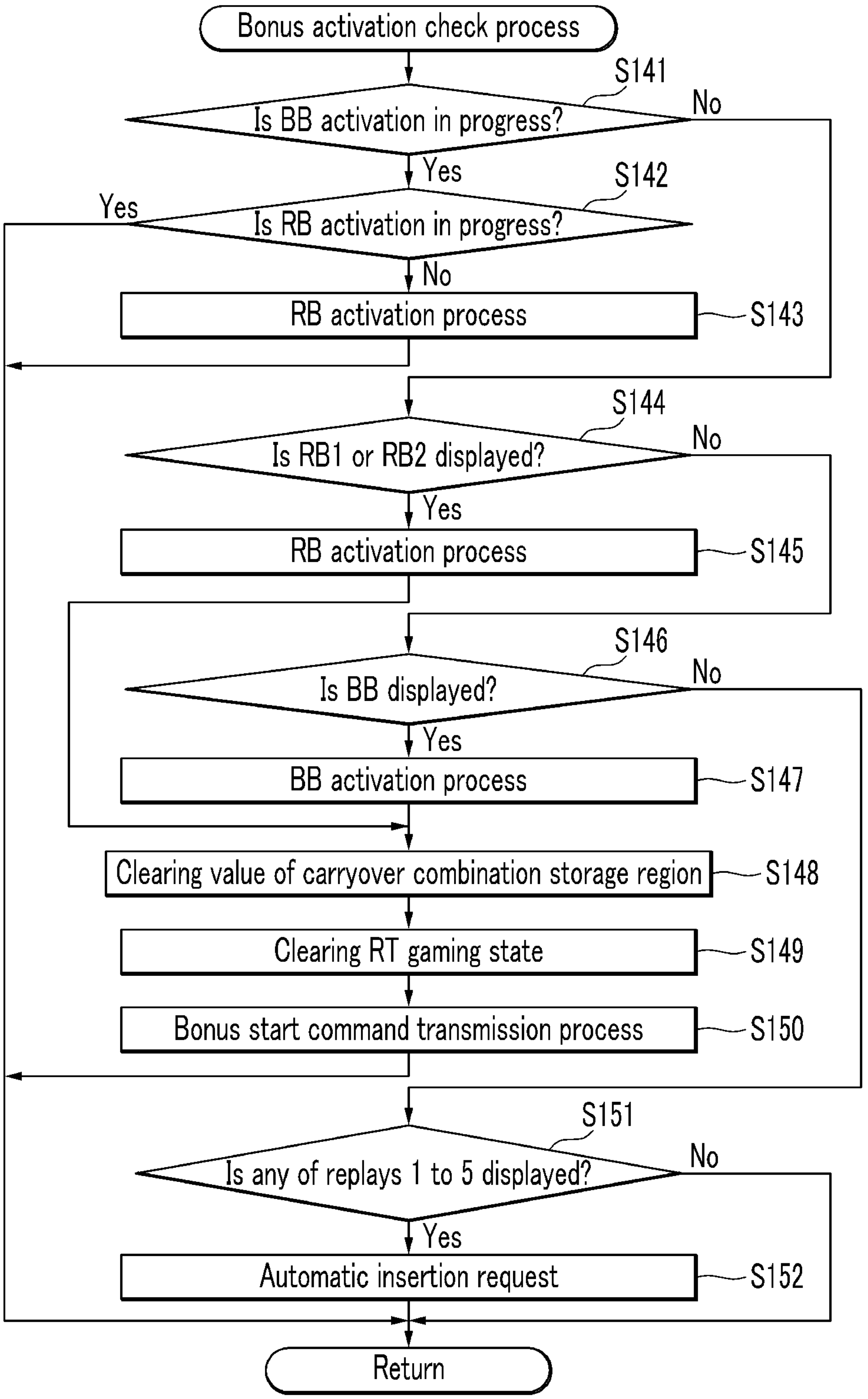
FIG. 39 is a flowchart showing a bonus activation check process.

A bonus activation check process will be described with reference to FIG. 39. As shown in FIG. 39, the main CPU 31 determines whether or not BB activation is in progress (step S141). In a case where the BB activation is in progress as a result of the determination, the main CPU 31 determines whether or not RB activation is in progress (step S142). In a case whether the RB activation is in progress, the CPU 31 then completes the bonus activation check process. Alternatively, in a case where the RB activation is not in progress, the main CPU 31 conducts an RB activation process for setting the RB gaming state to ON and setting "8" for the winning number counter and the playing number counter (step S143) and then competes the bonus activation check process.

In addition, in a case where BB activation is not in progress in step S141, the main CPU 31 determines whether an RB1 symbol or an RB2 symbol is displayed (step S144). In a case where the RB1 symbol or the RB2 symbol is displayed as a result of the determination, the main CPU 31 conducts an RB activation process for setting the RB gaming state flag to ON and then setting "8" for the winning number counter and the playable number counter and then causes the routine to move to step S148 (step S145), and causes the routine to move to step S148. On the other hand, in a case whether the RB1 symbol or the RB symbol is not displayed, the main CPU 31 determines whether or not a BB symbol is displayed (step S146).

In a case where the BB symbol is displayed as a result of the determination, the main CPU 31 sets a BB gaming state flag to ON, conducts a BB activation process for setting 390 for a bonus completion number counter, and then, conducts the RB process described previously (step S147). After that, the main CPU 31 clears a value of a carryover combination storage region (step S148) and then clears an RT gaming state flag in a gaming state flag storage region (step S149). The main CPU 31 then conducts a bonus start command transmission process for transmitting a bonus start command for the sub-control circuit 72 (step S150) and then completes the bonus activation check processing.

Alternatively, in a case where the BB symbol is not displayed in step S146, the main CPU 31 determines whether or not any of replays 1 to 5 is displayed (step S151). In a case whether none of replays 1 to 5 is displayed as a result of the determination, the main CPU 31 completes the onus activation check process. On the other hand, in a case whether any of replays 1 to 5 is displayed, the main CPU 31 conducts an automatic insertion request for copying a value of the insertion number counter to the automatic insertion number counter (step S152) and then completes the bonus activation check processing.

[Interruption Process by Means of Control of Main CPU (1.1172 Milliseconds)]

Figure 40:
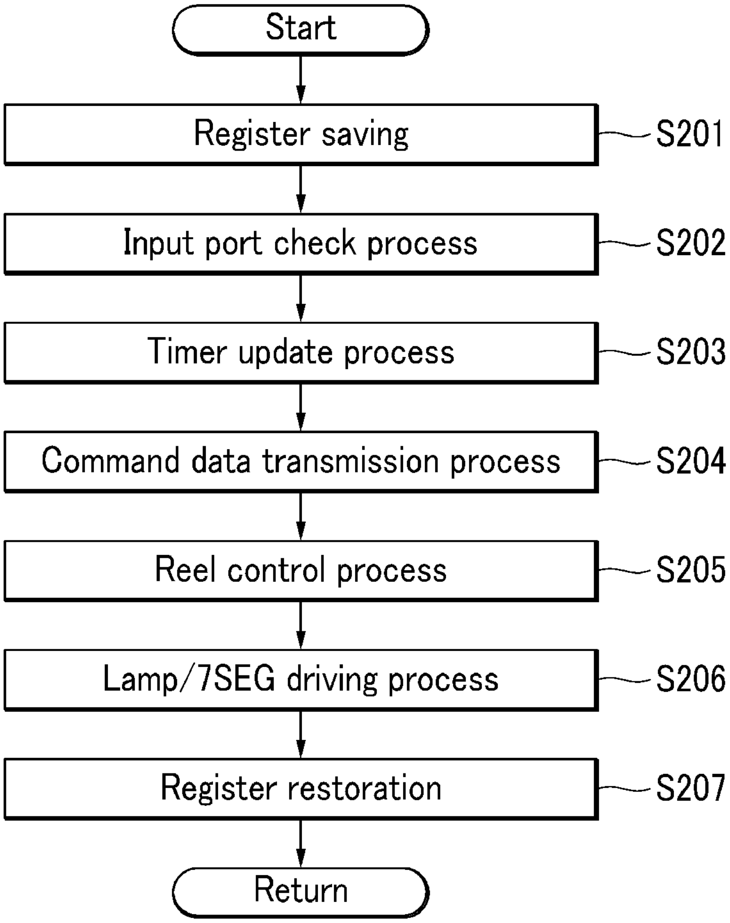
FIG. 40 is a flowchart showing an interruption process under the control of the main CPU.

With reference to FIG. 40, a description will be given with respect to an interruption process by means of control of the main CPU 31 showing a procedure for the interruption process to be executed by the main CPU 31 every predetermined period of time (for example, 1.1172 milliseconds).

First, the main CPU 31 conducts register saving (step S201). Subsequently, the main CPU 31 conducts an input port check process (step S202). In this process, the main CPU 31 checks whether or not a signal is transmitted to the microcomputer 30. For example, the main CPU 31 stores on-edge or off-edge for switches such as the start switch 14S and the stop switch 15S every time interruption process is conducted. In addition, the main CPU 31 stores input state commands including on-edge and off-edge information for a variety of switches in the communication data storage region of the main RAM 33. The stored input state commands are transmitted to the sub-control circuit 72 in the communication data transmission process of the interruption process to be described later. In this manner, a variety of effects can be executed with the use of control means such as the start lever 14 or stop buttons 15L, 15C, and 15R.

Subsequently, the main CPU 31 conducts a timer update process (step S203). Next, the main CPU 31 conducts a command data transmission process (step S204). In this process, the commands that are stored in the communication data storage region are transmitted to the sub-control circuit 72. Subsequently, the main CPU 31 controls a reel control process. For example, the main CPU 31 controls spinning of the reels 3L, 3C, and 3R (step S205). In more detail, the main CPU 31 starts spinning of the reels 3L, 3C, and 3R in response to a request for starting spinning of the reels 3L, 3C, and 3R, that is, in response to a start operation, and conducts control so that the reels 3L, 3C, and 3R spin at a predetermined speed. In addition, in response to a stop operation, the main CPU 31 conducts control so that spinning of the reels 3L, 3C, and 3R that correspond to the stop operation stops.

Subsequently, the main CPU 31 conducts a lamp/7SEG driving process (step S206). For example, the main CPU 31 causes a variety of display units to display the number of credited medals and the number of payouts or the like. Subsequently, the main CPU 31 conducts register restoration (step S207) and then completes an interruption process that periodically occurs.

[Program Flow to be Executed by Means of Sub-CPU of Sub-Control Circuit]

Figure 41:
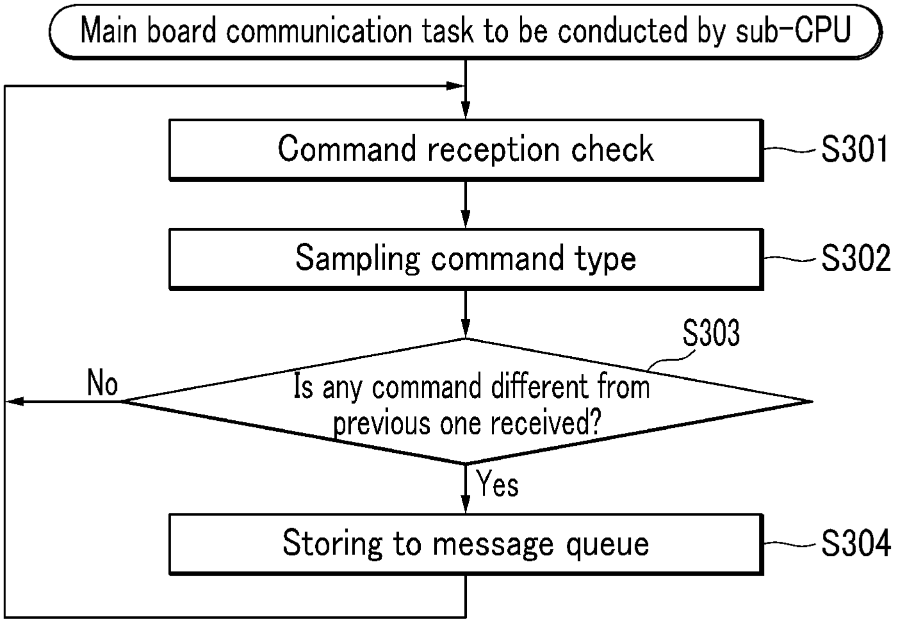
FIG. 41 is a flowchart showing a main board communication task under the control of a sub-CPU.
Figure 42:
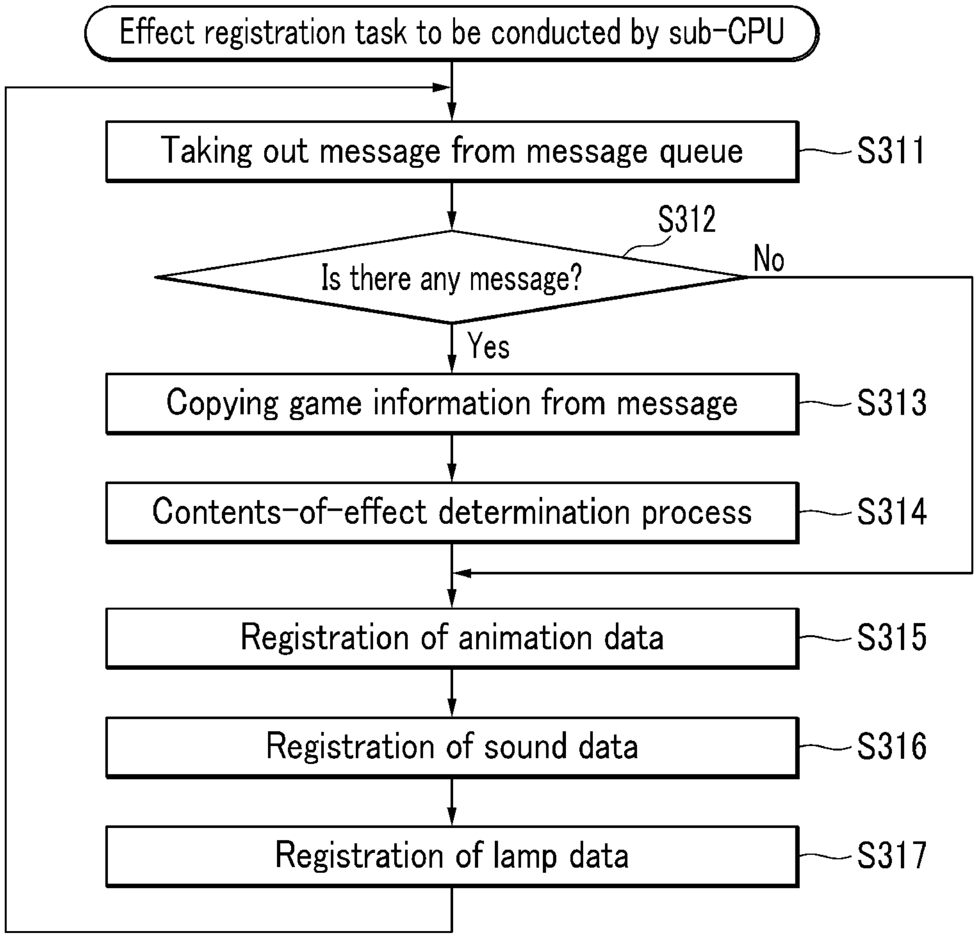
FIG. 42 is a flowchart showing an effect registration task under the control of the sub-CPU.
Figure 43:
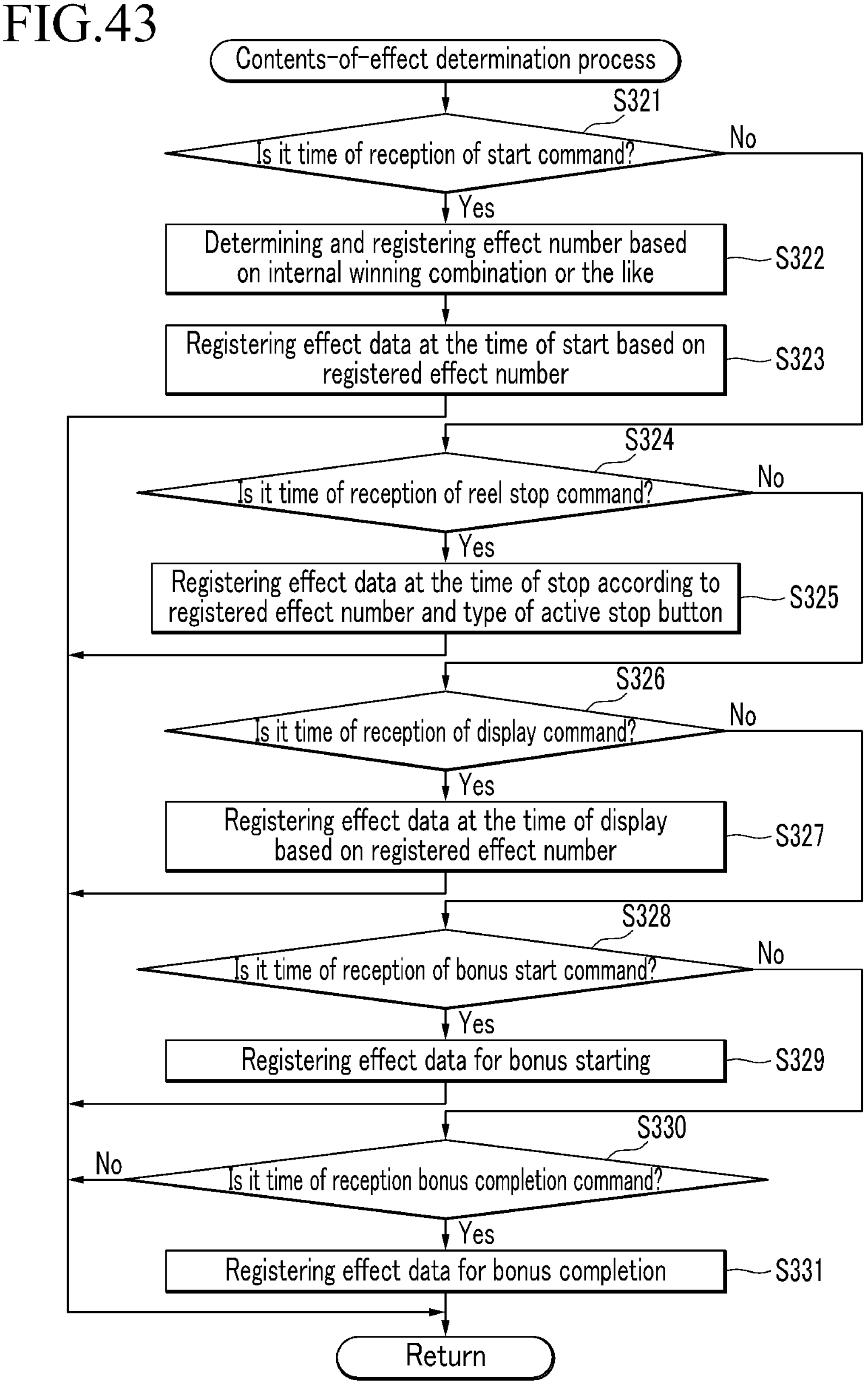
FIG. 43 is a flowchart showing a contents-of-effect determination process under the control of the sub-CPU.

Next, the contents of programs to be executed by means of a sub-CPU of the sub-control circuit 72 will be described with reference to FIG. 41 to FIG. 43.

[Main Board Communication Task]

A main board communication task to be conducted by means of a sub-CPU will be described with reference to FIG. 41. First, the sub-CPU conducts a reception check of a command that is transmitted from a main control circuit (step S301). In the case of having received any command, the sub-CPU samples a type of that command (step S302).

Next, the sub-CPU determines whether or not a command different from a previous one is received (step S303). When the sub-CPU determines that the command different from the previous one is not received, the routine moves to step S301, or alternatively, when the sub-CPU determines that the command different from the previous one is received, the received command is stored in a message queue (step S304) and then the routine moves to step S301.

[Effect Register Task]

Next, an effect register task to be conducted by means of the sub-CPU will be described with reference to FIG. 42. First, the sub-CPU takes out a message from a message queue (step S311). Next, the sub-CPU determines whether or not a message exists (step S312). When the sub-CPU determines that the message exists, game playing information is copied from the message (step S313). For example, a variety of data such as internal winning combinations, types of reels of which spinning stops, display combinations, and flags in activation, which are specified by parameters, are copied to a storage region that is provided in a sub-RAM of the sub-control circuit 72.

Next, the sub-CPU conducts a contents-of-effect determination process to be described later with reference to FIG. 42 (step S314). In this process, determination of the contents of effect or registration of effect data is conducted in accordance with a type of a received command.

When the sub-CPU determines that no message exists after step S314 or in step S312, the sub-CPU conducts registration of animation data (step S315). Next, the sub-CPU conducts registration of sound data (step S316). Next, the sub-CPU conducts registration of lamp data (step S317). Registration of animation data, registration of sound data, and registration of lamp data are conducted based on effect data that is registered in the contents-of-effect determination process. When this process completes, the routine moves to step S311.

[Contents-of-Effect Determination Process]

Next, a flowchart of a contents-of-effect determination process to be executed by means of the sub-CPU will be described with reference to FIG. 43. First, the sub-CPU determines whether or not now is the time of reception of a start command (step S321). When the sub-CPU determines that now is the time of reception of the start command, the sub-CPU samples random number values for effect and then determines and registers effect numbers by means of lottery, based on an internal winning combination or the like (step S322). The effect numbers are data for specifying the contents of effects to be executed at this time.

Next, the sub-CPU registers effect data that is obtained at the time of start, based on the registered effect numbers (step S323). The effect data is data for specifying activation patterns of movable effect members, animation data sound data, and lamp data. When the effect data is registered, the corresponding activation patterns of the movable effect members or animation data or the like is determined and then effects such as activation of the movable effect members or image display are executed. When this process completes, the contents-of-effect determination process is also completed.

Next, when the sub-CPU determines that now is not the time of reception of the reel start command, the sub-CPU determines whether or not now is the time of reception of a reel stop command (step S324). When the sub-CPU determines that now is the time of reception of the reel stop command, effect data at the time of stop is registered based on the registered effect numbers and a type of the stop button (step S325). When this process completes, the contents-of-effect determination process is also completed.

Next, when the sub-CPU determines that now is not the time of reception of the reel stop command, the sub-CPU determines whether or not now is the time of reception of a display command (step S326). When the sub-CPU determines that now is the time of reception of the display command, effect data at the time of display is registered based on the registered effect numbers (step S327). When this process completes, the contents-of-effect determination process is also completed.

Next, when the sub-CPU determines that now is the time of reception of the display command, the sub-CPU determines whether or not now is the time of reception of a bonus start command (step S328). When the sub-CPU determines that now is the time of reception of the bonus start command, effect data for starting bonus is registered (step S329). When this process completes, the contents-of-effect determination process is also completed.

Next, when the sub-CPU determines that now is the time of reception of the bonus start command, the sub-CPU determines whether or not now is the time of reception of a bonus completion command (step S330). When the sub-CPU determines that now is not the time of reception of the bonus completion command, the contents-of-effect determination process is completed, or alternatively, when the sub-CPU determines that now is the time of reception of the bonus completion command, effect data for completing bonus is registered (step S331). When this process completes, the contents-of-effect determination process is also completed.

A gaming machine 1 is provided as follows by way of the embodiments described above.

The gaming machine 1 is provided which includes: a casing (a cabinet 1*a*) adapted to house a plurality of reels 3L, 3C, and 3R of which a plurality of symbols are arranged on a respective one of peripheral faces; a front door 2 that is mounted in an openable manner to a front side opening face of the casing (the cabinet 1*a*); a front panel 8 that is arranged at a front upper half of the front door 2; a display device (a liquid crystal display device 5) that is arranged at a rear part of the front panel 8 of the front door 2, for displaying an image according to a progress of a game; and decorative panels (a first decorative panel 61, a second decorative panel 62) each having a Japanese paper portion that is fixed between the display device (the liquid crystal display device 5) and the front panel 8, and that is capable of visualizing, from a front face side, an image that is displayed on the display device (the liquid crystal display device 5), wherein Japanese paper portions 612 and 622 of the decorative panels (the first decorative panel 61 and the second decorative panel 62) has, on one side face of a substrate made of a light transmission material, a simulative Japanese paper face 60 on which a Japanese paper pattern based on a Japanese paper image obtained by acquiring Japanese paper by means of a scanner is produced, and wherein the simulative Japanese paper face 60 is printed by employing a nontransparent white ink, a transparent ink, and a white transparent ink of an intermediate color of these two inks.

According to the gaming machine 1, based on a Japanese paper image that is obtained by acquiring actual Japanese paper by means of a scanner, printing is performed with the use of a nontransparent white ink, a transparent ink, and a white transparent ink of an intermediate color of these two inks, whereby a Japanese paper patter having a unique texture can be easily produced, enabling a new effect utilizing a texture unique to Japanese paper. Moreover, unlike actual Japanese paper, there would be no apprehension that transmittance lowers with an elapse of time. In addition, a decorative panel can be easily mounted to the gaming machine 1.

The gaming machine 1 is provided in such a manner that the decorative panels (the first decorative panel 61 and the second decorative panel 2) includes decorative frames 611 and 621 which are fixed in a state in which part of these panels is inserted between the display device (the liquid crystal display device 5) and the front panel 8 and for which a design having at least one opening is made; the Japanese paper portions 612 and 622 are sandwiched between the decorative frames 611 and 621 and the display device (the liquid crystal display device 5); the simulative Japanese paper face 60 employs, as a bottom layer, either a transparent ink or a white transparent ink from among a white ink, the transparent ink, and the white transparent ink; and the white ink, the transparent ink, and the white transparent ink are printed to be superimposed in a layered manner in a predetermined sequential order.

With such a construction, a decorative panel which is attractive in an external view can be produced by combining the decorative frames 611 and 621 and the Japanese paper portions 612 and 622 with a variety of designs. In addition, the decorative panels (the first decorative panel 61 and the second decorative panel 62) can be easily and reliably mounted to the gaming machine 1.

The gaming machine 1 is provided in such a manner that two kinds of decorative panels with their different external views (the first decorative panel 61 and the second decorative panel 62) are disposed to be spaced from each other on the left and right sides of the display device (the liquid crystal display device 5), and on Japanese paper portions 612 and 622 of the respective decorative panels (the first decorative panel 61 and the second decorative panel 62), spacers are arranges to prevent the Japanese paper portions 612 and 622 from coming into direct contact with a surface of the display device (the liquid crystal display device 5) and to prevent the simulative Japanese paper face 60 from coming into direct contact with the decorative frames 611 and 621.

With such a construction, it becomes possible to prevent the simulative Japanese paper face 60 from being worn out and damaged due to abutment against the decorative frames 611 and 621 and to prevent a display face of the display device (the liquid crystal display device 5) from worn out and damaged by the Japanese paper portions 612 and 622. In addition, more various stage effects can be obtained utilizing two different kinds of decorative panels (the first decorative panel 61 and the second decorative panel 62) and a texture unique to Japanese paper.

The gaming machine 1 is provided which includes: a casing (a cabinet 1*a*) adapted to house a plurality of reels 3L, 3C, and 3R in which a plurality of symbols are arranged on a respective one of peripheral faces; a front door 2 that is mounted in an openable manner to a front side opening face of the casing (the cabinet 1*a*); a base portion 17 having control means (a medal insertion slot 10, a 1-BET button 11, and a MAX-BET button 12) on a top face part thereof, the base portion being arranged at a front lower half of the front door 2; a front panel 8 which is arranged at a front upper half of the front door 2, a lower end part of which communicate with the top face part of the base portion 17; a display device (a liquid crystal display device 5) that is arranged at a rear part of the front panel 8, for displaying an image according to a play of a game and transparently visualizing reels 3L, 3C, and 3R; and a movable effect member (a torch-shaped movable member 91) that is arranged in a vertically swingable manner between the front panel 8 and the display device (the liquid crystal display device 5), and that is movable from an initial position hidden behind a rear part of an upper part of the front panel 8 up to a position covering part of the display device (the liquid crystal display device 5), wherein the front panel 8 is gradually small in a degree of protrusion from a top part to a lower end part at which a maximum protrusion portion is formed.

With the gaming machine 1, a predetermined space is formed between the front panel 8 and the top face part of the base portion 17, enabling an impression effect that the movable effect member (the torch-shaped movable member 91) suddenly gets into a field of view; and therefore, there is no apprehension that operability of the control means (the medal insertion slot 10, the 1-BET button 11, and the MAX-BET button 12) that are provided at the top face part of the base portion 17 is degraded.

The gaming machine 1 is provided in such a manner that the movable effect member (the torch-shaped movable member 91) extends in a transversely widthwise direction of the front panel 8, and is a rod-like body, one end part of which is pivotably coupled with an appropriate site.

With such a construction, equipment of a large-sized movable effect member (the torch-shaped movable member 91) that is capable of attracting a player's attention can be implemented with a simple construction in which only one end part is pivotably coupled with an appropriate site.

The gaming machine 1 is provided in such a manner that the front panel 8 is made of: a cover body 82 for covering the front upper half of the front door 2; and a hard plate member (a first reinforced acrylic plate 84) having a light transmission property, the plate member being mounted on a back face side of the cover 83, and a tilt angle of the hard plate member (the first reinforced acrylic plate 84) is defined as a tilt angle at which a maximum thickness portion of the movable effect member (the torch-shaped movable member 91) abuts against the hard plate member (the first reinforced acrylic plate 84) at a position that is more upward than that of a transparent region of the reels 3L, 3C, and 3R the display device (the liquid crystal display device 5).

With such a construction, even in a case where the movable effect member (the torch-shaped movable member 91) disengages and drops for any reason, the movable effect member (the torch-shaped movable member 91) stops in abutment against the hard plate member (the first reinforced acrylic plate 84) at an position that is more upward than that of the transparent region of the reels 3L, 2C, and 3R, and therefore, visual recognition of the reel 3L, 3C, and 3R is not interfered.

The gaming machine 1 is provided which includes: a casing (a cabinet 1*a*) adapted to house a plurality of reels 3L, 3C, and 3R in which a plurality of symbols are arranged on a respective one of peripheral faces; a display device (a liquid crystal display device 5) that is provided at a front door 2 mounted in an openable manner to a front side opening face of the casing (the cabinet 1*a*), and that is capable of displaying an image according to a play of a game and visualizing the reels 3L, 3C, and 3R; a movable effect member (a torch-shaped movable member 91) that, on a front face side of the display device (the liquid crystal display device 5), extends in a transversely widthwise direction of the display device (the liquid crystal display device 5), and that is arranged in a vertically swingable manner via a bearing portion 92 that is provided at one end thereof; and a driving source (a motor 94) for driving the movable effect member (the torch-shaped movable member 91), wherein the movable effect member (the torch-shaped movable member 91) has: an outer shell portion 91*a* for which a predetermined design is made; and a board portion 91*b* that is mounted to a rear opening portion of the outer shell portion 91*a*, the bearing portion 92 is provided at the outer shell portion 91*a*, and has: a first boss portion 921 into which a turning shaft 950 coupled to be interlocked with the driving source (the motor 94) is to be inserted; and a second boss portion 922 that is provided at the board portion 91*b*, engages with the first boss portion 921, and configures the bearing portion 92 together with the first boss portion 921, wherein the first boss portion 921 includes a pair of shaft pinching pieces 923 in which first tapered faces 923*a* tapered toward tip ends are respective formed on outside faces, whereas the second boss portion 922 is a boss portion at which a second tapered face 922*a* abutting against the first tapered face 923*a* is formed on an inside face, a turning shaft 950 has a flat face portion 951 that is pinched between and compressed by means of the pair of the shaft pinching pieces 923, and the flat face portion 951 is chamfered and formed on a respective one of shaft peripheral faces.

With the gaming machine 1, the first boss portion 921 that is provided at the outer shell portion 91*a* is engaged with the second boss portion 922 that is provided at the board portion 91*b*, the first tapered face 923*a* and the second tapered face 922*a* are abutted against each other, whereby the shaft pinching piece 923 is compressed inward, and the bearing portion 92 and the turning shaft 950 of the movable effect member (the torch-shaped movable member 91) are fixed to each other, and as a result, for example, it is possible to prevent, to its required maximum, a backlash from occurring between the bearing portion 92 of the movable effect member (the torch-shaped movable member 91) and the turning shaft 950 to be inserted therein. Thus, there would be no apprehension that a movable range of the movable effect member (the torch-shaped movable member 91) deviates from a designed predetermined range, and swings up to a real visualization region of the display device (the liquid crystal display device 5), and there would be no apprehension that visual recognition property of the reel symbols is degraded, thereby interfering operation of stop buttons 15L, 15C, and 15R, for example. In addition, the movable effect member (the torch-shaped movable member 91) is precisely driven, thereby making it possible to move together with display of an effect image by means of the display device (the liquid crystal display device 5) without any shift. Further, the turning shaft 950 is more reliably pinched between and compressed by means of the shaft pinching pieces 923, making it possible to more reliably prevent a backlash between the bearing portion 92 and the turning shaft 950.

The gaming machine 1 is provided in such a manner that the movable effect member (the torch-shaped movable member 91) is capable of pinching and compressing the turning shaft 950 by compressing the shaft pinching pieces 923 inward by means of the second tapered face 922*a* when the board portion 91*b* is attached to the outer shell portion 91*a* with the turning shaft 950 being inserted into the first boss portion 921.

With such a construction, when a worker assembles the movable effect member (the torch-shaped movable member 91), the worker can feel that the turning shaft 950 is firmly pinched and compressed and then is fixed to the bearing portion 92, thus making it possible to reliably fix the beating portion 92 and the turning shaft 950 to each other. As a result, a backlash between the bearing portion 92 and the turning shaft 950 can be prevented more reliably.

The gaming machine 1 is provided in such a manner that: the movable effect member (the torch-shaped movable member 91) is a member in which the outer shell portion 91*a* and the board portion 91*b* are assembled with each other in advance; at the shaft pinching pieces 923 of the first boss portion 021, the third tapered face 923*b* is formed on an inside face so that at least tip end portion broadens as the turning shaft 950 in inserted; when the turning shaft 950 is inserted into the bearing portion 92, the shaft pinching pieces 923 are compressed outward; and a caulking engagement is configured between the first boss portion 921 and the second boss portion 922.

With such a construction, the movable effect member (the torch-shaped movable member 91) is provided as a unit, thus making it very easy to mount the movable effect member (the torch-shaped effect member 91), and there is no apprehension that a harness 917 is bitted at the time of such mounting.

The gaming machine 1 is provided in such a manner that the movable effect member (the torch-shaped movable member 91) includes: a peripheral wall portion 912 surrounding a bearing portion 92; and an effect main body portion (an electrical decorative portion 910) that continuously extends to the peripheral wall portion 912, wherein: the peripheral wall portion 912 is formed an outer shell portion 91*a*; and part of the peripheral portion 912 is cut out, forming a lead-out space 915 for leading out the harness 917 electrically connecting the movable effect member (the torch-shaped movable member 91) and the casing (the cabinet 1*a*) to thereby configure the harness 917 to be able to be led out from the lead-out space 915 after a ring has been formed along an outer circumference of the second boss portion 922; and further, a harness engagingly lock portion 918 is provided for engagingly locking the harness 917 that extends from the lead-out space 915.

With such a construction, when the movable effect member (the torch-shaped movable member 91) is mounted to the front door 2, the harness 917 that extends from a proximal end part 900 of the movable effect member (the torch-shaped movable member 91) is temporarily engagingly locked with the harness engagingly lock portion 918, and thereafter, a harness tip end side can be suspended on the casing (cabinet 1*a*) from a top side of a driving unit case 93, thus making it easier to mount the movable effect member (the torch-shaped movable member 91).

The gaming machine 1 is provided which includes: a casing (a cabinet 1*a*) adapted to house a plurality of reels 3L, 3C, and 3R in which a plurality of symbols are arranged on a respective one of peripheral faces; a front door 2 that is mounted in an openable manner to a front side opening face of the casing (the cabinet 1*a*); a front panel 8 that is arranged at a front upper half of the front door 2; an effect panel 813 including a first picture 813*a* that is printed with a color ink and a second picture 813*a* that is superimposed on the first picture 813*b*, and is printed with a polarizing pearl ink with a higher light transmission property than the color ink, the effect panel being disposed at a predetermined position in the front panel 8; and a light emitting element (a lamp 813*c*) for emitting light to a rear face of the effect panel 813 at higher luminance than that of external environmental light in accordance with a progress of a game.

With such a construction, since the second picture 813*b* is printed with a polarizing pearl ink with its high light transmission property, in a case where the light emitting element (the lamp 813*c*) is lit, light emitted from the light emitting element (the lamp 813*c*) transmits the second picture 813*b*, and as a result, the first picture 813*a* can be clearly displayed having almost no influence on the first picture 813*a*. In this manner, the first picture 813*a* can be clearly displayed, thus making it possible to produce the first picture 813*a* as a finely depicted picture, and making it possible to provide an effect with its high entertainment property. In addition, since a color used for the first picture 813*a* can be arbitrarily determined, the first picture 813*a* can be produced as a colorful picture without limiting a color used for the first picture 813*a*, and an effect with its high entertainment property can be provided.

While the movable effect member of the exemplary embodiment is configured so as to enable visual recognition as if it were actually flaming by means of a first light refraction face 919*c* with the use of a prism sheet 91*c*, a second light refraction face 919*a* of an outer shell portion 91*a*, and disposition of an LED, it is sufficient if its shape include a shape simulating a flame without being limitative to a torch, and for example, any shape such as a lighter or a match (or a flame per se) may be formed.

In addition, while the movable effect member of the exemplary embodiment is arranged in a vertically swingable manner via the bearing portion 92 that is provided at one end part, and the torch-shaped effect member is employed as its shape, the shape of the movable effect member is not limitative to the torch-shaped one, and the effect member may be formed in any shape (for example, a circular shape or a rectangular shape) as long as a predetermined decoration is applied.

Further, while the movable effect member of the exemplary embodiment employs a bearing structure in which one end part is pivotably coupled with the bearing portion 92, it is sufficient if there is a structure in which a movable effect member is capable of appearing in an upward region of the reels 3L, 3C, and 3R without being limitative to such bearing structure, and for example, there may be a structure such that a movable effect member merely moves upward and downward.

Furthermore, while the exemplary embodiment has described provision of a structure for the turning shaft 950 to support only one side of the movable effect member, a structure of supporting a movable effect member is not limitative to the above structure of supporting only one side of the movable effect member. It is sufficient if there is a structure of supporting a movable effect member in a vertically swingable manner, and for example, there may be a seesaw shape that is formed so as to be vertically swingable with a center thereof being supported by means of a rotary shaft.

Still furthermore, in the foregoing exemplary embodiment, the lower frame portion 812 that is positioned at the lowest end of the front panel is caused to serve as a speaker cover, and decoration is applied to its front face. While a protrusion portion that protrudes toward the front face is formed by means of this decoration, a decoration is applied to an extent such that no protrusion portion occurs and/or speakers themselves are moved to another place, whereby the lower frame portion 812 coming into contact with the base portion 17 may be a minimum protrusion position.

Yet furthermore, while the foregoing exemplary embodiment has described the fact that the luminance of the light that is emitted from the lamp 813*c* is preset at higher luminance than that of external environmental light, the present invention is not limitative thereto. The luminance of environmental light may be measured so as to emit light with stronger luminance than that of the measured environmental light. Specifically, the gaming machine 1 further includes: a measuring portion for measuring luminance of environmental light; and an adjustment portion for adjusting luminance of the lamp 813*c* so as to emit light at stronger luminance than that of the environmental light that is measured by means of the measuring portion. For example, the adjustment portion adjusts the luminance of the lamp 813*c* so as to emit light with luminance which is somewhat higher than that of the environmental light with the use of the luminance of the environmental light that is measured by means of the measuring portion.

In this manner, the luminance of environmental light is measured, and light is emitted with stronger luminance than that of the measured environmental light, thus making it possible to reliably display a clear first picture 813*a*. In addition, in a case where the luminance of the environmental light is low, the first picture 813*a* can be clearly displayed while the luminance of the light from the lamp 813*c* is reduced, thus making it possible to restrain power consumption.

In addition, in a case where a plurality of first pictures 813*a* exist, light may be emitted to only part of the plurality of first pictures 813*a*. Specifically, the gaming machine 1 includes a plurality of lamps 813*c* respectively emitting light to each of the printed first pictures 813*a*, at higher luminance than that of external environmental light, wherein the plurality of lamps 813*c* individually emits light in accordance with the progress of a game. A partition is provided between the lamps 813*a*, only a lamp 813*c* that is positioned on a rear face of a picture that is desired to be visually recognizable is caused to light emit, thereby making only a partial picture visually recognizable. In this manner, for example, diversified effects can be achieved by providing a variety of effects such as changing a degree of expectation according to kinds of pictures that can be visually recognized.

Further, while the foregoing exemplary embodiment has described the fact that the first picture 813*a* that is printed with a color ink is arranged on a rear face of the second picture 813*b* that is printed with a polarizing pearl ink, the present invention is not limitative thereto. A decorative element may be arranged on the rear face of the second picture 813*b* printed with a polarizing pearl ink, or alternatively, there may be arranged an effect device, such as a 7-segment indicator or reels, lamps, or liquid crystals, which is capable of executing an effect. Specifically, a picture is printed on a surface of a transparent plate member with a polarizing pearl ink, the 7-segment indicator is provided on the rear face of that plate member, and further, the 7-segment indicator are employed as an effect timer. Counting is then carried out by means of the 7-segment indicator that suddenly appears at the same time as when an effect starts, and therefore, a player is prone to getting more irritated and then the entertainment exerted by such effect can be enhanced.

While, in the foregoing exemplary embodiment, it is to be noted that the gaming machine 1 has been described as a pachi-slot machine, the movable effect members and decorative panels can be applied to a pachinko machine as well. Further, in addition to such a pachi-slot machine in the exemplary embodiment, the present invention can be applied to other gaming machines as well.

The present invention can be applied to a slot machine, for example. Games to be played at slot machines respectively are made of two game modes, i.e., a base game and a bonus game.

In the base game, a liquid crystal display device 5 of a gaming machine 1 is adapted to display a plurality of symbols of the respective reels 3L, 3C, and 3R through reel windows 21L, 21C, and 21R. In addition, the liquid crystal display device 5 is adapted to display one or a plurality of paylines crossing the reel windows 21L, 21C, and 21R in a horizontal direction. This payline is adapted to specify a symbol combination. On the other hand, a variety of winning combinations are predetermined based on the respective symbol combinations. After the respective stop positions of the reels 3L, 3C, and 3R have been determined by means of lottery, the reels 3L, 3C, and 3R are spun at the same time and then automatically stopped in sequential order, whereby a plurality of symbols are displayed again through the reel windows 21L, 21C, and 21R. At this time, in a case where a combination of symbols that are made of a plurality of symbols that are specified by means of a payline is realized as a winning combination, an amount of prize according to that winning combination is displayed on a variety of display portions. In this manner, a unit game is constituted. That is, the base game played is a so called slot game.

If predetermined symbols are displayed in any of the reel windows 21L, 21C, and 21R of the liquid crystal display device 5, such display causes a bonus game trigger. In this case, a predetermined amount of prize is displayed on a variety of display portions, and the routine moves to a free game that is one kind of bonus game. In the free game, a unit game of the base game is repeated up to a predetermined number of times.

When the routine moves to the free game the main CPU 31 provides at least one of a plurality of effects described below. Namely, the main CPU 31 activates a torch-shaped movable member 91; causes an image (not shown) to be displayed on a display image 5*a* of the liquid crystal display device 5 so as to be transparently viewed by a player via Japanese traditional paper portions 612 and 613; and causes light to be emitted from a plurality of LEDs (not shown) that are arranged on the torch-shaped movable member 91, or alternatively, illuminates a lamp 813*c* that is disposed on a rear face side of an effect panel 813.

In principle, the plurality of LEDs (not shown) that are arranged on the torch-shaped movable member 91 may be blinked, and the lamp 813*c* that is disposed on the rear face side of the effect panel 813 may be blinked or turned off. Alternatively, the luminance of the plurality of LEDs (not shown) or the lamp 813*c* may be varied.

Such an effect may be provided when a predetermined winning combination is realized in a slot game or in a free game or when a predetermined winning combination is nearly realized in a slot game or in a free game. If the predetermined winning combination is nearly realized in the slot game or in the free game, a so called li-zhi state is established. The li-zhi state denotes a state in which the reels 3L and 3C are automatically stopped in sequential order, and while the reel 3R is in spinning, a combination of symbols that are made of a plurality of symbols that are specified by means of a payline is realized as any one of winning combinations of a plurality of symbols that are displayed again through the reel windows 21L and 21C.

It is to be noted that in a slot machine, the reels 3L, 3C, and 3R are automatically stopped in sequential order; and therefore, the stop buttons 15L, 15C, and 15R or the stop switch 15S are not used. Accordingly, the main CPU 31 determines a li-zhi state from a respective one of the stop positions of the reels 3L, 3C, and 3R that are determined by means of lottery before the reels 3L, 3C, and 3R spin.

Furthermore, in a game program adapted to execute the operations made in the pachi-slot machine or pachinko machine or slot-machine described above for a gaming machine for home use in a simulative manner as well, a game can be executed by applying the present invention. In that case, as recording mediums for recording game programs, a CD-ROM, an FD (a flexible disk) or any other recording medium are available for use.

What is claimed is:

1. A gaming machine comprising:

a casing adapted to house a plurality of reels in which a plurality of symbols are arranged on a respective one of peripheral faces;

a front door that is mounted in an openable manner to a front side opening face of the casing;

a front panel that is arranged at a front upper half of the front door;

an effect panel including a first picture that is printed with a color ink and a second picture that is superimposed on the first picture, and is printed with a polarizing pearl ink with a higher light transmission property than the color ink, the effect panel being disposed at a predetermined position in the front panel; and a light emitting element for emitting light to a rear face of the effect panel at higher luminance than that of external environmental light in accordance with a progress of a game.

2. The gaming machine according to claim 1, further comprising:

a measuring portion for measuring luminance of environmental light; and an adjustment portion for adjusting luminance of the light emitting element so as to emit light at stronger luminance than that of the environmental light that is measured by means of the measuring portion.

3. The gaming machine according to claim 1, further comprising: a plurality of light emitting elements respectively emitting light to a rear of the effect panel, at higher luminance than that of external environmental light, wherein the plurality of light emitting elements individually emits light in accordance with the progress of a game.

4. A gaming machine comprising:

a casing adapted to house a plurality of reels of which a plurality of symbols are arranged on a respective one of peripheral faces;

a front door that is mounted in an openable manner to a front side opening face of the casing;

a front panel that is arranged at a front upper half of the front door;

a display device that is arranged at a rear part of the front panel of the front door, for displaying an image according to a progress of a game; and a decorative panel having a Japanese paper portion that is fixed between the display device and the front panel, and that is capable of visualizing, from a front face side, an image that is displayed on the display device, wherein the Japanese paper portions of the decorative panel has, on one side face of a substrate made of a light transmission material, a simulative Japanese paper face on which a Japanese paper pattern based on a Japanese paper image obtained by acquiring Japanese paper by means of a scanner is produced, and the simulative Japanese paper face is printed by employing a nontransparent white ink, a transparent ink, and a white transparent ink of an intermediate color of these two inks.

5. The gaming machine according to claim 4, wherein the decorative panels includes decorative frames which are fixed in a state in which part of these panels is inserted between the display device and the front panel and for which a design having at least one opening is made;

the Japanese paper portions are sandwiched between the decorative frames and the display device;

the simulative Japanese paper face employs, as a bottom layer, either a transparent ink or a white transparent ink from among a white ink, the transparent ink, and the white transparent ink; and the white ink, the transparent ink, and the white transparent ink are printed to be superimposed in a layered manner in a predetermined sequential order.

6. The gaming machine according to claim 5, wherein two kinds of decorative panels with their different external views are disposed to be spaced from each other on the left and right sides of the display device, and on Japanese paper portions of the respective decorative panels, a spacers are arranges to prevent the Japanese paper portions from coming into direct contact with a surface of the display device and to prevent the simulative Japanese paper face from coming into direct contact with the decorative frames.

7. A gaming machine comprising:

a casing adapted to house a plurality of reels in which a plurality of symbols are arranged on a respective one of peripheral faces;

a front door that is mounted in an openable manner to a front side opening face of the casing;

a base portion on a top face part thereof, the base portion being arranged at a front lower half of the front door;

a front panel which is arranged at a front upper half of the front door, a lower end part of which communicate with the top face part of the base portion;

a display device that is arranged at a rear part of the front panel, for displaying an image according to a play of a game and transparently visualizing reels; and a movable effect member that is arranged in a vertically swingable manner between the front panel and the display device, and that is movable from an initial position hidden behind a rear part of an upper part of the front panel up to a position covering part of the display device, wherein the front panel is gradually small in a degree of protrusion from a top part to a lower end part at which a maximum protrusion portion is formed.

8. The gaming machine according to claim 7, wherein the movable effect member extends in a transversely widthwise direction of the front panel, and is a rod-like body, one end part of which is pivotably coupled with an appropriate site.

9. The gaming machine according to claim 7, wherein the front panel is made of: a cover body for covering the front upper half of the front door; and a hard plate member having a light transmission property, the plate member being mounted on a back face side of the cover, and a tilt angle of the hard plate member is defined as a tilt angle at which a maximum thickness portion of the movable effect member abuts against the hard plate member at a position that is more upward than that of a transparent region of the reels the display device.

10. A gaming machine comprising:

a casing adapted to house a plurality of reels in which a plurality of symbols are arranged on a respective one of peripheral faces;

a display device that is provided at a front door mounted in an openable manner to a front side opening face of the casing, and that is capable of displaying an image according to a play of a game and visualizing the reels;

a movable effect member that, on a front face side of the display device, extends in a transversely widthwise direction of the display device, and that is arranged in a vertically swingable manner via a bearing portion that is provided at one end thereof; and a driving source for driving the movable effect member, wherein the movable effect member has: an outer shell portion for which a predetermined design is made; and a board portion that is mounted to a rear opening portion of the outer shell portion, the bearing portion is provided at the outer shell portion, and has: a first boss portion into which a turning shaft coupled to be interlocked with the driving source is to be inserted; and a second boss portion that is provided at the board portion, engages with the first boss portion, and configures the bearing portion together with the first boss portion, the first boss portion includes a pair of shaft pinching pieces in which first tapered faces tapered toward tip ends are respective formed on outside faces, whereas the second boss portion is a boss portion at which a second tapered face abutting against the first tapered face is formed on an inside face, a turning shaft has a flat face portion that is pinched between and compressed by means of the pair of the shaft pinching pieces, and the flat face portion is chamfered and formed on a respective one of shaft peripheral faces.

11. The gaming machine according to claim 10, wherein the movable effect member is capable of pinching and compressing the turning shaft by compressing the shaft pinching pieces inward by means of the second tapered face when the board portion is attached to the outer shell portion with the turning shaft being inserted into the first boss portion.

12. The gaming machine according to claim 10, wherein the movable effect member is a member in which the outer shell portion and the board portion are assembled with each other in advance;

at the shaft pinching pieces of the first boss portion, a third tapered face is formed on an inside face so that at least tip end portion broadens as the turning shaft in inserted;

when the turning shaft is inserted into the bearing portion, the shaft pinching pieces are compressed outward; and a caulking engagement is configured between the first boss portion and the second boss portion.

13. The gaming machine according to claim 10, wherein the movable effect member includes: a peripheral wall portion surrounding a bearing portion; and an effect main body portion that continuously extends to the peripheral wall portion, the peripheral wall portion is formed an outer shell portion; and part of the peripheral portion is cut out, forming a lead-out space for leading out the harness electrically connecting the movable effect member and the casing to thereby configure the harness to be able to be led out from the lead-out space after a ring has been formed along an outer circumference of the second boss portion; and further, a harness engagingly lock portion is provided for engagingly locking the harness that extends from the lead-out space.

* * * * *